(12) United States Patent
Surace et al.

(10) Patent No.: US 12,353,317 B1
(45) Date of Patent: Jul. 8, 2025

(54) METHODS FOR CREATING TEST SCRIPTS AND/OR UPDATING A MODEL OF AN APPLICATION

(71) Applicant: APPVANCE INC., Santa Clara, CA (US)

(72) Inventors: Kevin Surace, Sunnyvale, CA (US); Luis Carlos Lara Lopez, Escazu Centro (CR); Heorhii Mykolayovych Shtefanovych, Kyiv (UA)

(73) Assignee: APPVANCE INC., Santa Clara, CA (US)

( * ) Notice: Subject to any disclaimer, the term of this patent is extended or adjusted under 35 U.S.C. 154(b) by 0 days.

(21) Appl. No.: 19/071,631

(22) Filed: Mar. 5, 2025

Related U.S. Application Data

(60) Provisional application No. 63/570,373, filed on Mar. 27, 2024, provisional application No. 63/562,602, filed on Mar. 7, 2024.

(51) Int. Cl.
  *G06F 11/3668* (2025.01)
(52) U.S. Cl.
  CPC ................... *G06F 11/3684* (2013.01)
(58) Field of Classification Search
  None
  See application file for complete search history.

(56) References Cited

U.S. PATENT DOCUMENTS

| | | | |
|---|---|---|---|
| 8,756,571 B2 | 6/2014 | Bergman et al. | |
| 9,038,026 B2 | 5/2015 | Chandra et al. | |
| 9,047,414 B1 | 6/2015 | Matyjek | |
| 10,108,535 B2 | 10/2018 | Aggarwal et al. | |
| 10,204,035 B1 * | 2/2019 | Surace | H04L 67/146 |
| 10,509,718 B2 * | 12/2019 | Venkatasubramanian | G06N 3/006 |
| 10,552,299 B1 * | 2/2020 | Surace | G06F 11/3684 |
| 10,628,630 B1 * | 4/2020 | Surace | H04L 67/02 |

(Continued)

FOREIGN PATENT DOCUMENTS

| | | |
|---|---|---|
| CN | 113807077 A | 12/2021 |
| WO | 2018/010552 A1 | 1/2018 |
| WO | 2022/226075 A1 | 10/2022 |

OTHER PUBLICATIONS

Santiago, "A Practical Approach for Automated Test Case Generation using Statecharts", 2006, IEEE (Year: 2006)*

(Continued)

*Primary Examiner* — Hossain M Morshed
(74) *Attorney, Agent, or Firm* — Ascenda Law Group, PC

(57) ABSTRACT

A natural language test case for an application is automatically converted into a test script by a test script generator. During the generation of the test script, the test script generator may access a blueprint of the application. The blueprint may include a time-evolving model of the application, which may include a set of translations and a state machine model of the application. The state machine model may include a state space and a set of state transitions. During the test script generation process, the blueprint may be continually updated to include new knowledge of the application. The test script generator may communicate with an artificial intelligence (AI) engine in order to determine the semantic similarity between two phrases, convert images into textual description, and perform tasks requiring the use of a large language model (LLM).

30 Claims, 75 Drawing Sheets

(56) References Cited

U.S. PATENT DOCUMENTS

| | | | |
|---|---|---|---|
| 10,642,721 B2* | 5/2020 | Kulkarni | G06N 5/02 |
| 10,684,943 B2 | 6/2020 | Fei et al. | |
| 10,838,848 B2 | 11/2020 | Fong | |
| 10,977,168 B1* | 4/2021 | Sanevelly | G06F 11/3696 |
| 2018/0285248 A1* | 10/2018 | Gupta | G06F 11/3684 |
| 2019/0213116 A1* | 7/2019 | Kulkarni | G06F 11/3684 |
| 2021/0279577 A1 | 9/2021 | West et al. | |
| 2021/0397546 A1 | 12/2021 | Cser et al. | |
| 2022/0100643 A1* | 3/2022 | Storck | G06F 11/3684 |
| 2024/0241817 A1* | 7/2024 | Tahvili | G06F 40/216 |

OTHER PUBLICATIONS

Draheim; et al., "Modelling form-based interfaces with bipartite state machines", Interacting with Computers 17 (2005), pp. 207-228.

Harries; et al., "DRIFT: Deep Reinforcement Learning for Functional Software Testing", 33rd Deep Reinforcement Learning Workshop (NeurIPS 2019), Vancouver, Canada, 10 pgs.

Tao; et al., "An Approach to Mobile Application Testing Based on Natural Language Scripting", International Conference on Software Engineering and Knowledge Engineering, Jul. 5, 2017, 6 pgs.

\* cited by examiner

```
1  Navigate To  $baseUrl
2  Click  image($product)
3  Click  submit("Add To Cart")
4  AssertTrue  link("Login").isEnabled()
5  Click  link("Login")
6  Click  link("Create New Account")
```

15

15'

```
navigateTo($baseUrl);
click(image($product));
click(submit("Add To Cart"));
assertTrue(link("Login").isEnabled());
click(link("Login"));
click(link("Create New Account"));
```

| baseUrl | https://demosite.appvance.net/ |
|---------|-------------------------------|
| product | Ruby on Rails Tote            |

Select the Ruby on Rails tote
Add the product to cart
Assert that login button is enabled
Click Log In
Click Create new account

Fig. 3E

Elements-Per-State Table
| Blueprint State | Application Element | Script-Level Locator |
|---|---|---|
| Welcome-State | Ruby-on-Rails-Tote | image($product) |
| | | image("Ruby on Rails Tote") |
| | | 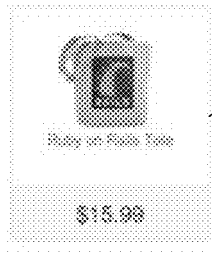 ~ 48 |
| | Log-In-Button | link("Login") |
| | |  ~ 49 |
| Product-State | Log-In-Button | link("Login") |
| | |  ~ 49 |
| | Add-To-Cart-Button | submit("Add To Cart") |
| | |  ~ 51 |
| ShoppingCart-State | Checkout-Button | link("Checkout") |
| | Log-In-Button | link("Login") |
| | | 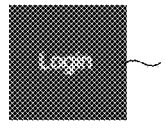 ~ 49 |
Fig. 6A Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Fig. 6B

Reaction-Per-Action Table

| Blueprint Action | Resulting State |
|---|---|
| click(Ruby-on-Rails-Tote) | Product-State |
| click(Add-To-Cart-Button) | ShoppingCart-State |
| click(Log-In-Button) | Login-State |

Fig. 6C

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| assertTrue(Log-In-Button.isEnabled()) | Verify that the Login button is enabled | 91% |

Fig. 6D

Ordered List of Translations

| Order | Test Case Segment | Blueprint Action | Score |
|---|---|---|---|
|  |  |  |  |

Fig. 7A

Segmented Test Case

| Order | Test Case Segment |
|---|---|
| 1 | Select the Ruby on Rails tote |
| 2 | Add the product to cart |
| 3 | Assert that login button is enabled |
| 4 | Click login |
| 5 | Click Create New Account |

Fig. 7B

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| assertTrue(Log-In-Button.isEnabled()) | Verify that the Login button is enabled | 91% |

Fig. 7C

AI Engine comparison between current test case segment and Test Case Segment(s)

| Current Test Case Segment | Test Case Segment(s) | AI-Gen Similarity Score |
|---|---|---|
| Select the Ruby on Rails tote | Select the Ruby on Rails tote product | 0.92 |
| | Click the Ruby on Rails tote | 0.95 |
| | Verify that the Login button is enabled | 0.18 |

Fig. 7D

Updated Ordered List of Translations

| Order | Test Case Segment | Blueprint Action | Score |
|---|---|---|---|
| 1 | Select the Ruby on Rails tote | click(Ruby-on-Rails-Tote) | 95% |

Fig. 7E

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |

Fig. 7F

Segmented Test Case

| Order | Test Case Segment |
|---|---|
| 1 | Select the Ruby on Rails tote |
| 2 | Add the product to cart |
| 3 | Assert that login button is enabled |
| 4 | Click login |
| 5 | Click Create New Account |

Fig. 8A

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| click(Add-To-Cart) | Add the product to cart | 90% |

Fig. 8B

AI Engine comparison between current test case segment and Test Case Segment(s)

| Current Test Case Segment | Test Case Segment(s) | AI-Gen Similarity Score |
|---|---|---|
| Add the product to cart | Verify that the Login button is enabled | 0.35 |

Fig. 8C

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| click(Add-To-Cart) | Add the product to cart | 90% |

Fig. 8D

Rule-based generated description of Blueprint Action

| Blueprint Action | Rule-based generated description |
|---|---|
| click(Log-In-Button) | Click a button which can be accessed with the locator link("Login") |

Fig. 8E

AI Engine comparison between current test case segment and candidate NL phrase

| Current Test Case Segment | Candidate NL Phrase | AI-Gen Similarity Score |
|---|---|---|
| Add the product to cart | Click a button which can be accessed with the locator link("Login") | 0.27 |

Fig. 8F

AI generated image-to-text translation of application element

| Application Element | Image | AI Generated NL Description |
|---|---|---|
| Log-In-Button | 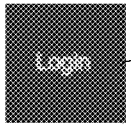 ~ 49 | This is a simple rectangular button with the text "Login" centered on it. |
| Add-To-Cart-Button |  ~ 51 | This is a simple rectangular button with the text "Add To Cart" centered on it. |

Rule-based generated description of application element using text locators

| Application Element | Rule-based generated description |
|---|---|
| Log-In-Button | A button which can be accessed with the locator link("Login") |
| Add-To-Cart-Button | A button which can be accessed with the locator submit("Add to Cart") |

Combined NL description of application element

| Application Element | Combined NL description |
|---|---|
| Log-In-Button | A button which can be accessed with the locator link("Login") and an image of a simple rectangular button with the text "Login" centered on it. |
| Add-To-Cart-Button | A button which can be accessed with the locator submit("Add to Cart") and an image of a simple rectangular button with the text "Add-To-Cart" centered on it. |

Fig. 8G

A web page consisting in

* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

Fig. 8H

Given

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

What is the minimum number of application elements used by this test case segment:
* Add the product to cart Please give me the number no explanation is expected

Given

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

What is the minimum number of application elements used by this test case segment:
* Add the product to cart Please give me the number no explanation is expected

Blueprint Actions, each acting on 1 application element

| Blueprint Action | NL Description |
|---|---|
| click(Log-In-Button) | Click a button which can be accessed with the locator link("Login") and an image of a simple rectangular button with the text "Login" centered on it. |
| click(Add-To-Cart-Button) | Click a button which can be accessed with the locator submit("Add to Cart") and an image of a simple rectangular button with the text "Add To Cart" centered on it. |

Blueprint Actions, each acting on 2 application elements

| Blueprint Action | NL Description |
|---|---|
| click(Log-In-Button); click(Add-To-Cart-Button) | Click a button which can be accessed with the locator link("Login") and an image of a simple rectangular button with the text "Login" centered on it<br><br>and then<br>click a button which can be accessed with the locator submit("Add to Cart") and an image of a simple rectangular button with the text "Add To Cart" centered on it. |
| click(Add-To-Cart-Button); click(Log-In-Button) | Click a button which can be accessed with the locator submit("Add to Cart") and an image of a simple rectangular button with the text "Add To Cart" centered on it<br><br>and then<br>click a button which can be accessed with the locator link("Login") and an image of a simple rectangular button with the text "Login" centered on it |

Fig. 8K

AI Engine comparison between current test case segment and candidate NL phrases

| Current Test Case Segment | Candidate NL Phrase | AI-Gen Similarity Score |
|---|---|---|
| Add the product to cart | Click a button which can be accessed with the locator link("Login") and an image of a simple rectangular button with the text "Login" centered on it. | 0.10 |
| | Click a button which can be accessed with the locator submit("Add to Cart") and an image of a simple rectangular button with the text "Add To Cart" centered on it. | 0.90 |
| | Click a button which can be accessed with the locator link("Login") and an image of a simple rectangular button with the text "Login" centered on it<br><br>and then<br>click a button which can be accessed with the locator submit("Add to Cart") and an image of a simple rectangular button with the text "Add To Cart" centered on it. | 0.50 |
| | Click a button which can be accessed with the locator submit("Add to Cart") and an image of a simple rectangular button with the text "Add To Cart" centered on it<br><br>and then<br>click a button which can be accessed with the locator link("Login") and an image of a simple rectangular button with the text "Login" centered on it | 0.50 |

Fig. 8L

Updated Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |

Fig. 8M

Updated Ordered List of Translations

| Order | Test Case Segment | Blueprint Action | Score |
|---|---|---|---|
| 1 | Select the Ruby on Rails tote | click(Ruby-on-Rails-Tote) | 95% |
| 2 | Add the product to cart | click(Add-To-Cart-Button) | 90% |

Fig. 8N

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| click(Add-To-Cart-Button) | Add the product to cart | 90% |

Fig. 8O

Segmented Test Case

| Order | Test Case Segment |
|---|---|
| 1 | Select the Ruby on Rails tote |
| 2 | Add the product to cart |
| 3 | Assert that login button is enabled |
| 4 | Click login |
| 5 | Click Create New Account |

Fig. 9A

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| click(Add-To-Cart) | Add the product to cart | 90% |

Fig. 9B

AI Engine comparison between current test case segment and Test Case Segment(s)

| Current Test Case Segment | Test Case Segment(s) | AI-Gen Similarity Score |
|---|---|---|
| Assert that login button is enabled | Verify that the Login button is enabled | 0.97 |

Fig. 9C

Updated Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |
| ShoppingCart-State | assertTrue(Log-In-Button.isEnabled()) | assertTrue | Log-In-Button |

Fig. 9D

Updated Ordered List of Translations

| Order | Test Case Segment | Blueprint Action | Score |
|---|---|---|---|
| 1 | Select the Ruby on Rails tote | click(Ruby-on-Rails-Tote) | 95% |
| 2 | Add the product to cart | click(Add-To-Cart-Button) | 90% |
| 3 | Assert that login button is enabled | assertTrue(Log-In-Button.isEnabled()) | 97% |

Fig. 9E

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| | Assert that login button is enabled | 88% |
| click(Add-To-Cart) | Add the product to cart | 90% |

Fig. 9F

Segmented Test Case

| Order | Test Case Segment |
|---|---|
| 1 | Select the Ruby on Rails tote |
| 2 | Add the product to cart |
| 3 | Assert that login button is enabled |
| 4 | Click login |
| 5 | Click Create New Account |

Fig. 10A

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |
| ShoppingCart-State | assertTrue(Log-In-Button.isEnabled()) | assertTrue | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| | Assert that login button is enabled | 88% |
| click(Add-To-Cart) | Add the product to cart | 90% |

Fig. 10B

AI Engine comparison between current test case segment and Test Case Segment(s)

| Current Test Case Segment | Test Case Segment(s) | AI-Gen Similarity Score |
|---|---|---|
| Click login | Verify that the Login button is enabled | 0.65 |
| | Assert that login button is enabled | 0.63 |

Fig. 10C

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |
| ShoppingCart-State | assertTrue(Log-In-Button.isEnabled()) | assertTrue | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| | Assert that login button is enabled | 88% |
| click(Add-To-Cart) | Add the product to cart | 90% |

Fig. 10D

AI Engine comparison between current test case segment and Test Case Segment(s)

| Current Test Case Segment | Test Case Segment(s) | AI-Gen Similarity Score |
|---|---|---|
| Click login | Verify that the Login button is enabled | 0.65 |
| | Assert that login button is enabled | 0.63 |

Fig. 10E

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |
| ShoppingCart-State | assertTrue(Log-In-Button.isEnabled()) | assertTrue | Log-In-Button |

Fig. 10F

Blueprint Action acting on 1 application element

| Blueprint Action | NL Description |
|---|---|
| click(Log-In-Button) | Click a button which can be accessed with the locator link("Login") |

Fig. 10G

AI Engine comparison between current test case segment and candidate NL Phrase

| Current Test Case Segment | Candidate NL Phrase | AI-Gen Similarity Score |
|---|---|---|
| Click login | Click a button which can be accessed with the locator link("Login") | 0.88 |

Fig. 10H

Updated Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |
| ShoppingCart-State | assertTrue(Log-In-Button.isEnabled()) | assertTrue | Log-In-Button |
| | click(Log-In-Button) | click | Log-In-Button |

Fig. 10I

Updated Ordered List of Translations

| Order | Test Case Segment | Blueprint Action | Score |
|---|---|---|---|
| 1 | Select the Ruby on Rails tote | click(Ruby-on-Rails-Tote) | 95% |
| 2 | Add the product to cart | click(Add-To-Cart-Button) | 90% |
| 3 | Assert that login button is enabled | assertTrue(Log-In-Button.isEnabled()) | 97% |
| 4 | Click login | click(Log-In-Button) | 88% |

Fig. 10J

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| | Assert that login button is enabled | 88% |
| click(Add-To-Cart) | Add the product to cart | 90% |
| click(Log-In-Button) | Click login | 88% |

Fig. 10K

Segmented Test Case

| Order | Test Case Segment |
|---|---|
| 1 | Select the Ruby on Rails tote |
| 2 | Add the product to cart |
| 3 | Assert that login button is enabled |
| 4 | Click login |
| 5 | Click Create New Account |

Fig. 11A

Rule-based generated description of each application element using text locators

| Application Element | NL Phrase |
|---|---|
| Email-Field | A text field which can be accessed with locator textfield("email") |
| Password-Field | A password filed which can be accessed with locator password(0) |
| Submit-Login Button | A submit button which can be accessed with the locator submit("Login") |
| Create-Account-Button | A button which can be accessed with locator link("Create New Account") |

Fig. 11C

Updated Elements-Per-State Table

| Blueprint State | Application Element | Script Level Locator |
|---|---|---|
| Welcome-State | Ruby-on-Rails-Tote | image($product) |
| | | image("Ruby on Rails Tote") |
| | | 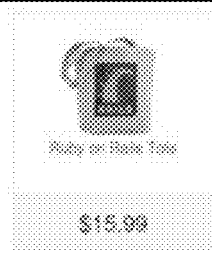 |
| | Log-In-Button | link("Login") |
| | |  |
| Product-State | Log-In-Button | link ("Login") |
| | |  |
| | Add-To-Cart-Button | submit("Add to Cart") |
| | |  |
| ShoppingCart-State | Checkout-Button | Link("Checkout") |
| | Log-In-Button | link ("Login") |
| | |  |
| Log-in-State | Email-Field | textfield("email") |
| | Password-Field | password(0) |
| | Submit-Login Button | submit("Login") |
| | Create-Account-Button | link("Create New Account") |

Fig. 11B

A web page consisting in

* A text filed which can be accessed with locator textfield("email")
* A password filed which can be accessed with locator password(0)
* A submit button which can be accessed with the locator submit("Login")
* A button which can be accessed with locator link("Create New Account")

Fig. 11D

Given

A web page consisting in
* A text filed which can be accessed with locator textfield("email")
* A password filed which can be accessed with locator password(0)
* A submit button which can be accessed with the locator submit("Login")
* A button which can be accessed with locator link("Create New Account")

What is the minimum number of elements used by this test case phrase:
*Click Create New Account Please give me the number no explanation is expected

Given

A web page consisting in
* A text filed which can be accessed with locator textfield("email")
* A password filed which can be accessed with locator password(0)
* A submit button which can be accessed with the locator submit("Login")
* A button which can be accessed with locator link("Create New Account")

What is the maximum number of elements used by this test case phrase:
*Click Create New Account Please give me the number no explanation is expected

Blueprint Actions, each acting on 1 application element

| Blueprint Action | NL Description |
| --- | --- |
| fill(Email-Field) | Fill a text field which can be accessed with locator textfield("email") |
| fill(Password-Field) | Fill a password filed which can be accessed with locator password(0) |
| click(Submit-Login) | Click a submit button which can be accessed with the locator submit("Login") |
| click(Create-Account-Button) | Click a button which can be accessed with locator link("Create New Account") |

Fig. 11G

AI Engine comparison between the current test case segment and candidate NL Phrases

| Current Test Case Segment | Candidate NL Phrases | AI-Gen Similarity Score |
| --- | --- | --- |
| Click Create New Account | Fill a text field which can be accessed with locator textfield("email") | 0.32 |
| | Fill a password filed which can be accessed with locator password(0) | 0.30 |
| | Click a submit button which can be accessed with the locator submit("Login") | 0.45 |
| | Click a button which can be accessed with locator link("Create New Account") | 0.92 |

Fig. 11H

Updated Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |
| Product-State | click(Add-To-Cart-Button) | click | Add-To-Cart-Button |
| ShoppingCart-State | assertTrue(Log-In-Button.isEnabled()) | assertTrue | Log-In-Button |
| | click(Log-In-Button) | click | Log-In-Button |
| Login-State | click(Create-Account-Button) | click | Create-Account-Button |

Fig. 11I

Updated Ordered List of Translations

| Order | Test Case Segment | Blueprint Action | Score |
|---|---|---|---|
| 1 | Select the Ruby on Rails tote | click(Ruby-on-Rails-Tote) | 95% |
| 2 | Add the product to cart | click(Add-To-Cart-Button) | 90% |
| 3 | Assert that login button is enabled | assertTrue(Log-In-Button.isEnabled()) | 97% |
| 4 | Click login | click(Log-In-Button) | 88% |
| 5 | Click Create New Account | click(Create-Account-Button) | 92% |

Fig. 11J

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| | Assert that login button is enabled | 88% |
| click(Add-To-Cart) | Add the product to cart | 90% |
| click(Log-In-Button) | Click login | 88% |
| click(Create-Account-Button) | Click Create New Account | 92% |

Fig. 11K

Mapping from Blueprint Actions to Test Script

| Order | Blueprint Action | Test Script (Test Designer) |
|---|---|---|
| 1 | click(Ruby-on-Rails-Tote) | click(image($product)) |
| 2 | click(Add-To-Cart-Button) | click(submit("Add to Cart")) |
| 3 | assertTrue(Log-In-Button.isEnabled()) | assertTrue(link("Login").isEnabled()) |
| 4 | click(Log-In-Button) | click(link("Login")) |
| 5 | click(Create-Account-Button) | click(link("Create New Account")) |

Fig. 11L

Updated Scores in Ordered List of Translations

| Order | Test Case Segment | Blueprint Action | Score |
|---|---|---|---|
| 1 | Select the Ruby on Rails tote | click(Ruby-on-Rails-Tote) | 100% |
| 2 | Add the product to cart | click(Add-To-Cart-Button) | 99% |
| 3 | Assert that login button is enabled | assertTrue(Log-In-Button.isEnabled()) | 100% |
| 4 | Click login | click(Log-In-Button) | 97% |
| 5 | Click Create New Account | click(Create-Account-Button) | 100% |

Fig. 12A

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select the Ruby on Rails tote | 100% |
| assertTrue(Log-In-Button.isEnabled()) | Verify that the Login button is enabled | 91% |
| | Assert that login button is enabled | 100% |
| click(Add-To-Cart) | Add the product to cart | 99% |
| click(Log-In-Button) | Click login | 97% |
| click(Create-Account-Button) | Click Create New Account | 100% |

Fig. 12B

Select this product

~ 48

Type credentials
Add the product to cart
Click Create New Account

Segmented Test Case

| Order | Test Case Segment |
|---|---|
| 1 | Select this product<br> ~ 48 |
| 2 | Type credentials |
| 3 | Add the product to cart |
| 4 | Click Create New Account |

AI generated image-to-text translation of application element

Fig. 13C

NL Conversion of Test Case Segment

Fig. 13D

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| assertTrue(Log-In-Button.isEnabled()) | Verify that the Login button is enabled | 91% |

Fig. 13E

AI Engine comparison between transformed test case segment and Test Case Segment(s)

| Transformed Test Case Segment | Test Case Segment(s) | AI-Gen Similarity Score |
|---|---|---|
| Select this product which matches this description [This is a product display card that includes an image of a "Ruby on Rails Tote," the product name in text, and the price "$15.99" prominently shown below.] | Select the Ruby on Rails tote product | 0.85 |
| | Click the Ruby on Rails tote | 0.60 |
| | Verify that the Login button is enabled | 0.10 |

Fig. 13F

Updated Ordered List of Translations

| Order | Test Case Segment | Blueprint Action | Score |
|---|---|---|---|
| 1 | Select this product ~48 | click(Ruby-on-Rails-Tote) | 85% |

Fig. 13G

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select this product ~48 | 80% |
| assertTrue(Log-In-Button.isEnabled()) | Verify that the Login button is enabled | 91% |

Fig. 13H

Actions-Per-State Table

| Blueprint State | Blueprint Action | Element Action | |
| --- | --- | --- | --- |
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Set of Translations

| Blueprint Action | Test Case Segment(s) | Score |
| --- | --- | --- |
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| click(Add-To-Cart) | Add the product to cart | 90% |

Fig. 14B

AI Engine comparison between current test case segment and Test Case Segment(s)

| Current Test Case Segment | Test Case Segment(s) | AI-Gen Similarity Score |
| --- | --- | --- |
| Type credentials | Verify that the Login button is enabled | 0.32 |

Fig. 14C

Actions-Per-State Table

| Blueprint State | Blueprint Action | Element Action | |
| --- | --- | --- | --- |
| | | Application Action | Application Element |
| Welcome-State | click(Ruby-on-Rails-Tote) | click | Ruby-on-Rails-Tote |
| | assertTrue(Log-In-Button.isEnabled()) | assertTrue | Log-In-Button |
| | click(Log-In-Button) | click | Log-In-Button |

Set of Translations

| Blueprint Action | Test Case Segment(s) | Score |
| --- | --- | --- |
| click(Ruby-on-Rails-Tote) | Select the Ruby on Rails tote product | 94% |
| | Click the Ruby on Rails tote | 93% |
| | Select the Ruby on Rails tote | 88% |
| assertTrue(Log-In-Button.isEnabled()) | Verify that the Login button is enabled | 91% |
| click(Add-To-Cart) | Add the product to cart | 90% |

Fig. 14D

Rule-based generated description of Blueprint Action

| Blueprint Action | Rule-based generated description |
| --- | --- |
| click(Log-In-Button) | Click a button which can be accessed with the locator link("Login") |

Fig. 14E

AI Engine comparison between test case segment and candidate NL Phrase

| Current Test Case Segment | Candidate NL Phrase | AI-Gen Similarity Score |
| --- | --- | --- |
| Type credentials | Click a button which can be accessed with the locator link("Login") | 0.26 |

Fig. 14F

AI generated image-to-text translation of application element

| Application Element | Image | AI generated NL description |
|---|---|---|
| Log-In-Button | 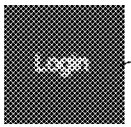 ~ 49 | This is a simple rectangular button with the text "Login" centered on it. |
| Add-To-Cart-Button |  ~ 51 | This is a simple rectangular button with the text "Add To Cart" centered on it. |

System generated description of application element

| Application Element | AI generated NL description |
|---|---|
| Log-In-Button | A button which can be accessed with the locator link("Login") |
| Add-To-Cart-Button | A button which can be accessed with the locator submit("Add to Cart") |

Combined NL description of application element

| Application Element | Combined NL description |
|---|---|
| Log-In-Button | A button which can be accessed with the locator link("Login") and an image of a simple rectangular button with the text "Login" centered on it. |
| Add-To-Cart-Button | A button which can be accessed with the locator submit("Add to Cart") and an image of a simple rectangular button with the text "Add-To-Cart" centered on it. |

Fig. 14G

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

Fig. 14H

Given

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

What is the minimum number of elements used by this test case phrase:
* Type credentials Please give me the number no explanation is expected

Given

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

What is the minimum number of elements used by this test case phrase:
* Type credentials Please give me the number no explanation is expected

Updated Ordered List of Translations

| Order | Test Case Segment | Blueprint Action | Score |
|---|---|---|---|
| 1 | Select this product  ~48 | click(Ruby-on-Rails-Tote) | 21% |

Fig. 15A

Updated Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| | Select this product  ~48 | 21% |
| assertTrue(Log-In-Button.isEnabled()) | Verify that the Login button is enabled | 91% |

Fig. 15B

Elements-Per-State Table
| Blueprint State | Application Element | Script Level Locator |
|---|---|---|
| Welcome-State | Ruby-on-Rails-Tote | image($product) |
| | | image("Ruby on Rails Tote") |
| | | 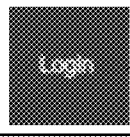 ~ 48 |
| | Log-In-Button | link("Login") |
| | | 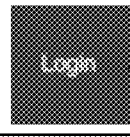 ~ 49 |
| Product-State | Log-In-Button | link ("Login") |
| | | 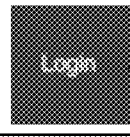 ~ 49 |
| | Add-To-Cart-Button | submit("Add to Cart") |
| | |  ~ 51 |
Fig. 19A Actions-Per-State Table

| Blueprint State | Blueprint Action | Element Action | |
| --- | --- | --- | --- |
| | | Application Action | Application Element |
| Welcome-State | click(Ruby-on-Rails-Tote) | click | Ruby-on-Rails-Tote |
| | click(Log-In-Button) | click | Log-In-Button |

Fig. 19B

Reaction-Per-Action Table

| Blueprint Action | Resulting State |
| --- | --- |
| click(Ruby-on-Rails-Tote) | Product-State |

Fig. 19C

Set of Translations

| Blueprint Action | Test Case Segment(s) | Score |
| --- | --- | --- |
| click(Ruby-on-Rails-Tote) | Select the Ruby on Rails tote product | 94% |
| | Click the Ruby on Rails tote | 93% |
| click(Log-In-Button) | Click log in button | 91% |

Fig. 19D

Ordered List of Actions

| Order | Test Case Segment | Blueprint Action | Score |
| --- | --- | --- | --- |
| | | | |

Fig. 20

Select this product

~ 48

Add the product to cart
Click log in

Segmented Test Case

AI generated image-to-text translation of application element

| Application Element | Image | AI Generated NL Description |
|---|---|---|
| Ruby-on-Rails-Tote | 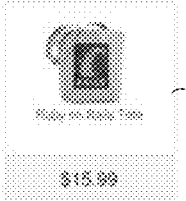 ~ 48 | This is a product display card that includes an image of a "Ruby on Rails Tote," the product name in text, and the price "$15.99" prominently shown below. |

Fig. 21C

NL Conversion of Test Case Segment

| Test Case Segment | NL Description |
|---|---|
| Select this product 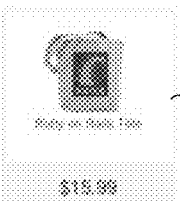 ~ 48 | Select this product which matches this description [This is a product display card that includes an image of a "Ruby on Rails Tote," the product name in text, and the price "$15.99" prominently shown below.] |

Fig. 21D

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| click(Log-In-Button) | Click log in button | 91% |

Fig. 21E

AI Engine comparison between current test case segment and Test Case Segment(s)

| Test Case Segment | Test Case Segment(s) | AI-Gen Similarity Score |
|---|---|---|
| Select this product which matches this description [This is a product display card that includes an image of a "Ruby on Rails Tote," the product name in text, and the price "$15.99" prominently shown below.] | Select the Ruby on Rails tote product | 0.85 |
| | Click the Ruby on Rails tote | 0.70 |
| | Click log in button | 0.20 |

Fig. 21F

Updated Ordered List of Actions

| Order | Test Case Segment | Blueprint Action | Score |
|---|---|---|---|
| 1 | Select this product  ~48 | click(Ruby-on-Rails-Tote) | 85% |

Fig. 21G

Segmented Test Case

| Order | Test Case Segment |
|---|---|
| 1 | Select this product  ~48 |
| 2 | Add the product to cart |
| 3 | Click log in |

Fig. 22A

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| click(Log-In-Button) | Click log in button | 91% |

Fig. 22B

AI Engine comparison between current test case segment and Test Case Segment(s)

| Current Test Case Segment | Test Case Segment(s) | AI-Gen Similarity Score |
|---|---|---|
| Add the product to cart | Click log in button | 0.39 |

Fig. 22C

AI generated image-to-text translation of application element

| Application Element | Image | AI Generated NL Description |
|---|---|---|
| Log-In-Button | 49 | This is a simple rectangular button with the text "Login" centered on it. |
| Add-To-Cart-Button | 51 | This is a simple rectangular button with the text "Add To Cart" centered on it. |

System generated description of application element

| Application Element | AI Generated NL Description |
|---|---|
| Log-In-Button | A button which can be accessed with the locator link("Login") |
| Add-To-Cart-Button | A button which can be accessed with the locator submit("Add to Cart") |

Combined NL description of application element

| Application Element | Combined NL Description |
|---|---|
| Log-In-Button | A button which can be accessed with the locator link("Login") and an image of a simple rectangular button with the text "Login" centered on it. |
| Add-To-Cart-Button | A button which can be accessed with the locator submit("Add to Cart") and an image of a simple rectangular button with the text "Add-To-Cart" centered on it. |

Fig. 22D

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

Fig. 22E

Given

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

What is the minimum number of elements used by this test case phrase:
* Add the product to cart Please give me the number no explanation is expected

Given

A web page consisting in
* A button which can be accessed with the locator link("Login") and an image of a simple rectangular button with the text "Login" centered on it.
* A button which can be accessed with the locator submit("Add to Cart") and an image of a simple rectangular button with the text "Add-To-Cart" centered on it.

What is the minimum number of elements used by this test case phrase:
* Add the product to cart Please give me the number no explanation is expected

Blueprint Actions, each acting on 1 element

| Blueprint Action | NL Description |
| --- | --- |
| click(Log-In-Button) | Click a button which can be accessed with the locator link("Login") and an image of a simple rectangular button with the text "Login" centered on it. |
| click(Add-To-Cart-Button) | Click a button which can be accessed with the locator submit("Add to Cart") and an image of a simple rectangular button with the text "Add To Cart" centered on it. |

Blueprint Actions, each acting on 2 elements

| Blueprint Action | NL Description |
| --- | --- |
| click(Log-In-Button); click(Add-To-Cart-Button) | Click a button which can be accessed with the locator link("Login") and an image of a simple rectangular button with the text "Login" centered on it<br><br>and then<br>click a button which can be accessed with the locator submit("Add to Cart") and an image of a simple rectangular button with the text "Add To Cart" centered on it. |
| click(Add-To-Cart-Button); click(Log-In-Button) | Click a button which can be accessed with the locator submit("Add to Cart") and an image of a simple rectangular button with the text "Add To Cart" centered on it<br><br>and then<br>click a button which can be accessed with the locator link("Login") and an image of a simple rectangular button with the text "Login" centered on it |

Fig. 22H

AI Engine comparison between test case segment and candidate NL Phrases

| Test Case Segment | Candidate NL Phrase | AI-Gen Similarity Score |
|---|---|---|
| Add the product to cart | Click a button which can be accessed with the locator link("Login") and an image of a simple rectangular button with the text "Login" centered on it. | 0.10 |
| | Click a button which can be accessed with the locator submit("Add to Cart") and an image of a simple rectangular button with the text "Add To Cart" centered on it. | 0.90 |
| | Click a button which can be accessed with the locator link("Login") and an image of a simple rectangular button with the text "Login" centered on it<br><br>and then<br>click a button which can be accessed with the locator submit("Add to Cart") and an image of a simple rectangular button with the text "Add To Cart" centered on it. | 0.50 |
| | Click a button which can be accessed with the locator submit("Add to Cart") and an image of a simple rectangular button with the text "Add To Cart" centered on it<br><br>and then<br>click a button which can be accessed with the locator link("Login") and an image of a simple rectangular button with the text "Login" centered on it | 0.50 |

Fig. 22I

Updated Ordered List of Actions

| Order | Test Case Segment | Blueprint Action | Score |
|---|---|---|---|
| 1 | Select this product  | click(Ruby-on-Rails-Tote) | 80% |
| 2 | Add the product to cart | click(Add-To-Cart-Button) | 90% |

Segmented Test Case

| Order | Test Case Segment |
|---|---|
| 1 | Select this product  |
| 2 | Add the product to cart |
| ⇨ 3 | Click log in |

Actions-Per-State Table

| Blueprint State | Blueprint Action | Element Action | |
|---|---|---|---|
| | | Application Action | Application Element |
| Welcome-State | click(Ruby-on-Rails-Tote) | click | Ruby-on-Rails-Tote |
| | click(Log-In-Button) | click | Log-In-Button |

Set of Translations

| Blueprint Action | Test Case Segment(s) | Score |
|---|---|---|
| click(Ruby-on-Rails-Tote) | Select the Ruby on Rails tote product | 94% |
| | Click the Ruby on Rails tote | 93% |
| click(Log-In-Button) | Click log in button | 91% |

Fig. 23B

AI Engine comparison between test case segment and candidate NL Phrases

| Test Case Segment | Candidate NL Phrases | AI-Gen Similarity Score |
|---|---|---|
| Click log in | Click log in button | 0.90 |

Fig. 23C

Updated Ordered List of Actions

| Order | Test Case Segment | Blueprint Action | Score |
|---|---|---|---|
| 1 | Select this product 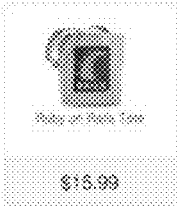 | click(Ruby-on-Rails-Tote) | 80% |
| 2 | Add the product to cart | click(Add-To-Cart-Button) | 90% |
| 3 | Click log in | click(Log-In-Button) | 90% |

Fig. 23D

Mapping from Blueprint Actions to Test Script

| Order | Blueprint Action | Test Script (Test Designer) |
|---|---|---|
| 1 | click(Ruby-on-Rails-Tote) | click(image($product)) |
| 2 | click(Add-To-Cart-Button) | click(submit("Add to Cart")) |
| 3 | click(Log-In-Button) | click(link ("Login")) |

Fig. 23E

Set of Translations (in the context of an automobile insurance)

| Blueprint Action | Test Case Segment(s) | Score |
|---|---|---|
| setValue(formID-Field,$formID) | Fill the claim form | 94% |
| | Complete the claim form | 89% |
| setValue(insuranceID-Field,$InsuranceID) | | |
| setValue(accident-Date-Field,$AccidentDateID) | | |
| setValue(license-number-Field,$LicenseID) | | |
| setValue(at-Fault-Field,$AtFaultID) | | |
| ... | ... | ... |

Set of Translations (in the context of a homeowner's insurance)

| Blueprint Action | Test Case Segment(s) | Score |
|---|---|---|
| setValue(formID-Field,$formID) | Fill the claim form | 89% |
| | Complete the claim form | 93% |
| setValue(insuranceID-Field,$InsuranceID) | | |
| setValue(Incident-Date-Field,$IncidentDateID) | | |
| setValue(Incident-Type-Field, $IncidentTypeID) | | |
| setValue(Address-Field, $AddressID) | | |
| setValue(Claim-Amount, $ClaimAmountID) | | |
| ... | ... | ... |

Fig. 26

METHODS FOR CREATING TEST SCRIPTS AND/OR UPDATING A MODEL OF AN APPLICATION

RELATED APPLICATIONS

This application is a non-provisional patent application of and claims priority to U.S. Provisional Application No. 63/570,373, filed 27 Mar. 2024, and U.S. Provisional Application No. 63/562,602, filed 7 Mar. 2024, both of which are incorporated by reference herein in their respective entireties.

FIELD OF THE INVENTION

The present invention relates to methods for creating test scripts and/or updating a model of an application, and more specifically relates to:
- methods for (1) constructing a test script from a test case and a time-evolving model of an application, and (2) updating the time-evolving model of the application
- methods for constructing a test script from a test case and a model of an application
- methods for updating a time-evolving model of an application

SUMMARY OF THE INVENTION

In accordance with one embodiment of the invention, a natural language test case for an application is automatically converted into a test script by a test script generator. During the generation of the test script, the test script generator may access a blueprint of the application. The blueprint may include a time-evolving model of the application, which may include a set of translations and a state machine model of the application. The state machine model may include a state space and a set of state transitions. The state space may be characterized by an elements-per-state table. The set of state transitions may be characterized by an actions-per-state table and a reaction-per-action table. During the test script generation process, the blueprint may be continually updated to include new knowledge of the application, as new pages of the application are traversed. Further, the test script generator may communicate with an artificial intelligence (AI) engine in order to determine the semantic similarity between two phrases, convert images into textual description, and perform tasks requiring the use of a large language model (LLM). In accordance with one embodiment of the invention, a method (1) constructs a test script from a test case and a time-evolving model of an application, the time-evolving model including a set of translations and a state machine, in which states correspond to pages of the application and edges correspond to actions that are performed to transition from one of the pages to another one of the pages of the application or are performed within one of the pages, and (2) updates the time-evolving model of the application.

The method may comprise:
(a) initializing a variable to store an ordered list of translations;
(b) receiving the test case;
(c) segmenting the test case into an ordered list of test case segments;
(d) navigating to a current application window of the application;
(e) assigning an initial test case segment in the ordered list of test case segments as a current test case segment;
(f) based on a collection of application elements present in the current application window, determining whether a first state exists in the state machine that corresponds to the current application window;
(g) if the first state does not exist, creating a new state that is defined by the collection of application elements present in the current application window, modifying the state machine to incorporate the new state, and assigning the new state as a current state;
(h) if the first state exists, assigning the first state as the current state;
(i) attempting to determine a current action that originates from the current state and sufficiently corresponds to the current test case segment;
(j) if the current action cannot be determined, aborting the method for constructing the test script;
(k) if the current action is determined, appending a translation to the ordered list of translations, the translation including a mapping between the current action and the current test case segment, and executing the current action in the current application window to navigate to a subsequent application window;
(l) determining whether a subsequent test case segment exists in the ordered list of test case segments;
(m) if the subsequent test case segment exists in the ordered list of test case segments, assigning the subsequent application window as the current application window, assigning the subsequent test case segment as the current test case segment, and repeating steps (f) through (m) until the method for constructing the test script has been aborted or no subsequent test case segment exists in the ordered list of test case segments; and
(n) if the subsequent test case segment does not exist in the ordered list of test case segments and the method for constructing the test script has not been aborted, generating the test script based on respective actions contained within the ordered list of translations and executing the test script on the application.

In one embodiment, the translation may further include a similarity score between the current action and the current test case segment. In one embodiment, the method may further include generating a first representation of the current action that can be processed by an artificial intelligence (AI) engine, and computing the similarity score between the current action and the current test case segment based on a similarity between the first representation of the current action and the current test case segment.

In one embodiment, the method may further include, if the current action cannot be identified and the ordered list of translations includes at least one translation, penalizing all similarity scores in the ordered list of translations and updating the set of translations from the time-evolving model to include translations from the ordered list of translations. In one embodiment, penalizing all similarity scores in the ordered list of translations may include computing a penalty factor equal to a total number of successfully translated test case segments divided by a total number of test case segments in the ordered list of test case segments.

In one embodiment, the method may further include, if no subsequent test case segment exists in the ordered list of test case segments and the method for constructing the test script has not been aborted, rewarding all similarity scores in the ordered list of translations and updating the set of translations from the time-evolving model to include translations from the ordered list of translations.

In one embodiment, attempting to determine the current action originating from the current state that sufficiently corresponds to the current test case segment may include:

if the current test case segment contains images, modifying the current test case segment by replacing each of the images within the current test case segment with a textual description of the image;

determining whether any existing actions originating from the current state and belonging to the set of translations sufficiently correspond to the current test case segment;

if one or more existing actions originating from the current state and belonging to the set of translations sufficiently correspond to the current test case segment, returning a first one of the or more existing actions that best matches the current test case segment as the current action;

otherwise, if no existing actions originating from the current state and belonging to the set of translations sufficiently correspond to the current test case segment, attempting to create a new action originating from the current state that sufficiently corresponds to the current test case segment;

if the new action cannot be created, failing to determine the current action; and otherwise, if the new action is created, modifying the state machine to include the new action originating from the current state and returning the new action as the current action.

In one embodiment, attempting to create the new action originating from the current state that sufficiently corresponds to the current test case segment may include:

determining whether any previously translated actions from the set of translations sufficiently correspond to the current test case segment and reference only application elements contained within the collection of application elements; and if one or more previously translated actions from the set of translations sufficiently correspond to the current test case segment and reference only application elements contained within the collection of application elements, returning a copy of a first one of the previously translated actions that best matches the current test case segment as the new action originating from the current state;

otherwise, failing to create the new action.

In one embodiment, attempting to create the new action originating from the current state that sufficiently corresponds to the current test case segment may include:

determining whether any actions of the state machine that are not included in the set of translations sufficiently correspond to the current test case segment and reference only application elements contained within the collection of application elements; and if one or more actions of the state machine that are not included in the set of translations sufficiently correspond to the current test case segment and reference only application elements contained within the collection of application elements, returning a first one of the one or more actions of the state machine that best matches the current test case segment as the new action originating from the current state;

otherwise, failing to create the new action.

In one embodiment, attempting to create the new action originating from the current state that sufficiently corresponds to the current test case segment may include:

determining a textual description corresponding to each of the application elements present in the current application window;

selecting a subset of application elements within the collection of application elements that are present in the first application window;

creating one or more candidate actions based on the textual description corresponding to ones of the application elements within the subset of application elements;

determining whether any of the one or more candidate actions sufficiently correspond to the current test case segment; and if at least one of the one or more candidate actions sufficiently corresponds to the current test case segment, returning a first one of the candidate actions that best matches the current test case segment as the new action;

otherwise, if none of the candidate actions sufficiently corresponds to the current test case segment, failing to create the new action.

In one embodiment, the test case segment comprises one or more of a natural language (NL) phrase or an image.

In accordance with one embodiment of the invention, a method constructs a test script from a test case and a model of an application, the model including a set of translations and a state machine, in which states correspond to pages of the application and edges correspond to actions that are performed to transition from one of the pages to another one of the pages of the application or are performed within one of the pages.

In one embodiment, the method may include:

(a) initializing a variable to store an ordered list of actions;
(b) receiving the test case;
(c) segmenting the test case into an ordered list of test case segments;
(d) navigating to a current application window of the application;
(e) assigning an initial test case segment in the ordered list of test case segments as a current test case segment;
(f) based on a collection of application elements present in the current application window, determining whether a first state exists in the state machine that corresponds to the current application window;
(g) if the first state does not exist:
 attempting to determine a new action that sufficiently corresponds to the current test case segment;
 if the new action cannot be determined, aborting the method for constructing the test script;
 otherwise, if the new action is determined, appending the new action to the ordered list of actions, and executing the new action in the current application window to navigate to a subsequent application window;
(h) if the first state exists:
 assigning the first state as a current state;
 attempting to determine a current action that originates from the current state and sufficiently corresponds to the current test case segment;
 if the current action cannot be determined, aborting the method for constructing the test script; and
 if the current action is determined, appending a translation to the ordered list of actions, and executing the current action in the current application window to navigate to a subsequent application window;
(i) determining whether a subsequent test case segment exists in the ordered list of test case segments;

(j) if the subsequent test case segment exists in the ordered list of test case segments, assigning the subsequent application window as the current application window, assigning the subsequent test case segment as the current test case segment, and repeating steps (f) through (j) until the method for constructing the test script has been aborted or no subsequent test case segment exists in the ordered list of test case segments; and (k) if the subsequent test case segment does not exist in the ordered list of test case segments and the method for constructing the test script has not been aborted, generating the test script based the ordered list of actions and executing the test script on the application.

In one embodiment, the translation further includes a similarity score between the current action and the current test case segment. In one embodiment, the method further includes generating a first representation of the current action that can be processed by an artificial intelligence (AI) engine, and computing the similarity score between the current action and the current test case segment based on a similarity between the first representation of the current action and the current test case segment.

In one embodiment, attempting to determine the current action originating from the current state that sufficiently corresponds to the current test case segment includes:

determining whether any existing actions originating from the current state and belonging to the set of translations sufficiently corresponds to the current test case segment;

if one or more existing actions originating from the current state and belonging to the set of translations sufficiently correspond to the current test case segment, returning a first one of the or more existing actions that best matches the current test case segment as the current action;

otherwise, if no existing actions originating from the current state and belonging to the set of translations sufficiently corresponds to the current test case segment, attempting to create a new action originating from the current state that sufficiently corresponds to the current test case segment;

if the new action cannot be created, failing to determine the current action; and otherwise, if the new action is created, returning the new action as the current action.

In one embodiment, attempting to create the new action originating from the current state that sufficiently corresponds to the current test case segment includes:

determining whether any previously translated actions from the set of translations sufficiently correspond to the current test case segment and reference only application elements contained within the collection of application elements; and if one or more previously translated action from the set of translations sufficiently correspond to the current test case segment and reference only application elements contained within the collection of application elements, returning a copy of a first one of the previously translated actions that best matches the current test case segment as the new action originating from the current state;

otherwise, failing to create the new action.

In one embodiment, attempting to create the new action originating from the current state that sufficiently corresponds to the current test case segment may include:

determining whether any actions of the state machine that are not included in the set of translations sufficiently correspond to the current test case segment and reference only application elements contained within the collection of application elements; and if one or more actions of the state machine that are not included in the set of translations sufficiently correspond to the current test case segment and reference only application elements contained within the collection of application elements, returning a first one of the one or more actions of the state machine that best matches the current test case segment as the new action originating from the current state;

otherwise, failing to create the new action.

In one embodiment, attempting to create the new action originating from the current state that sufficiently corresponds to the current test case segment may include:

determining a textual description corresponding to each of the application elements present in the current application window;

selecting a subset of application elements within the collection of application elements that are present in the first application window;

creating one or more candidate actions based on the textual description corresponding to ones of the application elements within the subset of application elements;

determining whether any of the one or more candidate actions sufficiently correspond to the current test case segment; and if at least one of the one or more candidate actions sufficiently corresponds to the current test case segment, returning a first one of the candidate actions that best matches the current test case segment as the new action;

otherwise, if none of the candidate actions sufficiently corresponds to the current test case segment, failing to create the new action.

In one embodiment, the test case segment comprises one or more of a natural language (NL) phrase or an image.

In accordance with one embodiment of the invention, a method updates a time-evolving model of an application, the time-evolving model including a set of translations and a state machine, in which states correspond to pages of the application and edges correspond to actions that are performed to transition from one of the pages to another one of the pages of the application or are performed within one of the pages.

The method may include:

(a) initializing a variable to store an ordered list of translations;

(b) receiving a test case;

(c) segmenting the test case into an ordered list of test case segments;

(d) navigating to a current application window of the application;

(e) assigning an initial test case segment in the ordered list of test case segments as a current test case segment;

(f) based on a collection of application elements present in the current application window, determining whether a first state exists in the state machine that corresponds to the current application window;

(g) if the first state does not exist, creating a new state that is defined by the collection of application elements present in the current application window, modifying the state machine to incorporate the new state, and assigning the new state as a current state;

(h) if the first state exists, assigning the first state as the current state;

(i) attempting to determine a current action that originates from the current state and sufficiently corresponds to the current test case segment;

(j) if the current action cannot be determined, aborting the method for updating the time-evolving model of the application;

(k) if the current action is determined, appending a translation to the ordered list of translations, the translation including a mapping between the current action and the current test case segment, and executing the current action in the current application window to navigate to a subsequent application window;

(l) determining whether a subsequent test case segment exists in the ordered list of test case segments;

(m) if the subsequent test case segment exists in the ordered list of test case segments, assigning the subsequent application window as the current application window, assigning the subsequent test case segment as the current test case segment, and repeating steps (f) through (m) until the method for updating the time-evolving model of the application has been aborted or no subsequent test case segment exists in the ordered list of test case segments; and (n) if the subsequent test case segment does not exist in the ordered list of test case segments and the method for updating the time-evolving model of the application has not been aborted, returning the updated time-evolving model of the application.

In one embodiment, the translation may further include a similarity score between the current action and the current test case segment. In one embodiment, the method may further include generating a first representation of the current action that can be processed by an artificial intelligence (AI) engine, and computing the similarity score between the current action and the current test case segment based on a similarity between the first representation of the current action and the current test case segment.

In one embodiment, the method may further include, if the current action cannot be identified and the ordered list of translations includes at least one translation, penalizing all similarity scores in the ordered list of translations and updating the set of translations from the time-evolving model to include translations from the ordered list of translations. In one embodiment, the method may further include penalizing all similarity scores in the ordered list of translations includes computing a penalty factor equal to a total number of successfully translated test case segments divided by a total number of test case segments in the ordered list of test case segments.

In one embodiment, the method may further include, if no subsequent test case segment exists in the ordered list of test case segments and the method for updating the time-evolving model of the application has not been aborted, rewarding all similarity scores in the ordered list of translations and updating the set of translations from the time-evolving model to include translations from the ordered list of translations.

In one embodiment, attempting to determine the current action originating from the current state that sufficiently corresponds to the current test case segment may include:

if the current test case segment contains images, modifying the current test case segment by replacing each of the images within the current test case segment with a textual description of the image;

determining whether any existing actions originating from the current state and belonging to the set of translations sufficiently corresponds to the current test case segment;

if one or more existing actions originating from the current state and belonging to the set of translations sufficiently correspond to the current test case segment, returning a first one of the or more existing actions that best matches the current test case segment as the current action;

otherwise, if no existing actions originating from the current state and belonging to the set of translations sufficiently corresponds to the current test case segment, attempting to create a new action originating from the current state that sufficiently corresponds to the current test case segment;

if the new action cannot be created, failing to determine the current action; and otherwise, if the new action is created, modifying the state machine to include the new action originating from the current state and returning the new action as the current action.

In one embodiment, attempting to create the new action originating from the current state that sufficiently corresponds to the current test case segment may include:

determining whether any previously translated actions from the set of translations sufficiently correspond to the current test case segment and reference only application elements contained within the collection of application elements; and if one or more previously translated action from the set of translations sufficiently correspond to the current test case segment and reference only application elements contained within the collection of application elements, returning a copy of a first one of the previously translated actions that best matches the current test case segment as the new action originating from the current state;

otherwise, failing to create the new action.

In one embodiment, attempting to create the new action originating from the current state that sufficiently corresponds to the current test case segment may include:

determining whether any actions of the state machine that are not included in the set of translations sufficiently correspond to the current test case segment and reference only application elements contained within the collection of application elements; and if one or more actions of the state machine that are not included in the set of translations sufficiently correspond to the current test case segment and reference only application elements contained within the collection of application elements, returning a first one of the one or more actions of the state machine that best matches the current test case segment as the new action originating from the current state;

otherwise, failing to create the new action.

In one embodiment, attempting to create the new action originating from the current state that sufficiently corresponds to the current test case segment may include:

determining a textual description corresponding to each of the application elements present in the current application window;

selecting a subset of application elements within the collection of application elements that are present in the first application window;

creating one or more candidate actions based on the textual description corresponding to ones of the application elements within the subset of application elements;

determining whether any of the one or more candidate actions sufficiently correspond to the current test case segment; and if at least one of the one or more candidate actions sufficiently corresponds to the current test case segment, returning a first one of the candidate actions that best matches the current test case segment as the new action;

otherwise, if none of the candidate actions sufficiently corresponds to the current test case segment, failing to create the new action.

In one embodiment, the test case segment comprises one or more of a natural language (NL) phrase or an image.

These and other embodiments of the invention are more fully described in association with the drawings below.

BRIEF DESCRIPTION OF THE DRAWINGS

FIGS. 2B-2F depict screenshots of various webpages of the website, enlarged in comparison to the screenshots depicted in FIG. 2A.

FIG. 3C depicts an example test script in programming language format.

FIG. 3D depicts an example table that maps variables to variable values, the table for use by a test script.

FIG. 3E depicts an example test case in a human readable format, which could include text and images.

FIG. 6A depicts an example elements-per-state table, in accordance with one embodiment of the invention.

FIG. 6B depicts an example actions-per-state table, in accordance with one embodiment of the invention.

FIG. 6C depicts an example reaction-per-action table, in accordance with one embodiment of the invention.

FIG. 6D depicts an example set of translations, in accordance with one embodiment of the invention.

FIG. 7A depicts a table for storing an ordered list of translations, immediately after initialization, in accordance with one embodiment of the invention.

FIG. 7B depicts the test case of FIG. 3E being segmented into test case segments and an indication of the current test case segment, in accordance with one embodiment of the invention.

FIGS. 7C-7D depict an example of a process for determining a current action that matches the current test case segment, in accordance with one embodiment of the invention.

FIG. 7E depicts the ordered list of translations after a translation has been appended to the ordered list of translations, in accordance with one embodiment of the invention.

FIG. 7F depicts the set of translations after being updated to include the mapping between the current action and the current test case segment, in accordance with one embodiment of the invention.

FIG. 8A depicts the test case segments with the indication of the current test case segment advanced from the previously processed test case segment, in accordance with one embodiment of the invention.

FIGS. 8B-8L depict an example of a process for determining a current action that matches the current test case segment, in accordance with one embodiment of the invention.

FIG. 8M depicts the actions-per-state table being updated to include a newly created action for an existing state, in accordance with one embodiment of the invention.

FIG. 8N depicts the ordered list of translations after a translation has been appended to the ordered list of translations, in accordance with one embodiment of the invention.

FIG. 8O depicts the set of translations after being updated to include the mapping between the current action and the current test case segment, in accordance with one embodiment of the invention.

FIG. 9A depicts the test case segments with the indication of the current test case segment advanced from the previously processed test case segment, in accordance with one embodiment of the invention.

FIGS. 9B-9C depict an example of a process for determining a current action that matches the current test case segment, in accordance with one embodiment of the invention.

FIG. 9D depicts the actions-per-state table after being updated to include a newly created action for an existing state, in accordance with one embodiment of the invention.

FIG. 9E depicts the ordered list of translations after a translation has been appended to the ordered list of translations, in accordance with one embodiment of the invention.

FIG. 9F depicts the set of translations after being updated to include the mapping between the current action and the current test case segment, in accordance with one embodiment of the invention.

FIG. 10A depicts the test case segments with the indication of the current test case segment advanced from the previously processed test case segment, in accordance with one embodiment of the invention.

FIGS. 10B-10H depict an example of a process for determining a current action that matches the current test case segment, in accordance with one embodiment of the invention.

FIG. 10I depicts the actions-per-state table after being updated to include a newly created action for an existing state, in accordance with one embodiment of the invention.

FIG. 10J depicts the ordered list of translations after a translation has been appended to the ordered list of translations, in accordance with one embodiment of the invention.

FIG. 10K depicts the set of translations after being updated to include the mapping between the current action and the current test case segment, in accordance with one embodiment of the invention.

FIG. 11A depicts the test case segments with the indication of the current test case segment advanced from the previously processed test case segment, in accordance with one embodiment of the invention.

FIG. 11B depicts an example of adding a new state to the elements-per-state table, in accordance with one embodiment of the invention.

FIGS. 11C-11H depict an example of a process for determining a current action that matches the current test case segment, in accordance with one embodiment of the invention.

FIG. 11I depicts the actions-per-state table after being updated to include a newly created action for an existing state, in accordance with one embodiment of the invention.

FIG. 11J depicts the ordered list of translations after a translation has been appended to the ordered list of translations, in accordance with one embodiment of the invention.

FIG. 11K depicts the set of translations after being updated to include the mapping between the current action and the current test case segment, in accordance with one embodiment of the invention.

FIG. 11L depicts the creation of a test script from the ordered list of translations depicted in FIG. 11J, in accordance with one embodiment of the invention.

FIG. 12A depicts the ordered list of translations after all similarity scores have been "rewarded" (or increased) in the ordered list of translations, in accordance with one embodiment of the invention.

FIG. 12B depicts the set of translations after the similarity scores of ones of the translations have been updated in accordance with their updated scores in the ordered list of translations from FIG. 12A, in accordance with one embodiment of the invention.

FIGS. 13C-13F depict an example of a process for determining a current action that matches the current test case segment, in accordance with one embodiment of the invention.

FIG. 13G depicts the ordered list of translations after a translation has been appended to the ordered list of translations, in accordance with one embodiment of the invention.

FIG. 13H depicts the set of translations after being updated to include the mapping between the current action and the current test case segment, in accordance with one embodiment of the invention.

FIG. 14B-14J depict an example of a process in which the determination of a current action that matches the current test case segment fails, in accordance with one embodiment of the invention.

FIG. 15A depicts the ordered list of translations after all similarity scores have been "penalized" (or decreased) in the ordered list of translations, in accordance with one embodiment of the invention.

FIG. 15B depicts the set of translations after the similarity scores of ones of the translations have been updated in accordance with their updated scores in the ordered list of translations from FIG. 15A, in accordance with one embodiment of the invention.

FIG. 19A depicts an example elements-per-state table, in accordance with one embodiment of the invention.

FIG. 19B depicts an example actions-per-state table, in accordance with one embodiment of the invention.

FIG. 19C depicts an example reaction-per-action table, in accordance with one embodiment of the invention.

FIG. 19D depicts an example set of translations, in accordance with one embodiment of the invention.

FIG. 20 depicts a table for storing an ordered list of actions, immediately after initialization, in accordance with one embodiment of the invention.

FIGS. 21C-21F depict an example of a process for determining a current action that matches the current test case segment, in accordance with one embodiment of the invention.

FIG. 21G depicts the ordered list of actions after a translation has been appended to the ordered list of actions, in accordance with one embodiment of the invention.

FIG. 22A depicts test case segments with the indication of the current test case segment advanced from the previously processed test case segment, in accordance with one embodiment of the invention.

FIGS. 22B-22I depict an example of a process for determining a current action that matches the current test case segment, in accordance with one embodiment of the invention.

FIGS. 23B-23C depict an example of a process for determining a current action that matches the current test case segment, in accordance with one embodiment of the invention.

FIG. 23D depicts the ordered list of actions after a translation has been appended to the ordered list of actions, in accordance with one embodiment of the invention.

FIG. 23E depicts the creation of a test script from the ordered list of actions depicted in FIG. 23D, in accordance with one embodiment of the invention.

FIG. 26 depicts additional examples of sets of translations to illustrate the versatility of blueprints, in accordance with one embodiment of the invention.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1A:
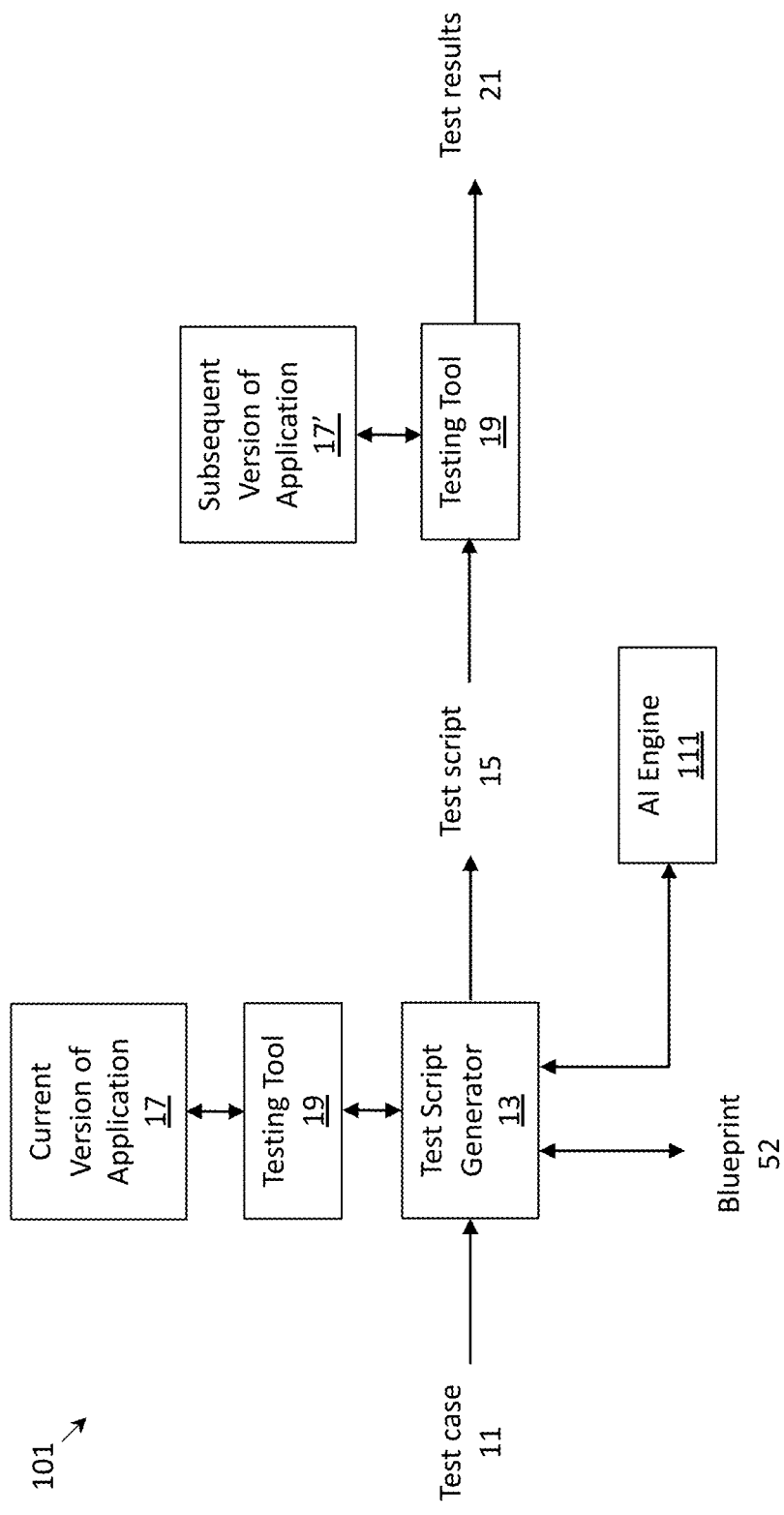
FIG. 1A depicts an example system for automatically generating a test script from a test case and a current version of an application and using that test script to test a future version of the application, in accordance with one embodiment of the invention.

FIG. 1A depicts an example system 101 for automatically generating a test script 15 from a test case 11 and a current version of an application 17 and using that test script 15 to test a subsequent version of the application 17'. As will be described in detail below, a test script generator 13 may be used to generate a test script 15 from a test case 11. Test case 11 may be expressed in a natural language and may or may not include images. During the test script generation process, test script generator 13 may convert individual commands of the test case into individual commands of a test script 15. Such conversion may rely upon a current version of application 17 as well as a "blueprint" 52 of the application 17, which at an abstract level, represent snapshots of states (e.g., pages, webpages) of application 17 for a particular browser (e.g., Chrome, Safari, Firefox, etc.) and particular machine (e.g., desktop, laptop, mobile device, etc.). Further, blueprint 52 of the application 17 may translate user commands (e.g., high-level commands, shorthand, etc.) into specific (detailed) commands in the context of application 17. An example of such translation is provided below in FIG. 26, and the discussion of FIG. 26 will be provided at the end of the description after the invention has been described more fully. During the conversion process, blueprint 52 may be augmented with new snapshots of states of application 17. Blueprint 52 will be described more completely below in FIG. 4, and numerous examples of blueprint 52 will be provided in the description to follow.

Test script generator 13 may also communicate with an artificial intelligence (AI) engine 111 in order to determine the semantic similarity between two phrases, convert images into textual description, and perform tasks requiring the use of a large language model (LLM). Examples of AI engine 111 include ChatGPT® from Open AI® of San Francisco, CA and Deepseek® from Deepseek of Hangzhou, Zhejiang, China.

Test script generator 13 may communicate with application 17 via testing tool 19. More specifically, test script generator 13 may provide a line of a test script to testing tool 19, and testing tool 19 may operate application 17 in accordance with that line. Then, information from application 17 may be collected by the testing tool 19 (e.g., elements in the form of text and visual locators), and that information may be provided back to the test script generator 13. Such process may be repeated each time test script generator 13 seeks to operate application 17 in order to observe a response of application 17 to an action. Testing tool 19 may also be known as an application client. Examples of testing tool 19 include Selenium®, Playright®, Appvance® Test Designer, Sahi® and Appium®.

Once generated, test script 15 may be provided to testing tool 19 (which may be distinct from the other instance of the testing tool) which performs a regression test on a subsequent version of application 17'. In the typical software development process, certain features may be modified and/or added to application 17, and a test engineer desires to find out, using test script 15, whether the features that were working in the current version of application 17 are still working in the subsequent version of application 17'. If not, that would be called a "regression" in the application. If not already understood, an assumption is made that those features that test script 15 is testing for are necessarily working in the current version of application 17; otherwise, if that were not the case, the generation of the test script 15 would have failed. The results of the testing 21 may include that all features of application 17' were successfully executed, one or more of the features were successfully executed, or none of the features were successfully executed.

Figure 1B:
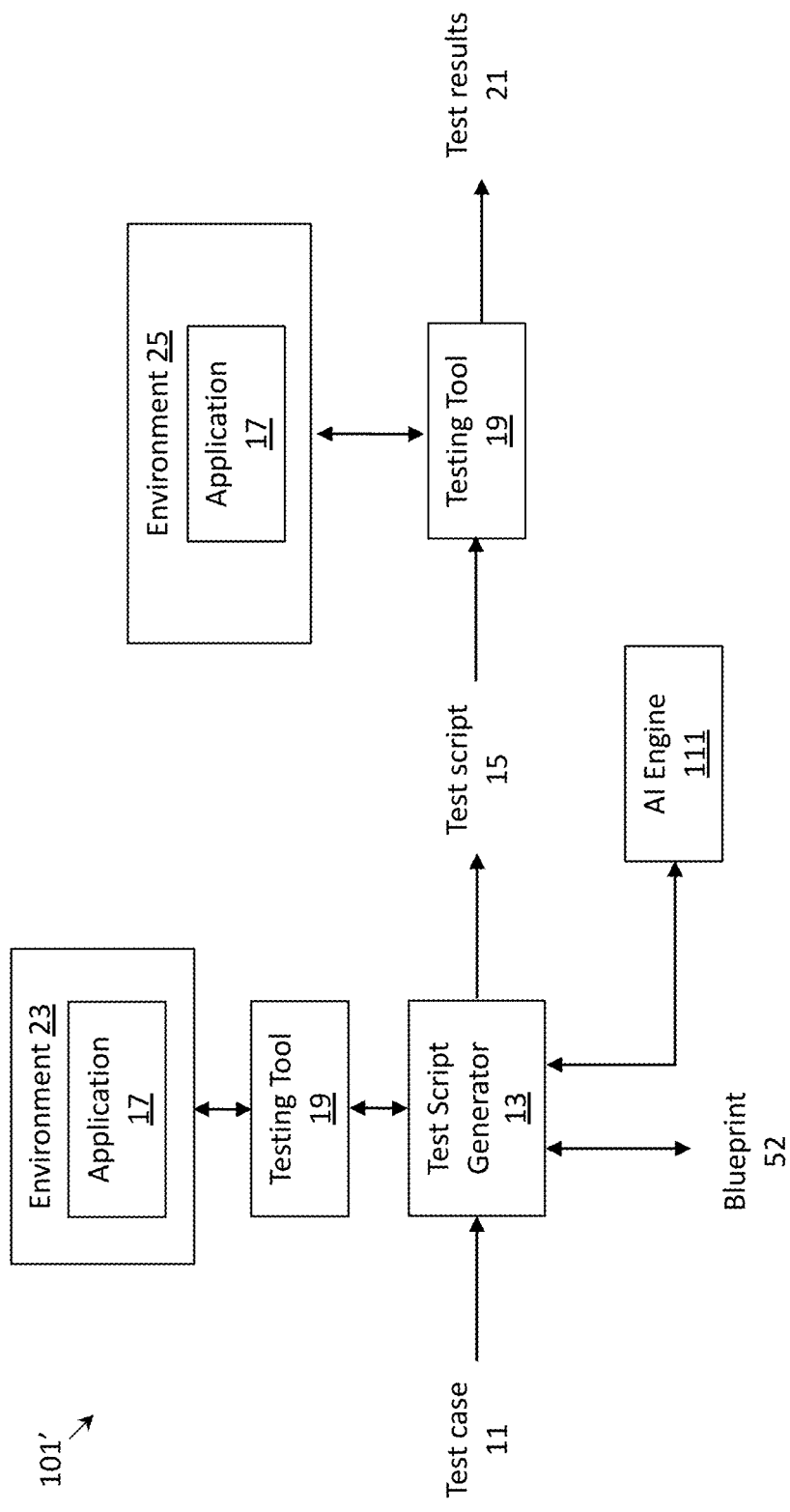
FIG. 1B depicts an example system for automatically generating a test script from a test case and an application executing in a first environment and using that test script to test the application executing in a second environment, in accordance with one embodiment of the invention.

FIG. 1B depicts an example system 101' for automatically generating a test script 15 from a test case 11 and an application 17 executing in environment 23 and using that test script 15 to test the same application 17 executing in environment 25 that is different from environment 23. In one embodiment, the environment 23 may be a quality assurance (QA) environment, and environment 25 may be a production environment. In another embodiment, the environment 23 may be an internal company environment, and second environment 25 may be one or more customer environments. For clarity, it is noted that there may not be a one-to-one relationship between a company environment to a corresponding (single) customer environment; rather, there may be a one-to-many relationship between a company environment and many corresponding customer environments. The remainder of system 101' is identical to system 101, so the remainder of the components will not be described in detail for the sake of conciseness.

For clarity of description, a simplified website is described which will be used as an example of application 17 or application 17' in order to more clearly explain the test script generation and testing processes. For a website, it is noted that the browser running on a client device and the web server that provides web content to the browser together may be regarded as application 17 or application 17'. It is expected that based on such explanation, the reader will be able to apply the techniques of various embodiments of the invention to various applications, including more complex websites, web applications, non-web applications, and enterprise software.

Figure 2A:
FIG. 2A depicts a diagram of a portion of the structure of a simplified website including a plurality of webpages.

FIG. 2A depicts a diagram of a portion of the structure of a simplified website including a plurality of webpages. Webpage 10 may be regarded as the "home page" of the website.

Figure 2B:
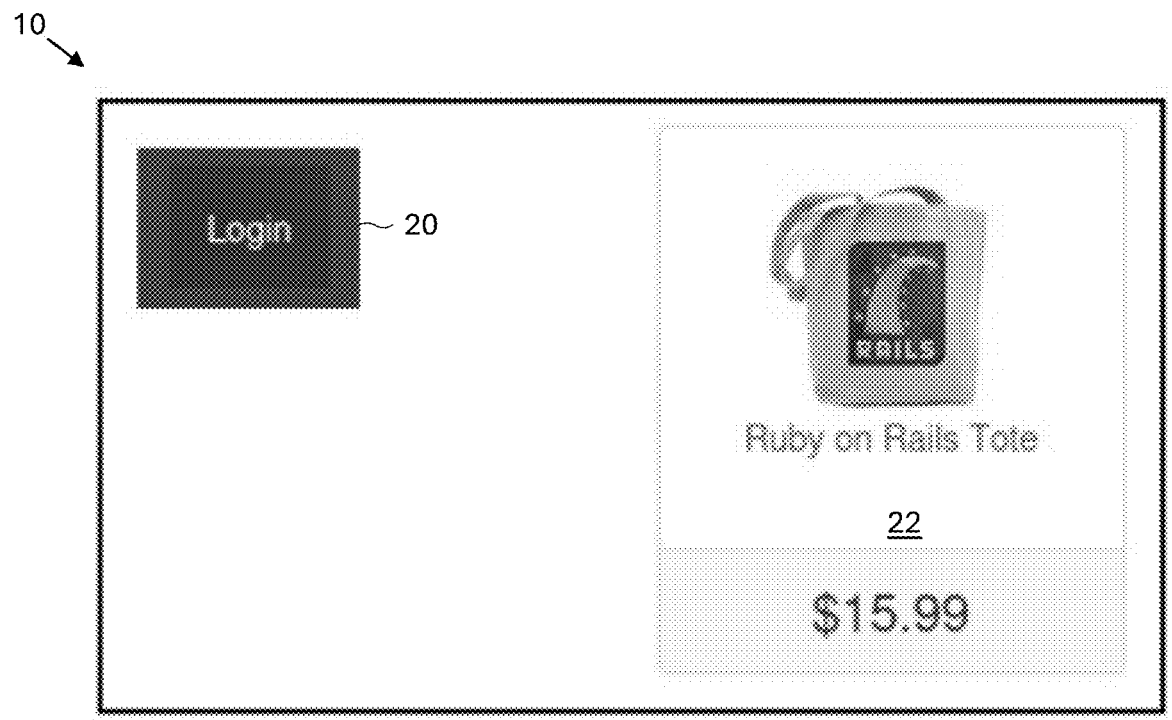

FIG. 2B depicts a screenshot with a magnified view of webpage 10, in which the user may be provided the option to login to his/her account, by selecting the login button 20 or select the Ruby-on-Rails-Tote product, by selecting the Ruby-on-Rails-Tote object 22. For the sake of ease of depiction and description, only a single product object is displayed in webpage 10, but it should be understood that in practice, may other product objects may be displayed. Returning to FIG. 2A, selection of Ruby-on-Rails-Tote object 22 may lead to webpage 12, in which additional details of the Ruby on Rails Tote may be displayed, along with an option to purchase this item.

Figure 2C:
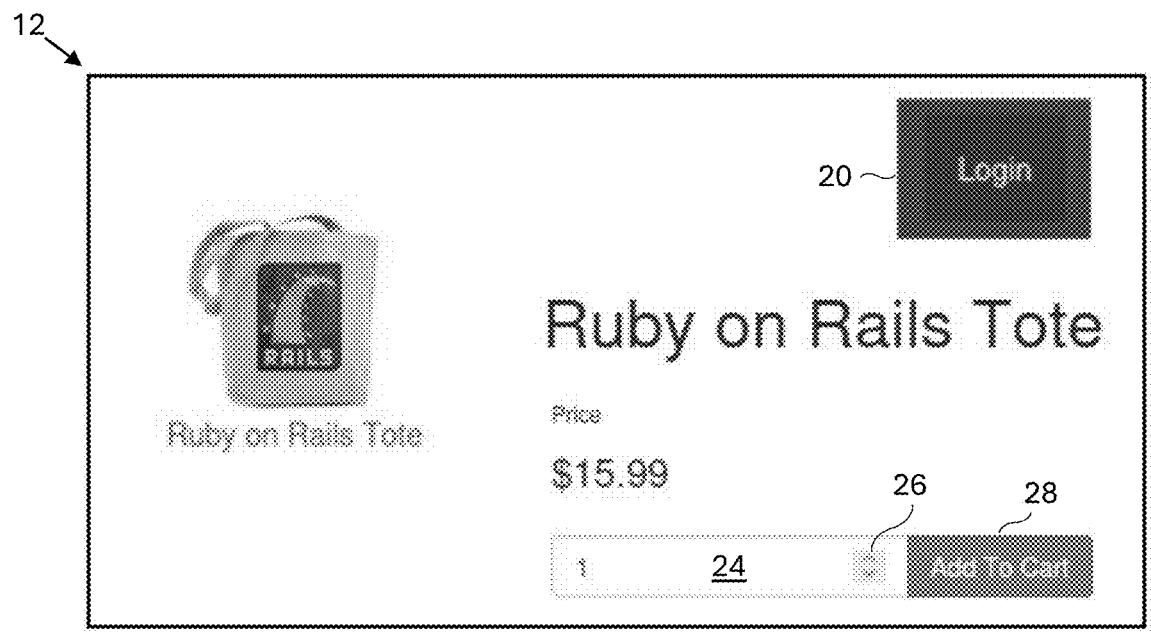

FIG. 2C depicts a screenshot with a magnified view of webpage 12, in which the user may again be provided the option to login to his/her account, by selecting the login button 20. In webpage 12, the user may directly input a quantity of the Ruby on Rails Totes that he/she desires to purchase in textbox 24. Alternatively, the user may utilize up (or down) arrows 26 to increase (or decrease) the number of Ruby on Rails Totes that he/she desires to purchase by one, respectively. Returning to FIG. 2A, selection of the Add-To-Cart button 28 may lead to webpage 14, in which a list of items in the shopping cart of the user is displayed, along with the individual prices and total price of all the individual items in the shopping cart.

Figure 2D:
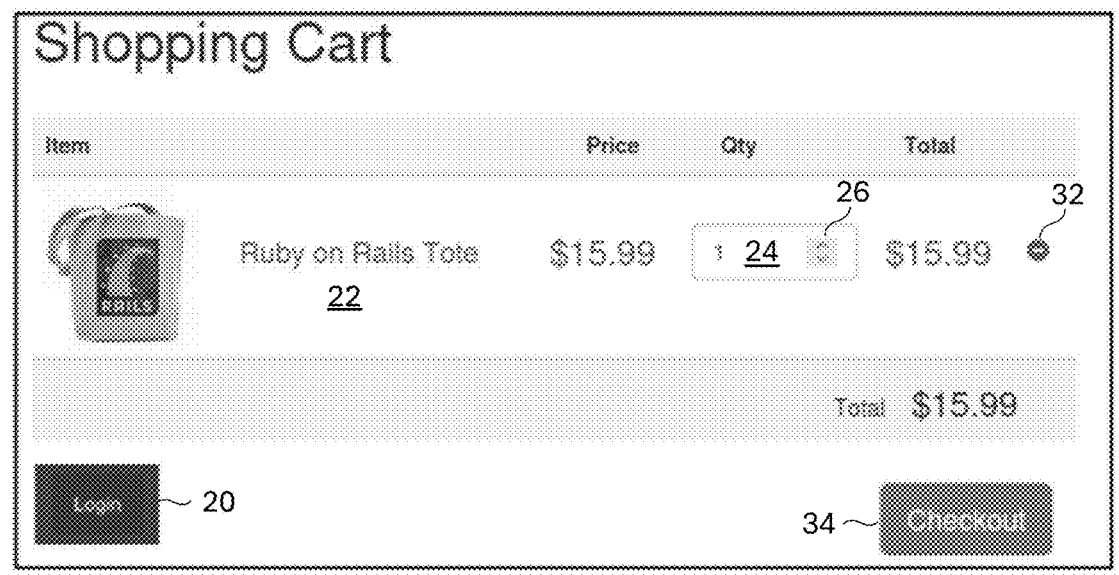

FIG. 2D depicts a screenshot with a magnified view of webpage 14, in which the user may again be provided the option to login to his/her account, by selecting the login button 20. In the example of FIG. 2D, only the Ruby on Rails Tote product is present in the shopping cart of the user. In webpage 14, the user may have a further opportunity to modify the quantity of the Ruby on Rails Totes that he/she desires to purchase in textbox 24. Alternatively, the user may utilize up (or down) arrows 26 to increase (or decrease) the number of items by one, respectively. If the user wants to remove the Ruby on Rails Tote product from the shopping cart, the user may select the minus button 32. If the user is satisfied with the items in his/her shopping cart, the user may select the checkout button 34 to proceed to a checkout page (not depicted). Selection of the login button 20 in any of webpages 10, 12 and 14 may lead to webpage 16, in which the user is presented with the options to login or create a new account.

Figure 2E:
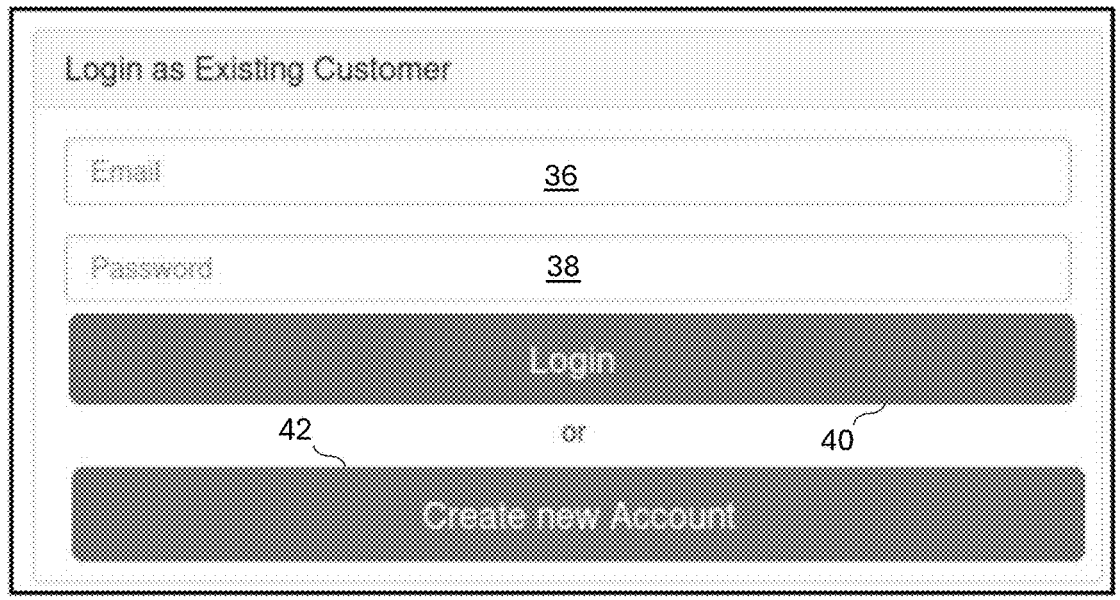

FIG. 2E depicts a screenshot with a magnified view of webpage 16, including email field (e.g., textbox) 36 for the user to input an email (or other user identifier) associated with his/her account and password field (e.g., textbox) 38 for the user to input a password associated with his/her account. Webpage 16 may also include submit login button 40 which may be selected to submit the email and password for authentication. For clarity, it is noted that submit login button 40 is distinct from the previously described login button 20, as the former submits the user account information, whereas the latter brings up the options for the user to login or create a new account. Webpage 16 may also include the create account button 42 for the user to create a new account in the event that the user does not have an existing account or seeks to create an alternative account. Selection of the create account button 42 may lead to webpage 18, in which the user is presented with the opportunity to create a new account.

Figure 2F:
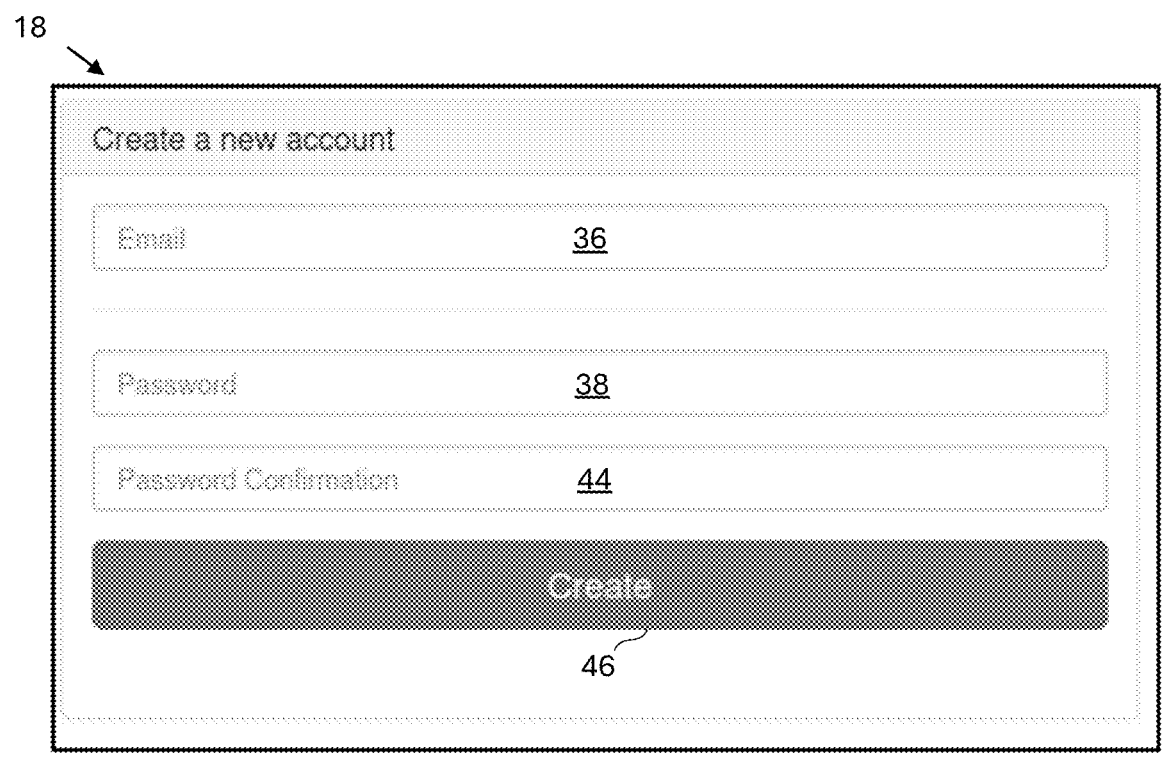

FIG. 2F depicts a screenshot with a magnified view of webpage 18, including email field (e.g., textbox) 36 for the user to input an email (or other user identifier) associated with his/her account, password field (e.g., textbox) 38 for the user to input a new password associated with his/her account, and password confirmation field (e.g., textbox) 44 for the user to re-enter the new password associated with his/her account. The user may select the create button 46 to create a new account with the specified email and password.

Figures 3A, 3B:
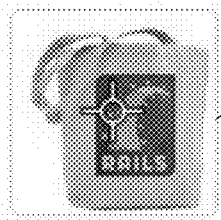
FIG. 3A depicts an example test script with text only, as rendered by a user experience (UX) software.
FIG. 3B depicts an example test script with text and images, as rendered by a UX software.

FIG. 3A depicts an example test script 15 with text only, as rendered by a user experience (UX) software. The example test script shown in FIG. 3A includes a sequence of six instructions (or steps). As described above in FIG. 1A, testing tool 19 may run test script 15 on application 17' in order to test application 17', or may run test script 15 on application 17 in environment 25.

More specifically, in the first step "Navigate To $baseUrl", testing tool 19 may instruct a web browser to navigate to a URL specified by the variable $baseUrl. Values may be associated with variables in key-value pairs, and a visualization of key-value pairs is provided in the table of FIG. 3D. By referring to the key-value pairs represented in FIG. 3D, testing tool 19 may determine that the value of https://demosite(dot)appvance(dot)net/ is associated with the variable $baseUrl. Webpage 10, as depicted in FIG. 2B, may be the result of the testing tool 19 operating application 17' in accordance with the first step of test script 15.

In the second step "Click image ($product)", the testing tool 19 may select an image in webpage 10 that is specified by the variable $product. Again, by referring to the key-value pairs represented in FIG. 3D, the testing tool 19 may determine Ruby on Rails Tote as the value associated with the variable $product. As a result of the second step, the web browser may navigate to webpage 12, as depicted in FIG. 2C.

In the third step "Click submit ("Add To Cart")", the testing tool 19 may select the Add-to-Cart button 28 in webpage 12, causing the web browser to navigate to webpage 14, as depicted in FIG. 2D.

In the fourth step "AssertTrue link("Login"). isEnabled( )", the testing tool 19 may verify whether the login button 20 in webpage 14 is enabled (i.e., meaning that it can be selected and is not greyed out or otherwise disabled). The result of the AssertTrue action, whether true or false, may be stored. It is noted that the AssertTrue action does not include any navigation action so the current webpage is still webpage 14.

In the fifth step "Click link("Login")", the testing tool 19 may select the login button 20 in webpage 14, causing the web browser to navigate to webpage 16, as depicted in FIG. 2E.

In the sixth step "Click link("Create New Account")", the testing tool 19 may select the create account button 42 in webpage 16, causing the web browser to navigate to webpage 18, as depicted in FIG. 2F.

FIG. 3B depicts an example test script with text and images, as rendered by a UX software. The example test script of FIG. 3B is identical to the example test script of FIG. 3A, except that the second step is expressed using the text "Click" and image 48 (depicting a Ruby on Rails Tote), in contrast to the second step in FIG. 3A, in which the second step was expressed using only text "Click image ($product)". While these steps are expressed differently (i.e., one using text and an image, and the other using only text), they are functionally equivalent.

FIG. 3C depicts the example test script 15 from FIG. 3A in programming language format. One might notice that the example test script 15' in FIG. 3C may be more difficult for a human to read with additional parentheses, etc. That is why a UX software may be utilized to render test script 15' into the more readily readable form that is depicted in FIG. 3A.

FIG. 3E depicts an example test case 11, which could include text and images. In the present example of FIG. 3E, the test case 11 only includes text for simplicity, but later described examples may also include images. A test case may generally include a sequence of steps that a testing engineer seeks to perform on the application 17, 17'. For ease of writing test cases and readability, steps of the test case may be expressed in natural language with or without images. One objective of the present invention can be easily understood from the example of FIGS. 3A-3E. That is, it is desired to convert, in an automated manner, test case 11 (such as that depicted in FIG. 3E-which is in a format that is not readable by testing tool 19) into test script 15 (such as that depicted in FIGS. 3A, 3B and 3C which are in a format that is readable by testing tool 19). While the examples provided herein are greatly simplified, they nevertheless can be used for the reader to clearly understand the principles of the present invention.

Figure 4:
FIG. 4 depicts an example blueprint, in accordance with one embodiment of the invention.

FIG. 4 depicts an example blueprint 52, which may include a time-evolving model 54 of the application 17 and a set of key-value pairs 56. As previously discussed, key-value pairs 56 may include values paired with variables, and may be relied upon to provide values for variables when test script 15 with those variables is executed. An example of key-value pairs 56 was previously provided in FIG. 3D. Time-evolving model 54 may include set of translations 58 and state machine model 60 of application 17. An explanation of set of translations 58 requires an understanding of the state machine model 60, so the explanation of set of translations 58 will follow the description of state machine model 60. While FIG. 4 depicts a blueprint 52 which includes time-evolving model 54 of the application 17, it is noted for completeness that in other embodiments, time-evolving model 54 may be replaced with a static model of application 17, as will be explained in detail below. A static model of application 17 may be less efficient than time-evolving model 54, but the concepts of the invention can nevertheless still be applied.

Figure 5A:
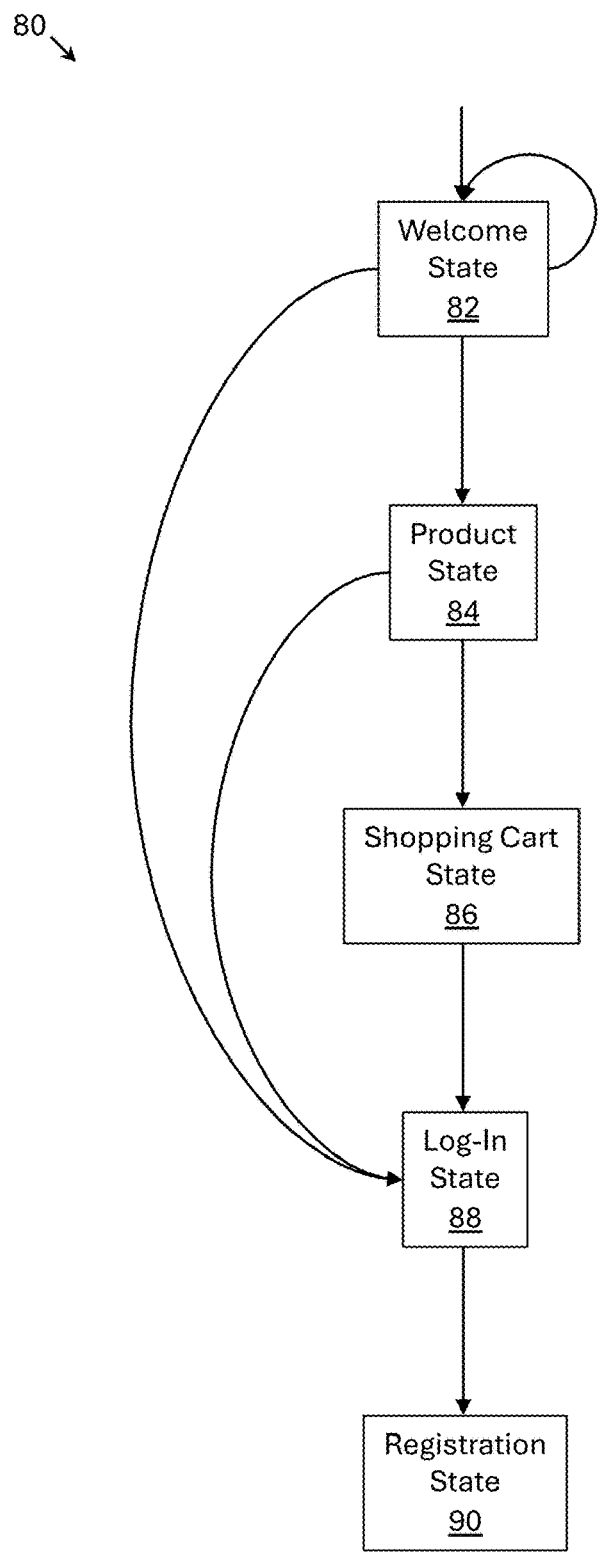
FIG. 5A depicts an example state machine model of an application, in accordance with one embodiment of the invention.

FIG. 5A depicts an example state machine model 80 (or also called state machine 80) of the simplified web application described in FIGS. 2A-2F. The states of the state machine 80 correspond to the web pages of the web application. More specifically, welcome state 82 corresponds to webpage 10, product state 84 corresponds to webpage 12, shopping cart state 86 corresponds to webpage 14, log-in state 88 corresponds to webpage 16 and registration state 90 corresponds to webpage 18. The edges of the state machine 80 correspond to actions taken within one webpage that do not result in a navigation action (represented as a self-loop in the state machine 80) or actions that do result in a navigation action (represented as an arrow from one state to another state).

In the example of FIG. 5A, the initial state is welcome state 82, as indicated by the arrow leading into welcome state 82. The self-loop from welcome state 82 back to itself represents an assert action to test whether the login button 20 is enabled. The arrows from welcome state 82, product state 84 and shopping cart state 86 to the log-in state 88 represent the action of clicking the login button 20 in one of webpages 10, 12 and 14, which causes the browser to navigate from one of webpages 10, 12 and 14 to webpage 16. The arrow from welcome state 82 to product state 84 represents the action of clicking the Ruby-on-Rails-Tote object 22, which causes the browser to navigate from webpage 10 to webpage 12. The arrow from product state 84 to shopping cart state 86 represents the action of clicking the add to cart button 28, which causes the browser to navigate from webpage 12 to webpage 14. The arrow from log-in state 88 to registration state 90 represents the action of clicking the create account button 42, which causes the browser to navigate from webpage 16 to 18. While the action of "clicking" is mentioned, it is understood that such action may not require the use of a mouse to perform a clicking action, and other forms of selection, whether by touchpad, touchscreen device, could constitute a clicking action. One will observe that FIG. 5A substantially corresponds to FIG. 2A, except that the self-loop action was not discussed in the context of FIG. 2A.

Figure 5B:
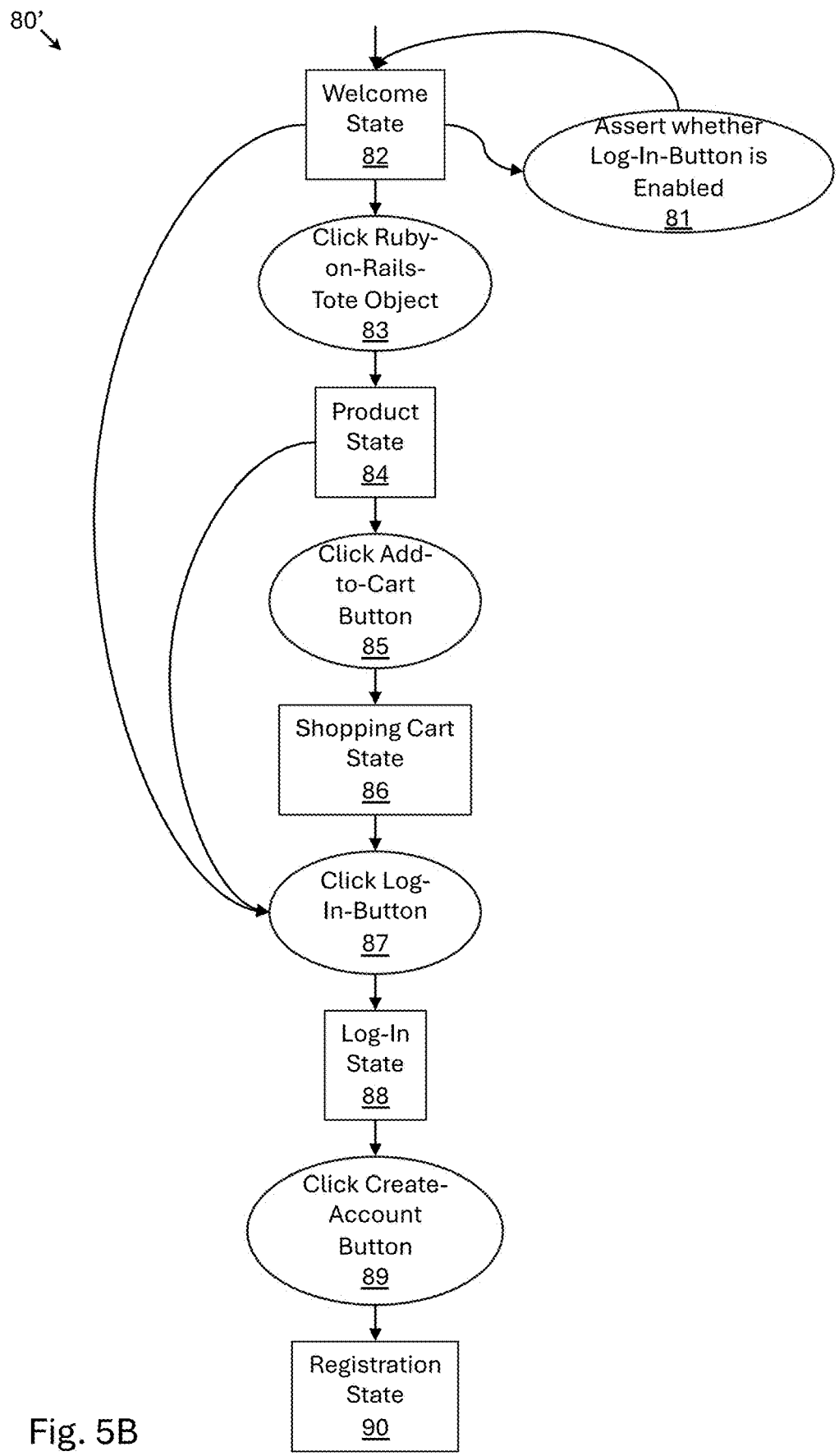
FIG. 5B depicts an example state machine model of an application with edges represented by respective pairs of blueprint actions and blueprint reactions, in accordance with one embodiment of the invention.

FIG. 5B depicts an expanded version of the state machine model 80 of FIG. 5A, in which the actions (also called blueprint actions) associated with each of the edges has been explicitly depicted in the state machine 80'. For clarity sake, the actions have been depicted using ovals and the states have been depicted using rectangles. The action 81 of asserting (or verifying) whether the login button 20 has been enabled may be performed in welcome state 82, and regardless of the outcome of the action 81 (whether true or false), the action 81 returns to welcome state 82. The action 83 of clicking on the Ruby-on-Rails-Tote object 22 may be performed in the welcome state 82 and causes the browser to navigate to the product state 84. The action 85 of clicking on the add to cart button 28 may be performed in the product state 84 and causes the browser to navigate to the shopping cart state 86. The action 87 of clicking on the login button 20 may be performed in the welcome state 82, product state 84 and shopping cart state 86 and causes the browser to navigate to the log-in state 88. The action 89 of clicking on the create account button 42 may be performed in the login state 88 and causes the browser to navigate to the registration state 90.

Returning to FIG. 4, it should now be more apparent how state machine 60 is formed by state space 62 (i.e., a collection of states), and set of state transitions 64 (i.e., a collection of edges or state transitions). State space 62 may be more completely represented by an elements-per-state table 66, an example of which is provided FIG. 6A. As illustrated in the example of FIG. 6A, each state (also called a blueprint state) may be characterized by one or more elements (also called application elements) that are present in that state. In the example of FIG. 6A, the welcome state 82 may be characterized by Ruby-on-Rails-Tote object 22 and login button 20 in webpage 10. Placeholder names may be created for each of the application elements. In the present example, the placeholder name "Ruby-on-Rails-Tote" is used to refer to Ruby-on-Rails-Tote object 22 and "Log-In-Button" is used to refer to login button 20. For the ease of discussion, descriptive names are being used for these placeholder names. However, in practice, less descriptive names may be used, such as button 1, button 2, and so on. In the example of FIG. 6A, the product state 84 may be characterized by login button 20 (assigned placeholder name "Log-In-Button"), and add to cart button 28 (assigned placeholder name "Add-To-Cart-Button"). Further, in the example of FIG. 6A, the shopping cart state 86 may be characterized by checkout button 34 (assigned placeholder name "Checkout-Button") and login button 20 (assigned placeholder name "Log-In-Button"). As should be apparent, more information regarding each state is captured in the example elements-per-state table of FIG. 6A than is captured in the example state machine 80 of FIG. 5A. Hence, it should be understood that example state machine 80 is a simplified version of the state space 62, and that a fuller representation of state space 62 is provided by elements-per-state table 66. To further clarify, the example elements-per-state table of FIG. 6A only represents a subset of the states (i.e., welcome state 82, product state 84, shopping cart state 86) that were included in the state machines 80, 80' of FIGS. 5A and 5B (i.e., welcome state 82, product state 84, shopping cart state 86, log-in state 88, registration state 90), respectively. The elements-per-state table of FIG. 6A could be augmented to include information regarding the log-in state 88, registration state 90 in a more complete example.

More specifically, an application element may be defined as an actionable section of the application page (e.g., html page) which can be identified and actioned by the application client. Application elements can have properties such as contained text (called text), coordinates within the application window (called bounding boxes), background and foreground colors, internal values (i.e., not displayed on the page) that are only accessible to the application client such as id, title, and other attributes.

Importantly, each application element can have one or more text based locators (e.g., one or more code snippets) to uniquely identify the application element in a page. In addition or alternatively, each application element can have one or more image based locators to uniquely identify the application element in a page. As shown in the example elements-per-state table of FIG. 6A, the Ruby-on-Rails-Tote application element may be identified by three script-level locators: image ($product), image (Ruby-on-Rails-Tote) and the image 48 that depicts a Ruby on Rails Tote. The Log-in-Button may be identified by two script-level locators: link("Login") and the image 49 that depicts a Login button. The Add-To-Cart-Button may be identified by two script-level locators: submit ("Add To Cart") and the image 51 that depicts an Add To Cart button. The Checkout-Button may be identified by the script-level locator link("Checkout"). One may better appreciate the mapping from an application element to one or more script-level locators based on the analogy that a person (who resides in the US) may be uniquely identified by his/her social security number, driver's license number, etc. The mapping between application elements and script-level locators is useful, as it allows an application element to be identified regardless of which script-level locator is used to refer to the application element.

It is noted that elements-per-state table 66 may be a simplified representation of state space 62, and other information may be included in a blueprint state. For instance, each blueprint state can be associated with an ID (i.e., identifier) computed (e.g., using a hash function) based on the set of application elements that defines the blueprint state. Furthermore, a blueprint state may also contain one or more screenshots of the application window/interface (if provided by the application client).

Returning to FIG. 4, the set of state transitions 64 may be formed by an actions-per-state table 68 and reaction-per-action table 70. To describe at a high level, an actions-per-state table 68 may include one or more blueprint actions which are performed in each of the blueprint states. In the context of the state machine 80' depicted in FIG. 5B, the blueprint actions would correspond to the elements depicted in ovals 81, 83, 85, 87 and 89. For the welcome state 82, the blueprint actions include "assert whether Log-In-Button is enabled" 81, "click Ruby-on-Rails-Tote object" 83, and "click Log-In-Button" 87. For the product state 84, the blueprint actions include "click Ruby-on-Rails-Tote button" 85 and "click Log-In-Button" 87. For the shopping cart state 86, the blueprint action includes "Click Log-In-Button" 87. For the log-in state 88, the blueprint action includes "Click Create-Account Button" 89. In FIG. 5B, there are no blueprint actions that are depicted for the registration state 90, but blueprint actions could certainly be added to registration state 90 for a more complete representation of application 17.

A reaction-per-action table 70 may include the resulting state for a corresponding blueprint action. Conceptually, a reaction may be regarded as the arrow leading from an oval (i.e., blueprint action) to a square (i.e., a blueprint state). For example, the reaction of "Click Ruby-on-Rails-Tote object" 83 is product state 84, and the reaction of "Click Add-To-Cart button 85" is shopping cart state 86. It is noted that the decomposition of the conventional transition (or edge) of a state machine model into a blueprint action and blueprint reaction is for convenience and such decomposition is not a requirement. For instance, in a conventional discussion of a state machine, one may refer to a transition (or edge) from welcome state 82 to product state 84. In the present disclosure, such transition is decomposed into a blueprint action (i.e., "click Ruby-on-Rails-Tote object" 83) and a blueprint reaction (i.e., arrow from blueprint action 83 to product state 84). While concepts of the invention will be discussed using the formulation of transitions as respective pairs of blueprint actions and reactions, it should be understood that the concepts of the invention may be modified to be applied to the more conventional transitions of a state machine.

An example actions-per-state table is provided in FIG. 6B. For simplicity, the example of FIG. 6B only depicts the blueprint actions that are performed in the welcome state 10: click(Ruby-on-Rails-Tote), assertTrue(Log-In-Button.isEnabled( )), and click(Log-In-Button). However, in a more complete example, the actions-per-state table may be augmented to include additional states and the blueprint actions that are performed in those states.

One will notice that in the example of FIG. 6B, blueprint actions are presented as code snippets. The click(Ruby-on-Rails-Tote) code snippet corresponds to blueprint action 83 in FIG. 5B; the assertTrue(Log-In-Button.isEnabled( )) code snippet corresponds to blueprint action 81; and the click (Log-In-Button) corresponds to the blueprint action 87.

More specifically, a blueprint action may be defined as an ordered list of element actions, in which an element action may be defined as a tuple including (1) an application action, (2) an application element, and (3) other optional inputs. An application action may be defined as an action which can be performed by an application client. Example application actions may include:
  Navigate to a new URL
  Open an application
  Click/double click
  Set value/type
  Assert element present/not present
  Assert text present in element/not present
  Assert global text present/not present
  Assert image/not present
  List all available elements present on an application page
    (can be performed by Appvance® Test Designer)
  Some application actions may require only a single input. For example, the "click" action only accepts a single target application element. Some application actions, however, may accept multiple inputs. For example, the "set value" action may accept a target application element and a text input specifying the value.

Returning to the example of FIG. 6B, one can see that, in some instances, the syntax of the code snippet representing each blueprint action is the application action followed by an open parenthesis "(", followed by the application element, followed by a close parenthesis ")". As mentioned above, a blueprint action may be defined as an ordered list of element actions. In the simplified example of FIG. 6B, each blueprint action included a single element action, and such element action was also depicted in the actions-per-state table as an application action paired with an application element. For instance, the blueprint action click(Ruby-on-Rails-Tote) included the single element action of (click, Ruby-on-Rails-Tote), the blueprint action assertTrue(Log-In-Button.isEnabled( )) included the single element action of (assertTrue, Log-In-Button), and the blueprint action click(Log-In-Button) included the single element action of (click, Log-In-Button). A more complicated example in FIG. 26 will show blueprint actions that include an ordered list of multiple element actions.

FIG. 6C depicts an example reaction-per-action table. In the example, the resulting state of the blueprint action click(Ruby-on-Rails-Tote) is the product state, as reflected in the blueprint action "click Ruby-on-Rails-Tote object" 83 leading to product state 84 in FIG. 5B. The resulting state of the blueprint action click(Add-To-Cart-Button) is the shopping cart state 86, as reflected in blueprint action "click Add-To-Cart button" 85 leading to shopping cart state 86 in FIG. 5B. The resulting state of the blueprint action click (Log-In-Button) is the login state 88, as reflected in "click log-in-button" 87 leading to log-in state 88 in FIG. 5B. The reactions provided in the example of FIG. 6C are not meant to be comprehensive of all of the possible reactions of application 17, and the reaction-per-action table may be augmented to include other reactions.

As previously mentioned, one objective of the present invention is to automatically convert the "human-readable" natural language test case 11 (e.g., that depicted in FIG. 3E) into "computer-readable" test script 15 (e.g., that depicted in FIG. 3A, 3B or 3C). Of course, both test case 11 and test script 15 are both readable by a human, so by "human-readable," we mean a form that is most easily understood by a human. Likewise, both test case 11 and test script 15 are readable by a computer, so by "computer-readable," we mean a form that is most easily understood or processed by a computer. At a high level, the conversion involves segmenting the a test case (e.g., test case 11) into test case segments, and mapping each test case segment to a suitable blueprint action. If a suitable blueprint action does not exist, a new blueprint action may be created for the test case segment. Finally, each blueprint action may be converted into one or more lines of test script by a rule-based code generator. As will become more apparent from the examples to follow, a key part of the conversion process is the binding (or mapping) from a test case segment (that is most easily understood by a human) to a blueprint action (that is most easily understood by a computer). Such binding may also be called a translation. As new bindings are created, it is most efficient to save the new bindings in a "glossary" so that future test segments can be translated by simply referring to this glossary, instead of having to determine the bindings from scratch.

Such "glossary" is referred to as set of translations 58 hereinbelow. An example set of translations 58 is provided in FIG. 6D. In the example, the blueprint action click(Ruby-on-Rails-Tote) is associated with two test case segments: (1) Select the Ruby on Rail tote product and (2) Click the Ruby on Rails tote. The reason that there could be multiple test case segments associated with a single blueprint action is that there may be multiple ways to express the same intended action in the human language. In the context of webpage 10, it should be understood that (1) Select the Ruby on Rail tote product and (2) Click the Ruby on Rails tote mean the same thing. If a new binding between the blueprint action click(Ruby-on-Rails-Tote) and test case segment "Select the Ruby on Rails Tote image" were created, the blueprint action click(Ruby-on-Rails-Tote) could be associated with three test case segments: (1) Select the Ruby on Rail tote product, (2) Click the Ruby on Rails tote and (3) Select the Ruby on Rails Tote image. Continuing with the example of FIG. 6D, the blueprint action assertTrue(Log-In-Button.isEnabled( )) is associated with the test case segment "Verify that the Login button is enabled." Lastly, it is noted that a confidence score may be associated with each of the translations, indicating a degree of confidence with the translation. The method in which the confidence scores are determined will be discussed in the examples that follow.

The description now provides detailed examples of a process to convert a test case into a test script. For the example that starts in FIG. 7A, certain assumptions are made:

(1) It is assumed that the application 17 is the web application described in FIGS. 2A-2F.
(2) It is assumed that the elements-per-state table is initialized to that shown in FIG. 6A (i.e., there is some prior knowledge of the states of the web application, but not a complete understanding).
(3) It is assumed that the actions-per-state table is initialized to that shown in FIG. 6B (i.e., there is some prior knowledge of the actions of the web application, but not a complete understanding).
(4) It is assumed that the reaction-per-action table is initialized to that shown in FIG. 6C (i.e., there is some prior knowledge of the reactions of the web application, but not a complete understanding).
(5) It is assumed that the set of translations is initialized to that shown in FIG. 6D (i.e., there is a partial glossary that has been created storing past bindings that have been created between blueprint actions and test case segments).

The conversion process may begin by initializing a variable to store an ordered list of translations. Such variable in the form of a table (or other data structure) is shown in FIG. 7A. In the example, the first column records the order, the second column records the test case segment, the third column records the blueprint action and the fourth column records the score. Of course, the order of the columns may be changed without departing from the spirit of the invention. The meaning of these columns will become more apparent as the example continues. The ordered list of translation is essentially a "running list" of translations. As each test case segment from a test case is translated into a blueprint action, each new translation may be appended to the ordered list of translation. Such process of appending new translations to the ordered list of translations continues until there are no more test case segments from the test case that need to be translated or one test case segment cannot be converted, causing the conversion process to fail. As the following examples will more clearly reveal, such ordered list of translation is different from the set of translations (i.e., the glossary). The former keeps track of the translations only for the current test case, whereas the latter keeps track of all translations from past test cases and the current test case.

Next, a test case may be received. For the instant example, test case 11 that is depicted in FIG. 3E is received. Next, test case 11 may be segmented into an ordered list of test case segments, the result of which is depicted in FIG. 7B. In the instant example, each line of the test case 11 has been segmented into a separate test case segment. Therefore, the "new line" or return character may be used to infer the end of one test case segment and the beginning of the next test case segment. The order of the test case segments is provided in the first column of the table of FIG. 7B.

The segmentation process may be performed manually by a testing engineer or automatically by test script generator 13. In one embodiment, test script generator 13 may segment test case 11 into the ordered list of test case segments based on the presence of "new line" or return characters. In another embodiment, test script generator 13 may communicate with an artificial intelligence (AI) engine that has been trained with a large language model (LLM) in order to perform the segmentation. For instance, test script generator 13 may transmit the test case 11 to an AI engine 111 and ask the AI engine 111 to segment the test case into an ordered list of test case segments.

Next, the testing tool 19 may navigate to a current application window of the application 17. More specifically, the test script generator 13 may, based on user input, navigate to an initial application window of the application 17 from which the test case 11 is to be performed. In the instant example, the current application window is webpage 10 depicted in FIG. 2B.

Next, the test script generator 13 may assign the first test case segment "Select the Ruby on Rails tote" in the ordered list of test case segments as a current test case segment. The current test case segment is indicated with a block arrow in FIG. 7B.

It is noted that the order of steps that is described is only provided as an example, and the order of steps may be modified. For instance, the navigation to the current application window could have occurred prior to the receipt of the test case and also prior to the initialization of the variable to store the ordered list of translations, without any substantive change to the overall process. Likewise, the receipt of the test case could have occurred prior to the initialization of the variable to store the ordered list of translations, without any substantive change to the overall process.

Next, the test script generator 13 may attempt to determine a current state by determining a collection of application elements that are present in the current application window (i.e., webpage 10). In the present example, the collection of application elements that are present in webpage 10 include login button 20 and Ruby-on-Rails-Tote object 22. Since this collection of application elements matches those of the welcome state in the elements-per-state table 66, the current state is determined to be the welcome state.

FIGS. 7C-7D depict an example of a process for determining a current action that matches the current test case segment. The test script generator 13 may determine whether any existing actions originating from the current state and belonging to the set of translations sufficiently correspond to the current test case segment. In the present example, the blueprint actions which are present in the current state (i.e., welcome state) are click(Ruby-on-Rails-Tote), assertTrue(Log-In-Button.isEnabled( )) and click (Log-In-Button). The blueprint actions which are present in the set of translations are click(Ruby-on-Rails-Tote), assertTrue(Log-In-Button.isEnabled( )). Therefore, the intersection of these sets of blueprint actions include click(Ruby-on-Rails-Tote) and assertTrue(Log-In-Button.isEnabled( )), and these blueprint actions common to both the current state and the set of translations have been identified in the tables of FIG. 7C with a dotted background. These common blueprint actions may be called "candidate blueprint actions."

Next, as shown in FIG. 7D, the test script generator 13 may utilize an AI engine 111 to determine a similarity score between the current test case segment (i.e., "Select the Ruby on Rails tote") and each of the test case segments mapped to the candidate blueprint actions. The following are some interactions with an AI engine 111 that were used to determine the similarity scores tabulated in FIG. 7D:

[user input]: please give me a number between 0 and 1 for the semantic similarity between these two phrases
"Select the Ruby on Rails tote"
and
"Select the Ruby on Rail tote product"
Please give me the number no explanation is expected
[AI engine output]: 0.92
[user input]: please give me a number between 0 and 1 for the semantic similarity between these two phrases
"Select the Ruby on Rails tote"
and
"Click the Ruby on Rails tote"
Please give me the number no explanation is expected
[AI engine output]: 0.95
[user input]: please give me a number between 0 and 1 for the semantic similarity between these two phrases
"Select the Ruby on Rails tote"
and
"Verify that the Login button is enabled"
Please give me the number no explanation is expected
[AI engine output]: 0.18

The test case segment "Click the Ruby on Rails tote" had the highest similarity score and further, this highest similar score exceeded a minimum threshold of, for example 0.80, so the best matching test case segment is determined to be "Click the Ruby on Rails tote." It is understood that the minimum threshold value of 0.80 is provided as an example, and other values can be used. From the set of translations, the blueprint action click(Ruby-on-Rails-Tote) corresponding to the best matching test case segment "Click the Ruby on Rails tote" is then determined as the current action that matches the current test case segment "Select the Ruby on Rails tote". This translation (current test case segment and current action) along with its similarity score may then be added (or appended) to the ordered list of translations, as shown in FIG. 7E.

This translation may also be added to the set of translations, as shown in FIG. 7F. The similarity score for the translation that is added to the set of translation, however, may be different from the similarity score for the translation that is added to the ordered list of translation. The similarity score for the translation that is added to the set of translations may be computed by multiplying 95% with 93%, in which:

95% was the similarity score between the current test case segment "Select the Ruby on Rails tote" and the best matching test case segment "Click the Ruby on Rails tote" (see FIG. 7D).

93% was the similarity score between the blueprint action "click(Ruby-on-Rails-Tote)" and the best matching test case segment "Click the Ruby on Rails tote" (see FIG. 7C).

95% associates the current test case segment "Select the Ruby on Rails tote" with the test case segment "Click the Ruby on Rails tote," and 93% associates the test case segment "Click the Ruby on Rails tote" with the current action "click(Ruby-on-Rails-Tote)," so logically, the association between the current test case segment "Select the Ruby on Rails tote" and the "click(Ruby-on-Rails-Tote)" would be a function of both of these percentages. Multiplication is an example function to combine these two percentages (95% and 93%). In another embodiment, another way to combine the two percentages would be to take the average between the two percentages. In the instant example, multiplication is used to combine the two percentages, which results in a score of 88% for the translation that is added into the set of translations.

Finally, the current action may be executed in the current application window to navigate to a subsequent application window. More specifically, the current action click(Ruby-on-Rails-Tote) may be converted by test script generator 13 into a line of test script click(image ($product)) by substituting the application element placeholder Ruby-on-Rails-Tote in the current action with a corresponding script-level locator (e.g., image ($product)) indicated in the elements-per-state table (see FIG. 6A). The line of test script click (image ($product)) may then be executed by the testing tool 19 in the current application window (i.e., webpage 10) to navigate to the subsequent application window (i.e., webpage 12). This discussion completes the processing of the first test case segment.

Next, test script generator 13 may determine whether a subsequent test case segment exists in the ordered list of test case segments. In the instant case, an additional test case segment exists. FIG. 8A depicts the test case segments with the indication of the current test case segment advanced from the previously processed test case segment. The current test case segment is now "Add the product to cart."

Next, test script generator 13 may attempt to determine a current state by determining a collection of application elements that are present in the current application window (i.e., webpage 12). In the present example, the collection of application elements that are present in webpage 12 include login button 20 and Add-To-Cart button 28. Since this collection of application elements matches those of the product state in the elements-per-state table 66 (see FIG. 6A), the current state is determined to be the product state.

Next, test script generator 13 may determine whether there are any existing actions originating from the current state and belonging to the set of translations that sufficiently correspond to the current test case segment. In the present case, there are no existing actions originating from the current state, since there is no entry for the product state in the actions-per-state table. See FIG. 6B. Since this determination fails, test script generator 13 attempts to generate a new blueprint action for the current test case segment, in accordance with the example in FIGS. 8B-8L.

As illustrated in FIGS. 8B and 8C, test script generator 13 may determine whether any previously translated actions from the set of translations sufficiently correspond to the current test case segment and reference only application elements contained within the collection of application elements, which in the present example includes login button 20 and Add-To-Cart button 28. More specifically, test script generator 13 may determine whether any blueprint actions in the actions-per-state table reference application elements contained within the collection of application elements. In the present case, the blueprint actions assertTrue(Log-In-Button.isEnabled( )) and click(Log-In-Button) both reference login button 20. The test script generator 13 may then determine whether any of these blueprint actions assertTrue(Log-In-Button.isEnabled( )) and click(Log-In-Button) are present in the set of translations. In the present case, the assertTrue(Log-In-Button.isEnabled( )) is present in the set of translations, and as such, assertTrue(Log-In-Button.isEnabled( )) may be regarded as a candidate blueprint action (identified in the tables of FIG. 8B with a dotted background). Finally, test script generator 13 determines a similarity score between the current test case segment "Add the product to cart" and the test case segment "Verify that the Login button is enabled" which corresponds to the candidate blueprint action of assertTrue(Log-In-Button.isEnabled( )). As previously discussed, an AI engine 111 (i.e., an LLM) may be used to generate this similarity score. In the present example, the AI generated similarity score is 0.35, which is below the minimum threshold of 0.80, so the attempt to generate a new action based on the procedure described in FIGS. 8B and 8C fails.

Next, as illustrated in FIGS. 8D-8F, test script generator 13 may determine whether any blueprint actions that are not included in the set of translations sufficiently correspond to the current test case segment and reference only application elements contained within the collection of application elements. In the present example, the only blueprint action that is not included in the set of translations and references only application elements contained within the collection of application elements is the click(Log-In-Button) blueprint action. To determine whether this blueprint action sufficiently corresponds to the current test case segment takes some extra effort because the blueprint action is not present in the set of translations, and thus requiring this blueprint action to be translated into natural language before an AI engine 111 (i.e., LLM) can be used to assess its similarity to the current test case segment. In one embodiment, a rule-based generator may be used to translate the blueprint action into a natural language phrase. For instance, the natural language description of a blueprint action could be in the form of a template with placeholders (e.g., "[Action] a [object] which can be accessed with the locator [locator]"). In the present example, the blueprint action click(Log-In-Button) may be translated into the natural language phrase "Click a button which can be accessed with the locator link("Login")." Finally, test script generator 13 may determine a similarity score between the current test case segment "Add the product to cart" and the Candidate natural language (NL) phrase "Click a button which can be accessed with the locator link("Login")." In the present example, the AI generated similarity score is 0.27, which is below the minimum threshold of 0.80, so the attempt to generate a new action based on the procedure described in FIGS. 8D-8F also fails.

With the attempts (as illustrated in FIGS. 8B-8C and 8D-8F) to "recycle" or "repurpose" existing blueprint actions failing, test script generator 13 may then attempt to generate a blueprint action from scratch, as illustrated in FIGS. 8G-8L. First, test script generator 13 may employ an AI engine 111 to perform image-to-text translation for images 49 and 51 present in the script-level locators of the current state (i.e., product state). See FIG. 6A. The output for the image-to-text translation is recorded in the top table of FIG. 8G. Next, test script generator 13 may employ the above-described rule-based generator to generate a natural language description of each application element (i.e., Log-In-Button, Add-To-Cart-Button) present in the current state (i.e., product state) using text locators. The output of the rule-based generated description of each application element using text locators is recorded in the middle table of FIG. 8G. Next, both descriptions (i.e., image-to-text translation and rule-based generated description) for each application element may be combined into a single natural language description, as shown in the bottom table of FIG. 8G.

Next, a rule-based generator may be used to generate a natural language description of the current application page (i.e., webpage 12). The output of the rule-based generator is provided in FIG. 8H.

Next, as illustrated in FIG. 8I, test script generator 13 may use an AI engine 111 to determine a minimum number of application elements used by the current test case segment "Add the product to cart" in webpage 12 as described by the natural language description of FIG. 8H. In the present example, the response of the AI engine 111 is 1 (i.e., 1 is the minimum number of application elements).

Next, as illustrated in FIG. 8J, test script generator 13 may use an AI engine 111 to determine a maximum number of application elements used by current the test case segment "Add the product to cart" in webpage 12 as described by the natural language description of FIG. 8H. In the present example, the response of the AI engine 111 is 2 (i.e., 2 is the maximum number of application elements).

Next, test script generator 13 may generate candidate blueprint actions, each acting on a number of application elements between the minimum and maximum number of application elements (inclusive) as determined by the AI engine 111. The top table in FIG. 8K records blueprint actions formed from a single element action, and the bottom table in FIG. 8K records blueprint actions formed from two element actions. As a blueprint action is formed from an ordered list of element actions, the order of the element actions matters, as shown in the lower table in FIG. 8K. The test script generator 13 may then use a rule-based generator to describe each of the blueprint actions in natural language, as also shown in the tables of FIG. 8K. Finally, an AI engine 111 may be used to determine a similarity score between the current test case segment and each of the candidate natural language phrases recorded in the tables of FIG. 8K. The similarity scores are recorded in FIG. 8L. The natural language phrase—Click a button which can be accessed with the locator submit ("Add to Cart") and an image of a simple rectangular button with the text "Add To Cart" centered on it."—received the highest similarity score of 0.90, and further this similarity score was above the minimum threshold of 0.80. Therefore, the newly created blueprint action of click(Add-To-Cart-Button) may be determined as the current action that matches the current test case segment "Add the product to cart."

As shown in FIG. 8M, the actions-per-state table may be modified to include the new blueprint action of click(Add-To-Cart-Button) in the product state.

As shown in FIG. 8N, the new translation from the current test case segment "Add the product to cart" to the blueprint action click(Add-To-Cart-Button) may be appended to the end of the ordered list of translations, along with the AI determined similarity score that was recorded in FIG. 8L.

As shown in FIG. 8O, the set of translations may be updated to include the new translation from the current test case segment "Add the product to cart" to the blueprint action click(Add-To-Cart-Button), along with the AI determined similarity score that was recorded in FIG. 8L.

Finally, the current action may be executed in the current application window to navigate to a subsequent application window. More specifically, the current action click(Add-To-Cart-Button) may be converted by test script generator 13 into a line of test script click(submit ("Add To Cart")) by substituting the application element placeholder Add-To-Cart-Button in the current action with a corresponding script-level locator (e.g., submit ("Add To Cart")) indicated in the elements-per-state table (see FIG. 6A). The line of test script click(submit ("Add To Cart")) may then be executed by the testing tool 19 in the current application window (i.e., webpage 12) to navigate to the subsequent application window (i.e., webpage 14). This discussion completes the processing of the second test case segment.

Next, test script generator 13 may determine whether a subsequent test case segment exists in the ordered list of test case segments. In the instant case, an additional test case segment exists. FIG. 9A depicts the test case segments with the indication of the current test case segment advanced from the previously processed test case segment. The current test case segment is now "Assert that login button is enabled."

Next, test script generator 13 may attempt to determine a current state by determining a collection of application elements that are present in the current application window (i.e., webpage 14). In the present example, the collection of application elements that are present in webpage 14 include login button 20 and checkout button 34. Since this collection of application elements matches those of the shopping cart state in the elements-per-state table 66 (see FIG. 6A), the current state is determined to be the shopping cart state.

Next, test script generator 13 may determine whether there are any existing actions originating from the current state and belonging to the set of translations that sufficiently correspond to the current test case segment. In the present case, there are no existing actions originating from the current state, since there is no entry for the shopping cart state in the actions-per-state table. See FIG. 8M. Since this determination fails, test script generator 13 may attempt to generate a new blueprint action for the current test case segment, in accordance with the example in FIGS. 9B and 9C.

As illustrated in FIGS. 9B and 9C, test script generator 13 may determine whether any previously translated actions from the set of translations sufficiently correspond to the current test case segment and reference only application elements contained within the collection of application elements, which in the present example includes login button 20 and checkout button 34. More specifically, test script generator 13 may determine whether any blueprint actions in the actions-per-state table reference application elements contained within the collection of application elements. In the present case, the blueprint actions assertTrue(Log-In-Button.isEnabled( )) and click(Log-In-Button) both reference login button 20. The test script generator 13 may then determine whether any of these blueprint actions assertTrue(Log-In-Button.isEnabled( )) and click(Log-In-Button) are present in the set of translations. In the present case, the assertTrue(Log-In-Button.isEnabled( )) is present in the set of translations, and as such, assertTrue(Log-In-Button.isEnabled( )) may be regarded as a candidate blueprint action (highlighted in the tables of FIG. 9B with a dotted background). Finally, test script generator 13 may determine a similarity score between the current test case segment "Assert that login button is enabled" and the test case segment "Verify that the Login button is enabled" which corresponds to the candidate blueprint action of assertTrue(Log-In-Button.isEnabled( )). As previously discussed, an AI engine 111 (i.e., an LLM) may be used to generate this similarity score. In the present example, the AI generated similarity score is 0.97, which is above the minimum threshold of 0.80, so the best matching test case segment is determined to be "Verify that the Login button is enabled." Therefore, the newly created blueprint action of assertTrue(Log-In-Button.isEnabled( )) may be determined as the current action that matches the current test case segment "Assert that login button is enabled."

As shown in FIG. 9D, the actions-per-state table may be modified to include the new blueprint action of assertTrue (Log-In-Button.isEnabled( )) in the shopping cart state.

As shown in FIG. 9E, the new translation from the current test case segment "Assert that login button is enabled" to the blueprint action assertTrue(Log-In-Button.isEnabled( )) may be appended to the end of the ordered list of translations, along with the AI determined similarity score that was recorded in FIG. 9C.

As shown in FIG. 9F, the set of translations may be updated to include the new translation from the current test case segment "Assert that login button is enabled" to the blueprint action assertTrue(Log-In-Button.isEnabled( )). The similarity score for the translation that is added to the set of translation, however, may be different from the similarity score for the translation that is added to the ordered list of translation. The similarity score for the translation that is added to the set of translations may be computed by multiplying 97% with 91% (which yields 88%), in which:

- 97% was the similarity score between the current test case segment "Assert that login button is enabled" and the best matching test case segment "Verify that the Login button is enabled" (See FIG. 9C).
- 91% was the similarity score between the blueprint action "assertTrue(Log-In-Button.isEnabled( ))" and the best matching test case segment "Verify that the Login button is enabled" (See FIG. 9B)

The rationale for the multiplication of these two scores is similar to the rationale provided above for the processing of the first test case segment, and will not be repeated for the sake of conciseness.

Finally, the current action may be executed in the current application window to navigate to a subsequent application window. More specifically, the current action assertTrue (Log-In-Button.isEnabled( )) may be converted by test script generator 13 into a line of test script assertTrue(link("Login").isEnabled( )) by substituting the application element placeholder Log-In-Button in the current action with a corresponding script-level locator (e.g., link("Login")) indicated in the elements-per-state table (see FIG. 6A). The line of test script assertTrue(link("Login").isEnabled( )) may then be executed by the testing tool 19 in the current application window (i.e., webpage 14). The result of the assert statement, whether true or false, may not affect the test script generation process. In the present example, the assert statement does not result in the navigation to a different application window, so the subsequent application window remains webpage 14. This discussion completes the processing of the third test case segment.

Next, test script generator 13 may determine whether a subsequent test case segment exists in the ordered list of test case segments. In the instant case, an additional test case segment exists. FIG. 10A depicts the test case segments with the indication of the current test case segment advanced from the previously processed test case segment. The current test case segment is now "Click login."

Next, the test script generator 13 may attempt to determine a current state by determining a collection of application elements that are present in the current application window (i.e., webpage 14). In the present example, the collection of application elements that are present in webpage 14 include login button 20 and checkout button 34. Since this collection of application elements matches those of the shopping cart state in the elements-per-state table 66 (see FIG. 6A), the current state is determined to be the shopping cart state.

Next, the test script generator 13 may determine whether there are any existing actions originating from the current state and belonging to the set of translations that sufficiently correspond to the current test case segment. In the present example, the blueprint action which is present in the current state (i.e., shopping cart state) is assertTrue(Log-In-Button. isEnabled( )). The blueprint actions which are present in the set of translations are click(Ruby-on-Rails-Tote), assertTrue (Log-In-Button.isEnabled( )) and click(Add-To-Cart). Therefore, the intersection of these sets of blueprint actions is assertTrue(Log-In-Button.isEnabled( )), and this blueprint action common to both the current state and the set of translations has been identified in the tables of FIG. 10B with a dotted background. This common blueprint action may be called a "candidate blueprint action."

Next, as shown in FIG. 10C, the test script generator 13 may utilize an AI engine 111 to determine a similarity score between the current test case segment (i.e., "Click login") and each of the test case segments mapped to the candidate blueprint action. The similarity scores are recorded in the table of FIG. 10C. Both scores (i.e., 0.65 and 0.63) are below the minimum threshold of 0.80, so the candidate blueprint action (i.e., blueprint action that already exists in the current state) is determined to not sufficiently correspond to the current test case segment "click login". Since this determination fails, test script generator 13 attempts to generate a new blueprint action for the current test case segment.

Next, as shown in FIGS. 10D and 10E, test script generator 13 may determine whether any previously translated actions from the set of translations sufficiently correspond to the current test case segment and reference only application elements contained within the collection of application elements, which in the present example includes login button 20 and checkout button 34. More specifically, test script generator 13 may determine whether any blueprint actions in the actions-per-state table reference application elements contained within the collection of application elements. In the present case, the blueprint actions assertTrue(Log-In-Button.isEnabled( )) and click(Log-In-Button) both reference login button 20. The test script generator 13 may then determine whether any of these blueprint actions assertTrue(Log-In-Button.isEnabled( )) and click(Log-In-Button) are present in the set of translations. In the present case, assertTrue(Log-In-Button.isEnabled( )) is present in the set of translations, and as such, assertTrue(Log-In-Button.isEnabled( )) may be regarded as a candidate blueprint action (highlighted in the tables of FIG. 10D with a dotted background).

Next, the test script generator 13 may utilize an AI engine 111 to determine a similarity score between the current test case segment (i.e., "Click login") and each of the test case segments mapped to the candidate blueprint action. The similarity scores are recorded in the table of FIG. 10E. Both scores (i.e., 0.65 and 0.63) are below the minimum threshold of 0.80, so the candidate blueprint action assertTrue(Log-In-Button.isEnabled( )) is determined to not sufficiently correspond to the current test case segment "click login." In a more efficient embodiment, test script generator 13 may keep track of the blueprint actions that it has already evaluated and deemed to not sufficiently correspond to the current test case segment "click login," and simply eliminate those blueprint actions from the candidate blueprint actions without having to invoke the AI engine 111 to perform the scoring operation.

Next, as illustrated in FIGS. 10F-10H, test script generator 13 may determine whether any blueprint actions that are not included in the set of translations sufficiently correspond to the current test case segment and reference only application elements contained within the collection of application elements. In the present example, the only blueprint action that is not included in the set of translations and references only application elements contained within the collection of application elements is the click(Log-In-Button) blueprint action. As explained above in FIG. 8E, to determine whether this blueprint action sufficiently corresponds to the current test case segment, a rule-based generator may be first used to translate the blueprint action into a natural language phrase. As was previously explained, the blueprint action click(Log-In-Button) may be translated into the natural language phrase "Click a button which can be accessed with the locator link("Login")." Finally, test script generator 13 may determine a similarity score between the current test case segment "Click login" and the candidate natural language (NL) phrase "Click a button which can be accessed with the locator link("Login")." In the present example, the AI generated similarity score is 0.88, which is above the minimum threshold of 0.80, so the new action of click(Log-In-Button) is created for the current test case segment "Click login."

As shown in FIG. 10I, the actions-per-state table may be modified to include the new blueprint action of click(Log-In-Button) in the shopping cart state.

As shown in FIG. 10J, the new translation from the current test case segment "Click login" to the blueprint action click(Log-In-Button) may be appended to the end of the ordered list of translations, along with the AI determined similarity score that was recorded in FIG. 10H.

As shown in FIG. 10K, the set of translations may be updated to include the new translation from the current test case segment "Click login" to the blueprint action click (Log-In-Button), along with the AI determined similarity score that was recorded in FIG. 10H.

Finally, the current action may be executed in the current application window to navigate to a subsequent application window. More specifically, the current action click(Log-In-Button) may be converted by test script generator 13 into a line of test script click(link("Login")) by substituting the application element placeholder Log-In-Button in the current action with a corresponding script-level locator (e.g., link("Login")) indicated in the elements-per-state table (see FIG. 6A). The line of test script click(link("Login")) may then be executed by the testing tool 19 in the current application window (i.e., webpage 14) to navigate to the subsequent application window (i.e., webpage 16). This discussion completes the processing of the fourth test case segment.

Next, test script generator 13 may determine whether a subsequent test case segment exists in the ordered list of test case segments. In the instant case, an additional test case segment exists. FIG. 11A depicts test case segments with the indication of the current test case segment advanced from the previously processed test case segment. The current test case segment is now "Click Create New Account."

Next, test script generator 13 may attempt to determine a current state by determining a collection of application elements that are present in the current application window (i.e., webpage 16). In the present example, the collection of application elements that are present in webpage 16 include email field 36, password field 38, submit login button 40 and create account button 42. Since this collection of application elements does not match those of any of the states present in the elements-per-state table 66 (see FIG. 6A), test script generator 13 determines that a new state needs to be created.

FIG. 11B depicts an updated elements-per-state table, with the addition of the login state. The login state is defined by the collection of application elements that are present in webpage 16, which include email field 36, password field 38, submit login button 40 and create account button 42. The script-level locators associated with each of the application elements may also be included in the updated elements-per-state table, as shown in FIG. 11B.

Next, the test script generator 13 may determine whether there are any existing actions originating from the current state and belonging to the set of translations that sufficiently correspond to the current test case segment. In the present case, there are no existing actions originating from the current state, since there is no entry for the login state in the actions-per-state table. See FIG. 10I. Since this determination fails, test script generator 13 may attempt to generate a new blueprint action for the current test case segment.

Next, test script generator 13 may determine whether any previously translated actions from the set of translations sufficiently correspond to the current test case segment and reference only application elements contained within the collection of application elements, which in the present example includes email field 36, password field 38, submit login button 40 and create account button 42. Referring back to FIG. 10I, one can see that none of the blueprint actions in the actions-per-state table reference any of the application elements in the current state (i.e., login state). Therefore, the attempt to generate a new action by recycling or repurposing existing blueprint actions fails. With the attempt to "recycle" or "repurpose" existing blueprint actions failing, test script generator 13 may then attempt to generate a blueprint action from scratch, as illustrated in FIGS. 11C-11H.

Test script generator 13 may employ the above-described rule-based generator to generate a natural language description of each application element (i.e., email field 36, password field 38, submit login button 40 and create account button 42) present in the current state (i.e., login state) using text locators. The rule-based generated description of each application element using text locators is recorded in the table of FIG. 11C.

Next, a rule-based generator may be used to generate a natural language description of the current application page (i.e., webpage 16). The output of the a rule-based generator is provided in FIG. 11D.

Next, as illustrated in FIG. 11E, test script generator 13 may use an AI engine 111 to determine a minimum number of application elements used by the test case segment "Click Create New Account" in the web page as described by the natural language description of FIG. 11D. In the present example, the response of the AI engine 111 is 1 (i.e., 1 is the minimum number of application elements).

Next, as illustrated in FIG. 11F, test script generator 13 may use an AI engine 111 to determine a maximum number of application elements used by the test case segment "Click Create New Account" in the web page as described by the natural language description of FIG. 11D. In the present example, the response of the AI engine 111 is 1 (i.e., 1 is the maximum number of application elements).

Next, test script generator 13 may generate candidate blueprint actions, each acting on a number of application elements between the minimum and maximum number of application elements (inclusive) as determined by the AI engine 111. As the minimum and maximum number both equal 1, test script generator 13 may generate candidate blueprint actions, each with a single application element, as shown in FIG. 11G. The test script generator 13 may then use a rule-based generator to describe each of the blueprint actions in natural language, as shown in FIG. 11G. Finally, an AI engine 111 may be used to determine a similarity score between the current test case segment and each of the candidate natural language phrases recorded in the table of FIG. 11G. The similarity scores are recorded in FIG. 11H. The natural language phrase "Click a button which can be accessed with the locator link("Create New Account")" received the highest similarity score of 0.92, and further this similarity score was above the minimum threshold of 0.80. Therefore, the newly created blueprint action of click(Create-Account-Button) is determined as the current action that matches the current test case segment "Click Create New Account."

As shown in FIG. 11I, the actions-per-state table may be modified to include the new blueprint action of click(Create-Account-Button) in the login state.

As shown in FIG. 11J, the new translation from the current test case segment "Click Create New Account" to the blueprint action click(Create-Account-Button) may be appended to the end of the ordered list of translations, along with the AI determined similarity score that was recorded in FIG. 11H.

As shown in FIG. 11K, the set of translations may be updated to include the new translation from the current test case segment "Click Create New Account" to the blueprint action click(Create-Account-Button), along with the AI determined similarity score that was recorded in FIG. 11H.

Finally, the current action may be executed in the current application window to navigate to a subsequent application window. More specifically, the current action click(Create-Account-Button) may be converted by test script generator 13 into a line of test script click(link("Create New Account")) by substituting the application element placeholder Create-Account-Button in the current action with a corresponding script-level locator (e.g., link("Create New Account")) indicated in the elements-per-state table (see FIG. 11B). The line of test script click(link("Create New Account")) may then be executed by the testing tool 19 in the current application window (i.e., webpage 16) to navigate to the subsequent application window (i.e., webpage 18). This discussion completes the processing of the fifth test case segment.

Next, test script generator 13 may determine whether a subsequent test case segment exists in the ordered list of test case segments. In the instant case, no additional test case segment exists. For a more efficient implementation, it is possible to perform the determination of whether a subsequent test case segment exists in the ordered list of test case segments prior to executing the current action in the current application window. If a subsequent test case segment does not exist, test script generator 13 may omit the step of executing the current action in the current application window.

Test script generator 13 may then generate a test script based on the respective blueprint actions contained within the ordered list of translations. In one embodiment, each of the blueprint actions may be translated into a corresponding line of test script using a rule-based generator. FIG. 11L depicts the result of such translation, in which a test script (that adheres to the syntax from Test Designer® of Appvance Inc. of Santa Clara, CA) has been generated from the ordered list of blueprint actions. The translation from a blueprint action to a line of test script was performed by replacing each application element placeholder with the corresponding script-level locator (as was previously explained in the examples). It is noted that a rule-based generator may be employed to generate other test scripts that adhere to the syntax from Selenium® (an open source umbrella project for a range of tools and libraries that support browser automation), Appium® (an open source automation tool for running scripts and testing native applications, mobile-web applications and hybrid applications), etc.

Testing tool 19 may then execute the test script on a subsequent version of application 17' (as previously described in FIG. 1A) or on application 17 executing within environment 25 (as previously described in FIG. 1B).

If a test script is successfully generated, test script generator 13 may optionally reward all similarity scores in the ordered list of translations, for example, by multiplying all similarity scores by a scale factor number greater than 1, and taking the minimum of the scaled value and 100%. In the example of FIG. 12A, the scale factor was 1.1, and the ordered list of translations includes updated similarity scores after the rewarding procedure. Test script generator 13 may optionally update the set of translations to include the updated similarity scores for the translations present in the ordered list of translations, as shown in FIG. 12B. The rationale as to why the similarity scores are rewarded is that the successful generation of a test script provides an added degree of confidence that the translations are correct. If, however, one or more of the translations were not correct, it is likely that the test script generation process would have aborted part way through the conversion procedure, as demonstrated by the following "negative" example.

FIGS. 13A-13H, 14A-14E and 15A-15B depict examples of a process to convert a test case into a test script, in which the process aborts before the test script is generated. For the example that starts in FIG. 13A, certain assumptions are made:

(1) It is assumed that the application 17 is the web application described in FIGS. 2A-2F.
(2) It is assumed that the elements-per-state table is initialized to that shown in FIG. 6A (i.e., there is some prior knowledge of the states of the web application, but not a complete understanding).
(3) It is assumed that the actions-per-state table is initialized to that shown in FIG. 6B (i.e., there is some prior knowledge of the actions of the web application, but not a complete understanding).
(4) It is assumed that the reaction-per-action table is initialized to that shown in FIG. 6C (i.e., there is some prior knowledge of the reactions of the web application, but not a complete understanding).
(5) It is assumed that the set of translations is initialized to that shown in FIG. 6D (i.e., there is a partial glossary that has been created storing past bindings that have been created between blueprint actions and test case segments).

The conversion process may begin by initializing a variable to store an ordered list of translations. Such variable in the form of a table (or other data structure) is shown in FIG. 7A.

Figure 13A:
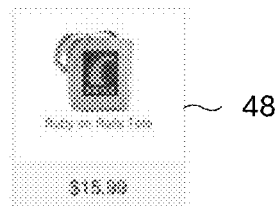
FIG. 13A depicts a test case that includes text and an image, in accordance with one embodiment of the invention.

Next, a test case may be received. For the instant example, test case 11 that is depicted in FIG. 13A is received. In contrast to the test case 11 depicted in FIG. 7A, the test case 11 depicted in FIG. 13A contains an image 48. The example will demonstrate how the test script generator 13 is able to process a test case containing an image. To clarify, the inclusion of the image 48 is not the reason that the test script generation process aborts prior to the generation of the test script.

Figure 13B:
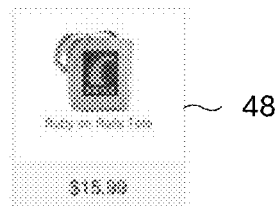
FIG. 13B depicts the test case of FIG. 13A being segmented into test case segments and an indication of the current test case segment, in accordance with one embodiment of the invention.

Next, test case 11 may be segmented into an ordered list of test case segments, the result of which is depicted in FIG. 13B. In the instant example, the AI engine 111 (or human testing engineer) is able to recognize that the first two lines of the test case form a single test case segment, and not two. The order of the test case segments is provided in the first column of the table of FIG. 13B.

Next, the testing tool 19 may navigate to a current application window of the application 17. More specifically, the test script generator 13 may, based on user input, navigate to an initial application window of the application 17 from which the test case 11 is to be performed. In the instant example, the current application window is webpage 10 depicted in FIG. 2B.

Next, the test script generator 13 may assign the first test case segment (i.e., Select this product [image 48]) in the ordered list of test case segments as a current test case segment. The current test case segment is indicated with a block arrow in FIG. 13B.

Next, the test script generator 13 may attempt to determine a current state by determining a collection of application elements that are present in the current application window (i.e., webpage 10). In the present example, the collection of application elements that are present in webpage 10 include login button 20 and Ruby-on-Rails-Tote object 22. Since this collection of application elements matches those of the welcome state in the elements-per-state table 66, the current state is determined to be the welcome state.

Next, the test script generator 13 may determine whether the current test case segment contains any images. In the present example, the current test case segment contains image 48. In response to such determination, test script generator 13 may use an AI engine 111 to perform an image-to-text translation of each of the images. FIG. 13C shows the image-to-text translation of image 48. Next, test script generator 13 may modify the current test case segment by replacing image 48 within the current test case segment with the AI generated textual description of the image 48, as depicted in FIG. 13D. The current test case segment is now "Select this product which matches this description [This is a product display card that includes an image of a "Ruby on Rails Tote," the product name in text, and the price "$15.99" prominently shown below.]."

FIGS. 13E-13F depict an example of a process for determining a current action that matches the current test case segment. The test script generator 13 may determine whether any existing actions originating from the current state and belonging to the set of translations sufficiently correspond to the current test case segment. In the present example, the blueprint actions which are present in the current state (i.e., welcome state) are click(Ruby-on-Rails-Tote), assertTrue(Log-In-Button.isEnabled( )) and click (Log-In-Button). The blueprint actions which are present in the set of translations are click(Ruby-on-Rails-Tote), assertTrue(Log-In-Button.isEnabled( )). Therefore, the intersection of these sets of blueprint actions are click(Ruby-on-Rails-Tote), assertTrue(Log-In-Button.isEnabled( )), and these blueprint actions (i.e., candidate blueprint actions) common to both the current state and the set of translations have been identified in the tables of FIG. 13E with a dotted background.

Next, as shown in FIG. 13F, the test script generator 13 may utilize an AI engine 111 to determine a similarity score between the current test case segment (i.e., "Select this product which matches this description [This is a product display card that includes an image of a "Ruby on Rails Tote," the product name in text, and the price "$15.99" prominently shown below.]") and each of the test case segments mapped to the candidate blueprint actions. The similarity scores returned by the AI engine 111 are recorded in the table of FIG. 13F. The test case segment "Select the Ruby on Rail tote product" has the highest similarity score of 0.85, and further this score is above the minimum threshold of 0.80, so the best matching test case segment is determined to be "Select the Ruby on Rails tote product." From the set of translations, the blueprint action click(Ruby-on-Rails-Tote) corresponding to the best matching test case segment "Select the Ruby on Rails tote product" is then determined as the current action that matches the current test case segment "Select this product which matches this description [This is a product display card that includes an image of a "Ruby on Rails Tote," the product name in text, and the price "$15.99" prominently shown below.]

This translation along with its similarity score may then be added (or appended) to the ordered list of translations, as shown in FIG. 13G. In one embodiment, the translation may include the original test case segment with the image 48, as shown in FIG. 13G. In another embodiment, the translation may include the test case segment in which the image 48 has been replaced with the AI generated image-to-text conversion (i.e., the transformed test case segment), not depicted.

This translation may also be added to the set of translations, as shown in FIG. 13H. As explained above, the similarity score used for the translation in the set of translations may be computed as the similarity score between click(Ruby-on-Rails-Tote) and "Select the Ruby on Rails tote product" (i.e., 94%) from the set of translations depicted in FIG. 13E multiplied by the AI-generated similarity score (i.e., 85%) from FIG. 13G, which equals 80%.

Finally, the current action may be executed in the current application window to navigate to a subsequent application window. More specifically, the current action click(Ruby-on-Rails-Tote) may be converted by test script generator 13 into a line of test script click(image ($product)) by substituting the application element placeholder Ruby-on-Rails-Tote in the current action with a corresponding script-level locator (e.g., image ($product)) indicated in the elements-per-state table (see FIG. 6A). The line of test script click (image ($product)) may then be executed by the testing tool 19 in the current application window (i.e., webpage 10) to navigate to the subsequent application window (i.e., webpage 12). This discussion completes the processing of the first test case segment.

Figure 14A:
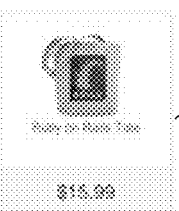
FIG. 14A depicts the test case segments with the indication of the current test case segment advanced from the previously processed test case segment, in accordance with one embodiment of the invention.

Next, test script generator 13 may determine whether a subsequent test case segment exists in the ordered list of test case segments. In the instant case, an additional test case segment exists. FIG. 14A depicts test case segments with the indication of the current test case segment advanced from the previously processed test case segment. The current test case segment is now "Type credentials."

Next, the test script generator 13 may attempt to determine a current state by determining a collection of application elements that are present in the current application window (i.e., webpage 12). In the present example, the collection of application elements that are present in webpage 12 include login button 20 and Add-To-Cart button 28. Since this collection of application elements matches those of the product state in the elements-per-state table 66 (see FIG. 6A), the current state is determined to be the product state.

Next, the test script generator 13 may determine whether there are any existing actions originating from the current state and belonging to the set of translations that sufficiently correspond to the current test case segment. In the present case, there are no existing actions originating from the current state, since there is no entry for the product state in the actions-per-state table. See FIG. 6B. Since this determination fails, test script generator 13 attempts to generate a new blueprint action for the current test case segment, in accordance with the example in FIGS. 14B-14J.

As illustrated in FIGS. 14B and 14C, test script generator 13 may determine whether any previously translated actions from the set of translations sufficiently correspond to the current test case segment and reference only application elements contained within the collection of application elements, which in the present example includes login button 20 and Add-To-Cart button 28. More specifically, test script generator 13 may determine whether any blueprint actions in the actions-per-state table reference application elements contained within the collection of application elements. In the present case, the blueprint actions assertTrue(Log-In-Button.isEnabled( )) and click(Log-In-Button) both reference login button 20. The test script generator 13 then determines whether any of these blueprint actions assertTrue(Log-In-Button.isEnabled( )) and click(Log-In-Button) are present in the set of translations. In the present case, the assertTrue(Log-In-Button.isEnabled( )) is present in the set of translations, and as such, assertTrue(Log-In-Button.isEnabled( )) may be regarded as a candidate blueprint action (highlighted with a dotted background in the tables of FIG. 14B). Finally, test script generator 13 may determine a similarity score between the current test case segment "Type credentials" and the test case segment "Verify that the Login button is enabled" which corresponds to the candidate blueprint action of assertTrue(Log-In-Button.isEnabled( )). As previously discussed, an AI engine 111 (i.e., an LLM) may be used to generate this similarity score. In the present example, the AI generated similarity score is 0.32, which is below the minimum threshold of 0.80, so the attempt to generate a new action based on the procedure described in FIGS. 14B and 14C fails.

Next, as illustrated in FIGS. 14D-14F, test script generator 13 may determine whether any blueprint actions that are not included in the set of translations sufficiently correspond to the current test case segment and reference only application elements contained within the collection of application elements. In the present example, the only blueprint action that is not included in the set of translations and references only application elements contained within the collection of application elements is the click(Log-In-Button) blueprint action. As explained above in FIG. 8E, to determine whether this blueprint action sufficiently corresponds to the current test case segment, a rule-based generator may be first used to translate the blueprint action into a natural language phrase. As was previously explained, the blueprint action click(Log-In-Button) may be translated into the natural language phrase "Click a button which can be accessed with the locator link("Login")." Finally, test script generator 13 may determine a similarity score between the current test case segment "Type credentials" and the candidate natural language (NL) phrase "Click a button which can be accessed with the locator link("Login")." In the present example, the AI generated similarity score is 0.26, which is below the minimum threshold of 0.80, so the attempt to generate a new action based on the procedure described in FIGS. 14D-14F also fails.

With the attempts (as illustrated in FIGS. 14B-14F) to "recycle" or "repurpose" existing blueprint actions failing, test script generator 13 may then attempt to generate a blueprint action from scratch, as illustrated in FIGS. 14G-14J. First, test script generator 13 may employ an AI engine 111 to perform image-to-text translation for images 49 and 51 present in the script-level locators of the current state (i.e., product state). See FIG. 6A. The output for the image-to-text translation is recorded in the top table of FIG. 14G. Next, test script generator 13 may employ the above-described rule-based generator to generate a natural language description of each application element (i.e., Log-In-Button, Add-To-Cart-Button) present in the current state (i.e., product state) using text locators. The output of the rule-based generated description of each application element using text locators is recorded in the middle table of FIG. 14G. Next, both descriptions (i.e., image-to-text translation and rule-based generated description) for each application element may be combined into a single natural language description, as shown in the bottom table of FIG. 14G.

Next, a rule-based generator may be used to generate a natural language description of the current application page (i.e., webpage 12). The output of the rule-based generator is provided in FIG. 14H.

Next, as illustrated in FIG. 14I, test script generator 13 may use an AI engine 111 to determine a minimum number of application elements used by the test case segment "Type credentials" in the web page as described by the natural language description of FIG. 14H. In the present example, the response of the AI engine 111 is 0 (i.e., 0 is the minimum number of application elements).

Next, as illustrated in FIG. 14J, test script generator 13 may use an AI engine 111 to determine a maximum number of application elements used by the test case segment "Type credentials" in the web page as described by the natural language description of FIG. 14H. In the present example, the response of the AI engine 111 is 0 (i.e., 0 is the maximum number of application elements).

The minimum and maximum number of elements used by the test case segment both being 0 indicates that the attempt to create a blueprint action from scratch has failed. As test script generator 13 is unable to determine any current action that matches the current test case segment, the test script generation procedure may abort.

Optionally, test script generator 13 may then penalize all similarity scores in the ordered list of translations by multiplying all similarity scores in the ordered list of translations by a scale factor. In one embodiment, the scale factor is computed as the number of test case segments that were successfully translated divided by the total number of test case segments in the test case. The intuition behind this scale factor is that if the number of test case segments that were successfully translated is a large fraction of the total number of test case segments (i.e., the translation almost completed), then it is more likely than not that the translations that led up to the test script generation process aborting were correct, and the penalty should be smaller. On the other hand, if the number of test case segments that were successfully translated were only a small fraction of the total number of test case segments (i.e., the translation aborting almost immediately), there is a low degree of confidence that any of the translations that led up to the test script generation process aborting were correct, and the penalty should be larger.

In the present example, the number of test case segments that were successfully translated was 1, and the total number of test case segments in the test case was 4, resulting in the low scale factor of 0.25. FIG. 15A depicts an updated ordered list of translations after all similarity scores (in this case, there is only one similarity score) have been multiplied by the scale factor of 0.25. Further, test script generator 13 may update the set of translations to include translations from the ordered list of translations. FIG. 15B depicts the updated set of translations which includes the translations from the ordered list of translations of FIG. 15A. At this point, it is not conclusive whether there was an error in the test case 11, application 17 or both. A test engineer would need to review the test case 11 and/or application 17 to determine the source of error. It is noted that the involvement of a test engineer at this stage to determine the source of error is not a shortcoming of the present scheme, as even in the conventional scheme, a test engineer would likely be needed to determine the source of error as well.

FIGS. 16A-16D depicts a flowchart 100 of a process for (1) constructing a test script from a test case and a time-evolving model of an application, and (2) updating the time-evolving model of the application. The flowcharts of FIGS. 16A-16D summarize the processes that were described in the above examples from FIGS. 7A-7F, 8A-8O, 9A-9F, 10A-10K, 11A-11L, 12A-12B, 13A-13H, 14A-14J and 15A-15B.

In step 102, test script generator 13 may initialize a variable to store an ordered list of translations. An example of step 102 was provided above in FIG. 7A. In step 104, test script generator 13 may receive a test case. Examples of test cases were provided above in FIGS. 3E and 13A. In step 106, test script generator 13 may segment the test case into an ordered list of test case segments. Examples of step 106 were provided above in FIGS. 7B and 13B. In step 108, test script generator 13 may navigate to a current application window of the application 17. In the examples above, the browser navigated to webpage 10 at the beginning of the test script creation process. In step 110, test script generator 13 may assign an initial test case segment in the ordered list of test case segments as a current test case segment. Examples of step 110 were provided above in FIGS. 7B and 13B, in which the block arrow designated the initial test case segment.

In step 112, based on a collection of application elements present in the current application window, the test script generator 13 may determine whether a first state exists in the state machine that corresponds to the current application window. Examples of step 112 were discussed above in association with the elements-per-state tables depicted in FIGS. 6A and 11B.

If the first state exists ("Yes" branch of step 114), test script generator 13 may assign the first state as the current state (step 116). If the first state does not exist ("No" branch of step 114), test script generator 13 may create a new state that is defined by the collection of application elements present in the current application window (step 118), modify the state machine to incorporate the new state (step 120) and assign the new state as the current state (step 122). An example of steps 118, 120 and 122 was provided above in FIG. 11B, in which the new login state was added to the elements-per-state table, and the new login state was assigned as the current state.

In step 124, test script generator 13 may attempt to determine a current action that originates from the current state and sufficiently corresponds to the current test case segment. Examples of step 124 were provided above:

- in FIGS. 7C-7D, in which test script generator 13 determined the current action of click(Ruby-on-Rails-Tote) originated from the current state of welcome state and sufficiently corresponded to the current test case segment of "Select the Ruby on Rails tote".
- in FIGS. 8B-8L, in which test script generator 13 determined the current action of click(Add-To-Cart-Button) originated from the current state of product state and sufficiently corresponded to the current test case segment of "Add the product to cart".
- in FIGS. 9B-9C, in which test script generator 13 determined the current action of assertTrue(Log-In-Button.isEnabled( )) originated from the current state of shopping cart state and sufficiently corresponded to the current test case segment of "Verify that the Login button is enabled".
- in FIGS. 10B-10H, in which test script generator 13 determined the current action of click(Log-In-Button) originated from the current state of shopping cart state and sufficiently corresponded to the current test case segment of "Click login".
- in FIGS. 11C-11H, in which test script generator 13 determined the current action of click(Create-Account-Button) originated from the current state of login state and sufficiently corresponded to the current test case segment of "Click Create New Account".
- in FIGS. 13C-13F, in which test script generator 13 determined the current action of click(Ruby-on-Rails-Tote) originated from the current state of welcome state and sufficiently corresponded to the current test case segment of "Select this product [image 48]".
- in FIGS. 14B-14J, in which test script generator 13 attempted to determine the current action from the current state of product state, but failed to do so.

At step 128, test script generator 13 may append a translation to the ordered list of translations, the translation including a mapping between the current action and the current test case segment, and optionally a similarity score between the former and latter. Examples of step 128 were provided above:

- in FIG. 7E, in which test script generator 13 appended the translation "Select the Ruby on Rails tote⇔click(Ruby-on-Rails-Tote)" with a similarity score of 95% to the ordered list of translations.
- in FIG. 8N, in which test script generator 13 appended the translation "Add the product to cart⇔click(Add-To-Cart-Button)" with a similarity score of 90% to the ordered list of translations.
- in FIG. 9E, in which test script generator 13 appended the translation "Assert that login button is enabled⇔assertTrue(Log-In-Button.isEnabled( ))" with a similarity score of 97% to the ordered list of translations.
- in FIG. 10J, in which test script generator 13 appended the translation "Click login⇔click(Log-In-Button)" with a similarity score of 88% to the ordered list of translations.
- in FIG. 11J, in which test script generator 13 appended the translation "Click Create New Account⇔click(Create-Account-Button)" with a similarity score of 92% to the ordered list of translations.
- in FIG. 13G, in which test script generator 13 appended the translation "Select this product [image 48]⇔click(Ruby-on-Rails-Tote)" with a similarity score of 85% to the ordered list of translations.

At step 129, if a new translation is determined, test script generator 13 may optionally add the new translation to the set of translations with a similarity score between the former and the latter. Examples of step 129 were provided above:

- in FIG. 7F, in which test script generator 13 added the translation "click(Ruby-on-Rails-Tote)⇔Select the Ruby on Rails tote" with a similarity score of 88% to the set of translations.
- in FIG. 8O, in which test script generator 13 added the translation "click(Add-To-Cart-Button)⇔Add the product to cart" with a similarity score of 90% to the set of translations.
- in FIG. 9F, in which test script generator 13 added the translation "assertTrue(Log-In-Button.isEnabled( ))⇔ Assert that login button is enabled" with a similarity score of 88% to the set of translations.
- in FIG. 10K, in which test script generator 13 added the translation "click(Log-In-Button)⇔Click login" with a similarity score of 88% to the set of translations.
- in FIG. 11K, in which test script generator 13 added the translation "click(Create-Account-Button)⇔Click Create New Account" with a similarity score of 92% to the set of translations.
- in FIG. 13H, in which test script generator 13 added the translation "click(Ruby-on-Rails-Tote)⇔Select this product [image 48]" with a similarity score of 80% to the set of translations.

At step 130, test script generator 13 (with the assistance of testing tool 19) may execute the current action in the current application window to navigate to a subsequent application window. Examples of step 130 were provided above:

- in connection with the test case segment "Select the Ruby on Rails tote," in which test script generator 13 executed the current action click(Ruby-on-Rails-Tote) in webpage 10 to navigate to webpage 12.
- in connection with the test case segment "Add the product to cart," in which test script generator 13 executed the current action click(Add-To-Cart-Button) in webpage 12 to navigate to webpage 14.
- in connection with the test case segment "Assert that login button is enabled," in which test script generator 13 executed the current action assertTrue(Log-In-Button-.isEnabled( )) in webpage 14 which did not result in the navigation to another webpage.
- in connection with the test case segment "Click login," in which test script generator 13 executed the current action click(Log-In-Button) in webpage 14 to navigate to webpage 16.
- in connection with the test case segment "Click Create New Account," in which test script generator 13 executed the current action click(Create-Account-Button) in webpage 16 to navigate to webpage 18.
- in connection with the test case segment "Select this product [image 48]," in which test script generator 13 executed the current action click(Ruby-on-Rails-Tote) in webpage 10 to navigate to webpage 12.

At step 132, test script generator 13 may determine whether a subsequent test case segment exists in the ordered list of test case segments. If so ("Yes" branch of step 132), test script generator 13 may assign the subsequent application window as the current application window (step 133) and assign the subsequent test case segment as the current test case segment (step 134). Examples of step 134 were provided above in FIGS. 8A, 9A, 10A, 11A and 14A. Following step 134, the process may return to step 112. If not ("No" branch of step 132), test script generator 13 may generate the test script based on respective actions contained within the ordered list of translations (step 136). An example of step 136 was provided above in FIG. 11L. At step 138, test script generator 13 may reward all similarity scores in the ordered list of translations. An example of step 138 was provided above in FIG. 12A. At step 140, test script generator 13 may update the set of translations from the time-evolving model to include translations from the ordered list of translations. An example of step 140 was provided above in FIG. 12B. Optionally, in step 141, testing tool 19 may execute test script on application 17' in order to test application 17', or may run test script 15 on application 17 in environment 25, as described above in FIGS. 1A and 1B, respectively.

Returning to step 126, if a current action cannot be determined ("No" branch of step 126), test script generator 13 may abort the test script generation process, and the process may end. Optionally, test script generator 13 may continue to step 142 and determine whether the ordered list of translations includes at least one translation. If so ("Yes" branch of step 142), test script generator 13 may penalize all similarity scores in the ordered list of translations (step 144). An example of step 144 was provided above in FIG. 15A. At step 146, test script generator 13 may update the set of translations from the time-evolving model to include translations from the ordered list of translations, and then the process ends. An example of step 144 was provided above in FIG. 15B. If not ("No" branch of step 142), the process ends. It is noted that in either branch from step 142, no test script is generated.

Figure 17:
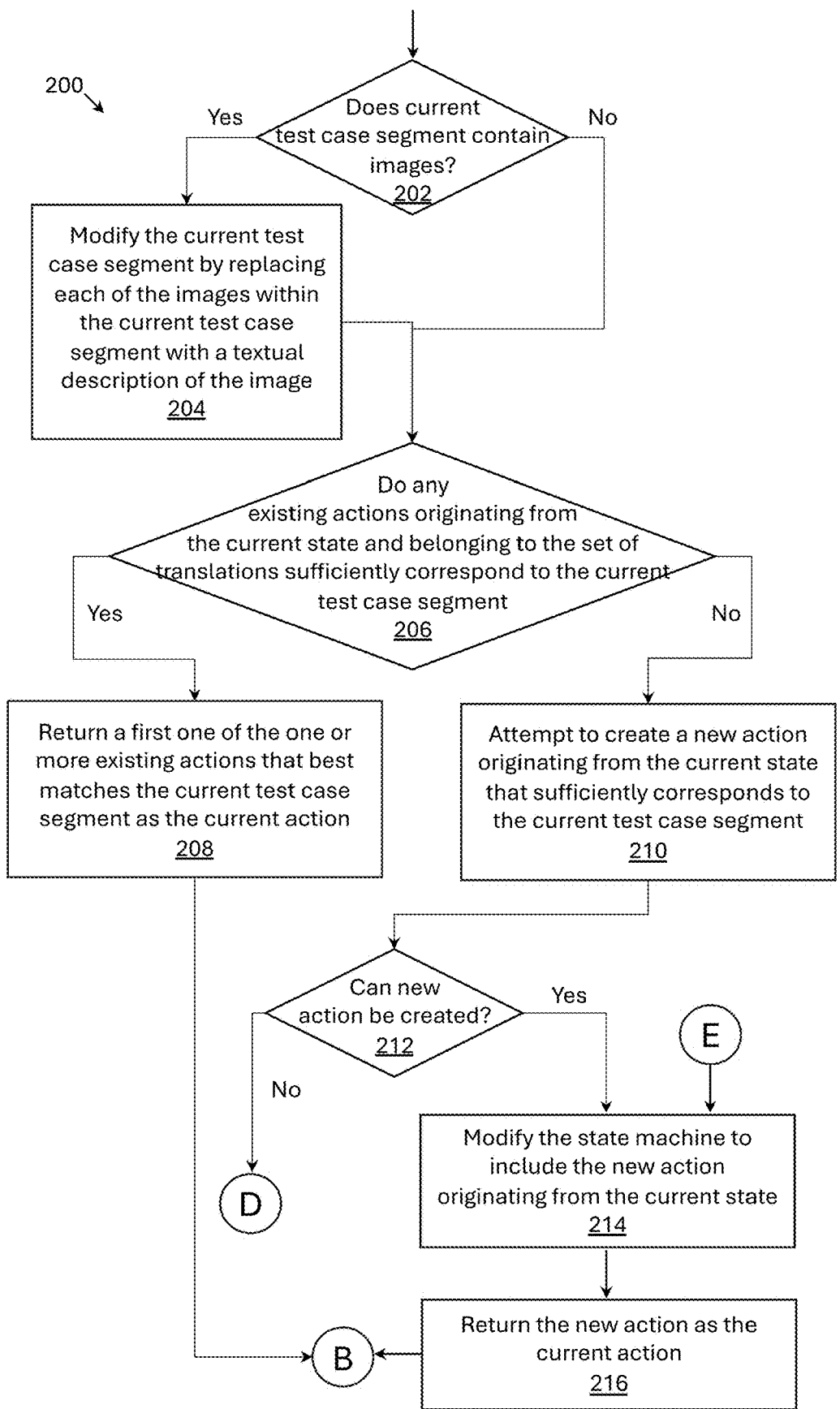
FIG. 17 depicts a flowchart providing additional details regarding the step of attempting to determine the current action originating from the current state that sufficiently corresponds to the current test case segment, in accordance with one embodiment of the invention.

FIG. 17 depicts a flowchart 200 providing additional details regarding the step of attempting to determine the current action originating from the current state that sufficiently corresponds to the current test case segment (step 124). At step 202, test script generator 13 may determine whether the current test case segment contains any images. If so ("Yes" branch of step 202), test script generator 13 may modify the current test case segment by replacing each of the images within the current test case segment with a textual description of the image. An example of step 204 was provided above in FIGS. 13C and 13D. If not ("No" branch of step 202) or following step 204, the process may proceed to step 206 in which the test script generator 13 may determine whether any existing actions originating from the current state and belonging to the set of translations sufficiently correspond to the current test case segment. Examples of step 206 were provided above:

- in FIG. 7C, in which test script generator 13 determined the existing action click(Ruby-on-Rails-Tote) originating from the welcome state and belonging to the set of translations sufficiently corresponded to the current test case segment "Select the Ruby on Rails tote."
- in the processing of the second test case segment "Add the product to cart," in which test script generator 13 determined that no existing actions originating from the product state and belonging to the set of translations sufficiently corresponded to the current test case segment "Add the product to cart."
- in the processing of the third test case segment "Assert that login button is enabled," in which test script generator 13 determined that no existing actions originating from the shopping cart state and belonging to the set of translations sufficiently corresponded to the current test case segment "Assert that login button is enabled."
- in FIGS. 10B-10C, in which test script generator 13 determined that the existing action assertTrue(Log-In- Button.isEnabled( )) originating from the shopping cart state and belonging to the set of translations failed to sufficiently correspond to the current test case segment "Click login."

in the processing of the fifth test case segment "Click Create New Account," in which test script generator 13 determined that no existing actions originating from the login state and belonging to the set of translations sufficiently corresponded to the current test case segment "Click Create New Account."

Figure 16A:
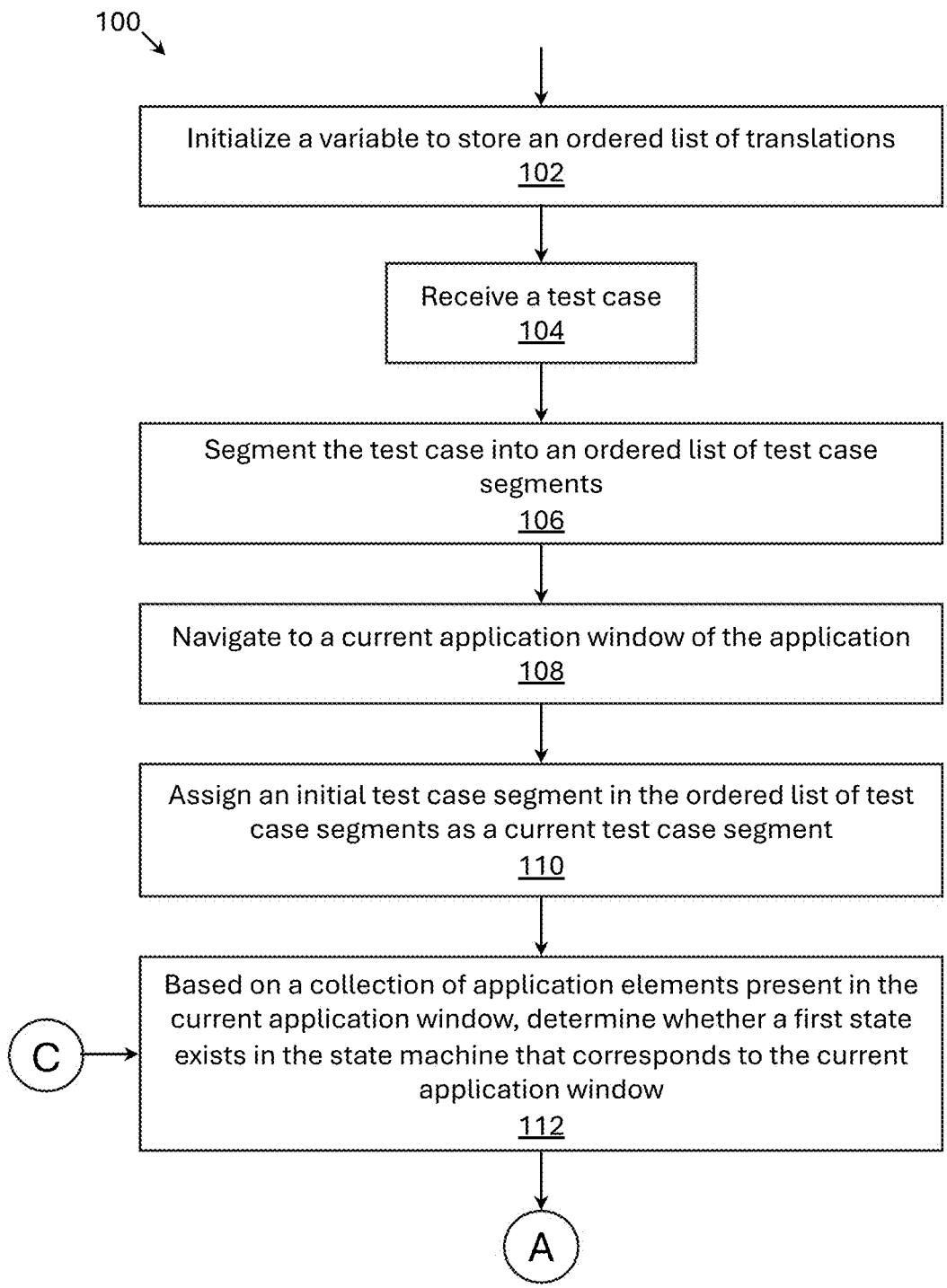
FIGS. 16A-16D depict a flowchart of a process for (1) constructing a test script from a test case and a time-evolving model of an application, and (2) updating the time-evolving model of the application, in accordance with one embodiment of the invention.
Figure 16B:
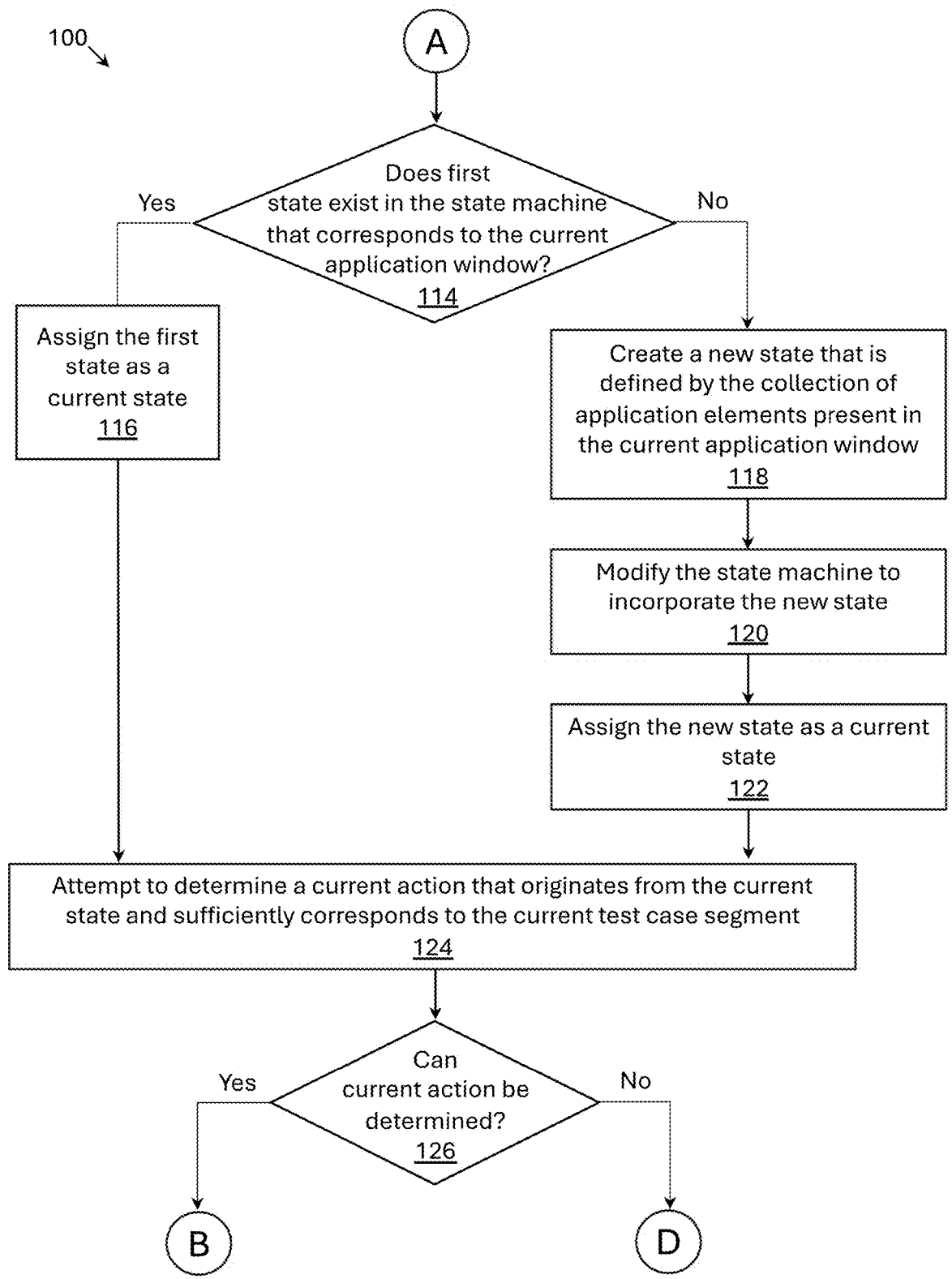
Figure 16C:
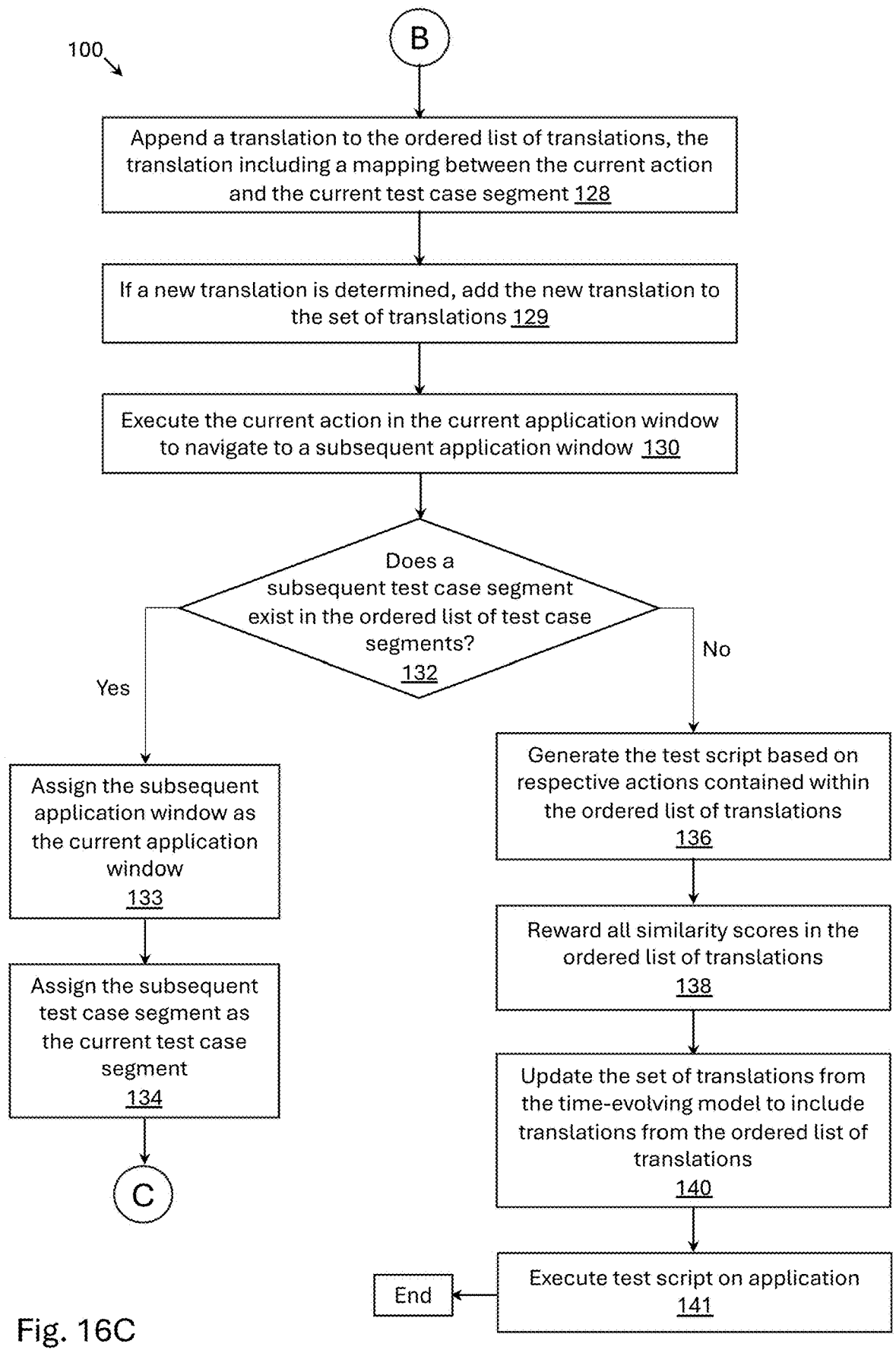
Figure 16D:
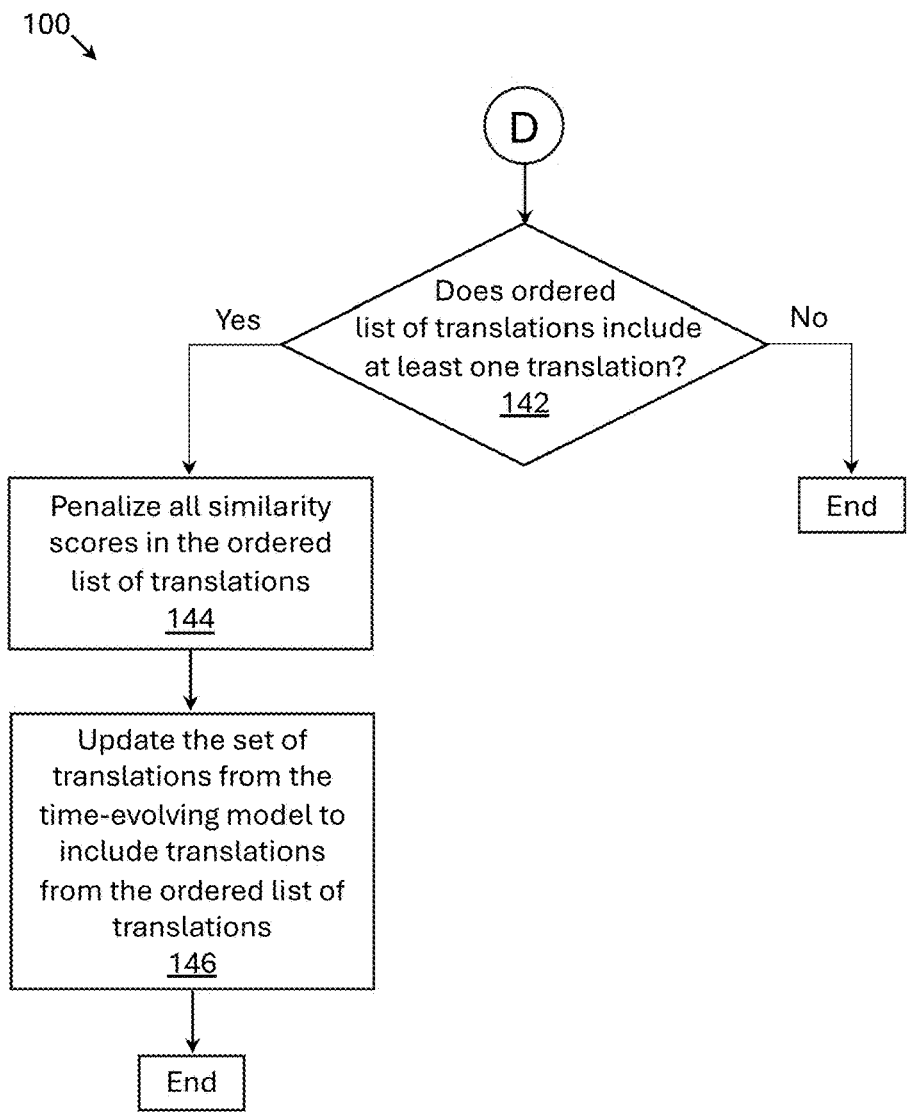

If there are existing actions originating from the current state and belonging to the set of translations that sufficiently correspond to the current test case segment ("Yes" branch of step 206), test script generator 13 may return a first one of the one or more existing actions that best matches the current test case segment as the current action (step 208), and the process continues from step 128 depicted in FIG. 16C. If there are no existing actions originating from the current state and belonging to the set of translations that sufficiently correspond to the current test case segment ("No" branch of step 206), test script generator 13 may attempt to create a new action originating from the current state that sufficiently corresponds to the current test case segment (step 210). Additional details regarding step 210 will be provided in FIGS. 18A-18C below. If a new action cannot be created ("No" branch of step 212), the process continues to step 142 depicted in FIG. 16D. If a new action can be created ("Yes" branch of step 212), test script generator 13 may modify the state machine to include the new action originating from the current state (step 214). Examples of step 214 were provided above:

in FIG. 8M, in which test script generator 13 added the new action of click(Add-To-Cart-Button) to the product state.

in FIG. 9D, in which test script generator 13 added the new action of assertTrue(Log-In-Button.isEnabled( )) to the shopping cart state.

in FIG. 10I, in which test script generator 13 added the new action of click(Log-In-Button) to the shopping cart state.

in FIG. 11I, in which test script generator 13 added the new action of click(Create-Account-Button) to the login state.

At step 216, test script generator 13 may return the new action as the current action, and the process may continue from step 128 depicted in FIG. 16C.

Figure 18A:
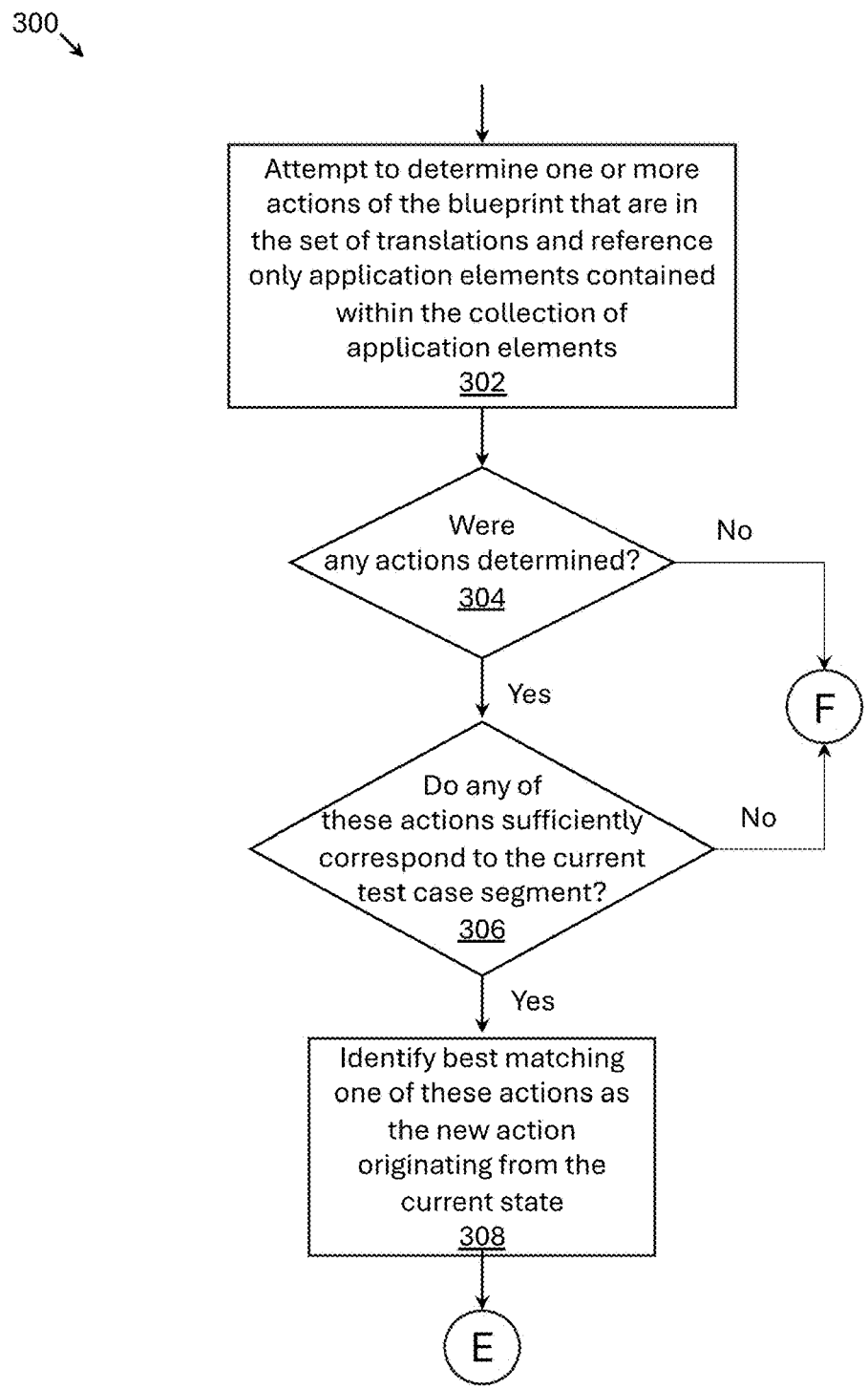
FIG. 18A depicts a flowchart of a process to create a new blueprint action by repurposing an existing blueprint action from the set of translations, in accordance with one embodiment of the invention.

FIG. 18A depicts a flowchart 300 of additional details of step 210 to create a new action originating from the current state that sufficiently corresponds to the current test case segment. As an overview, in flowchart 300, test script generator 13 may attempt to create the new action by repurpose an existing action from the set of translations. Since step 210 follows the "No" branch of step 206, implicitly, the existing action that is being repurposed does not originate from the current state, but rather originates from a state other than the current state. In step 302, test script generator 13 attempts to determine one or more actions of the blueprint that are in the set of translations and reference only application elements contained within the collection of application elements. If any actions are determined ("Yes branch" of step 304), test script generator 13 may determine whether any of these actions sufficiently correspond to current the test case segment (step 306). If so ("Yes" branch of step 306), test script generator 13 identifies the best matching one of these actions as the new action originating from the current state (step 308), and the process continues from step 214 of FIG. 17. Otherwise ("No" branch of step 304 or "No" branch of step 306), the process continues from step 310 of FIG. 18B.

Examples of steps 306 and 308 were provided above:

in FIGS. 8B and 8C, in which test script generator 13 determined that the previously translated action from the set of translations "assertTrue(Log-In-Button.isEnabled( ))" did not sufficiently correspond to the current test case segment "Add the product to cart," because it had a similarity score of 0.35 which was below the minimum threshold of 0.80.

in FIGS. 9B and 9C, in which test script generator 13 determined that the previously translated action from the set of translations "assertTrue(Log-In-Button.isEnabled( ))" did sufficiently correspond to the current test case segment "Assert that login button is enabled," because it had a similarity score of 0.90 which was above the minimum threshold of 0.80.

in FIGS. 10D and 10E, in which test script generator 13 determined that the previously translated action from the set of translations "assertTrue(Log-In-Button.isEnabled( ))" did not sufficiently correspond to the current test case segment "Click login," because it had similarity scores of 0.65 and 0.63 which were each below the minimum threshold of 0.80.

in the fifth test case segment "Click Create New Account," in which test script generator 13 determined that none of the previously translated actions from the set of translations reference the application elements in the current state (i.e., login state).

in FIGS. 14B and 14C, in which test script generator 13 determined that the previously translated action from the set of translations "assertTrue(Log-In-Button.isEnabled( ))" did not sufficiently correspond to the current test case segment "Type credentials," since it had a similarity score of 0.32 which was below the minimum threshold of 0.80.

Figure 18B:
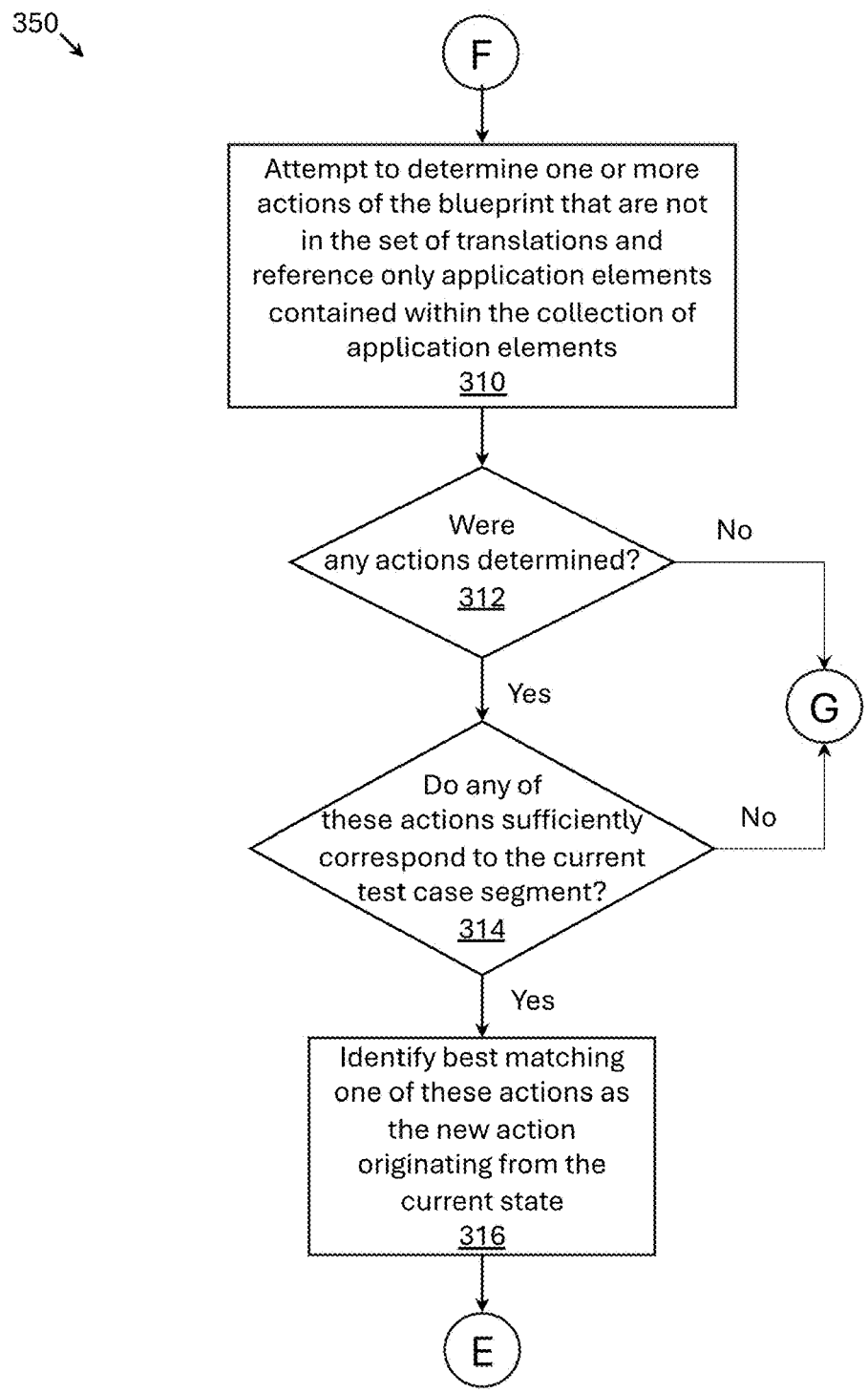
FIG. 18B depicts a flowchart of a process to create a new blueprint action by repurposing an existing blueprint action (i) from an existing state of the state machine (other than the current state) and (ii) that is not in the set of translations, in accordance with one embodiment of the invention.

FIG. 18B depicts a flowchart 350 of additional details of step 210 to create a new action originating from the current state that sufficiently corresponds to the current test case segment. As an overview, in flowchart 350, test script generator 13 may attempt to create the new action by repurpose an existing action from the blueprint that is not in the set of translations. Since step 210 follows the "No" branch of step 206, implicitly, the existing action that is being repurposed does not originate from the current state, but rather originates from a state other than the current state. In step 310, test script generator 13 may attempt to determine one or more actions of the blueprint that are not in the set of translations and reference only application elements contained within the collection of application elements. If any actions are determined ("Yes branch" of step 312), test script generator 13 may determine whether any of these actions sufficiently correspond to the current test case segment (step 314). If so ("Yes" branch of step 314), test script generator 13 may identify the best matching one of these actions as the new action originating from the current state (step 316), and the process continues from step 214 of FIG. 17. Otherwise ("No" branch of step 312 or "No" branch of step 314), the process may continue from step 318 of FIG. 18C.

Examples of steps 314 and 316 were provided above:

in FIGS. 8D-8F, in which test script generator 13 determined that the existing action click(Log-In-Button) from the blueprint that was not in the set of translations did not sufficiently correspond to the current test case segment "Add the product to cart," since its similarity score of 0.27 was below the minimum threshold of 0.80.

in FIGS. 10F-10H, in which test script generator 13 determined that the existing action click(Log-In-Button) from the blueprint that was not in the set of translations sufficiently corresponded to the current test case segment "Click login," because it had a similarity score of 0.88 which was above the minimum threshold of 0.80.

in the fifth test case segment "Click Create New Account," in which test script generator 13 determined that none of the actions from the blueprint (i.e., the actions-per-state table) reference the application elements in the current state (i.e., login state).

in FIGS. 14D-14F, in which test script generator 13 determined that the existing action click(Log-In-Button) from the blueprint that was not in the set of translations did not sufficiently correspond to the current test case segment "Type credentials," since its similarity score of 0.26 was below the minimum threshold of 0.80.

Figure 18C:
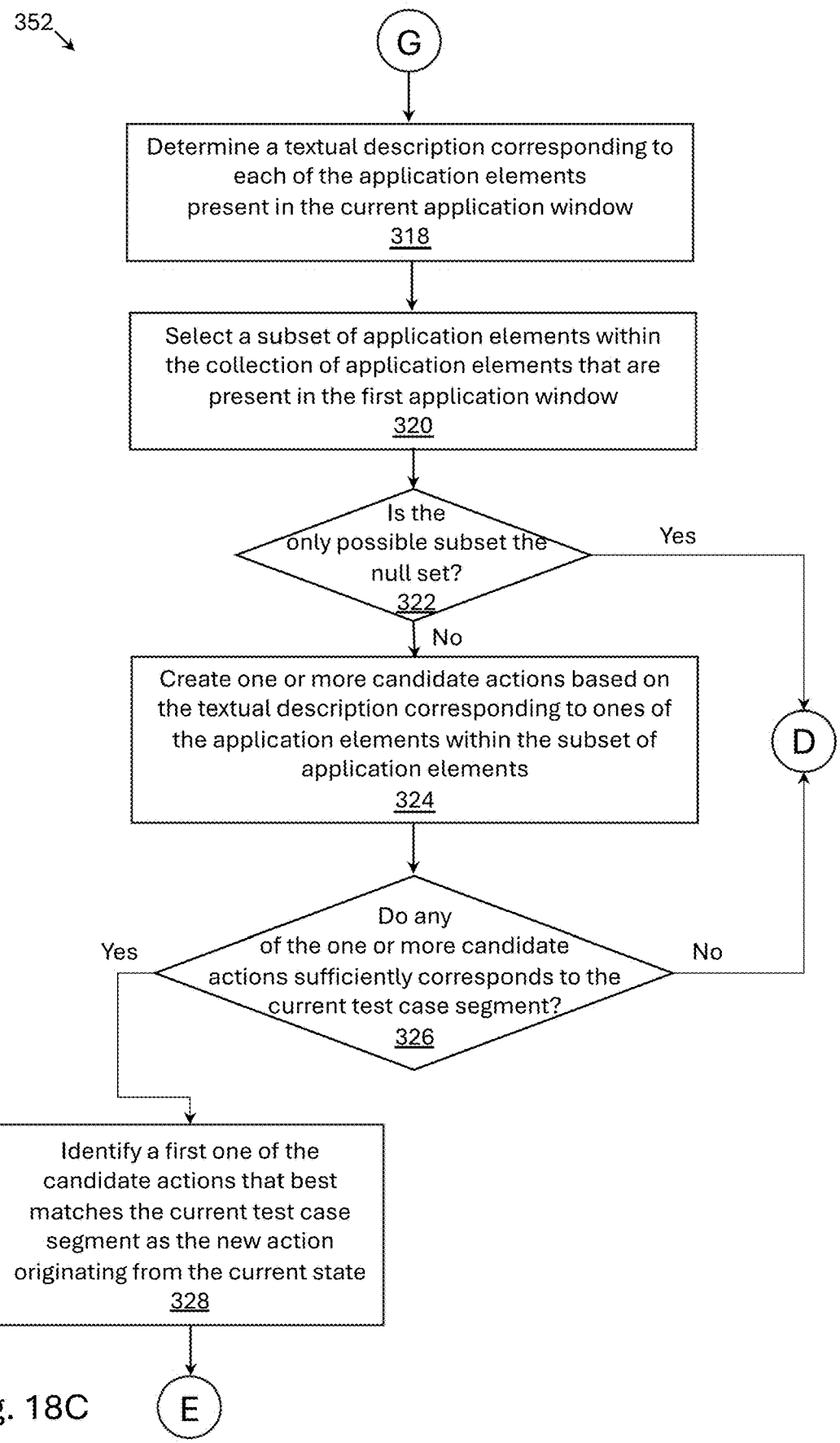
FIG. 18C depicts a flowchart of a process to create a new blueprint action by creating the blueprint action from scratch (i.e., without repurposing any existing blueprint actions), in accordance with one embodiment of the invention.

FIG. 18C depicts a flowchart 352 of a process to create a new blueprint action by creating the blueprint action from scratch (i.e., without repurposing an existing blueprint action). In step 318, test script generator 13 may determine a textual description corresponding to each of the application elements present in the current application window. Examples of step 318 were provided above in FIGS. 8G (top table), 11C and 14G (top table).

In step 320, test script generator 13 may select a subset of application elements within the collection of application elements that are present in the first application window. The subset may be between a minimum and maximum number of application elements used by the current test case segment in a textual description of the current application window (as determined by an AI engine 111). An example of step 320 was provided above in FIG. 8K in which the subset of application elements were login button 20 and add-to-cart button 28. An example of step 320 was also provided above in FIGS. 14I and 14J in which the subset of application elements was determined as the null set.

In step 322, test script generator 13 may determine whether the only possible subset is the null set. If so ("Yes" branch of step 322), the process proceeds to step 142 of FIG. 16D. If not ("No" branch of step 322), the process proceeds to step 324, in which test script generator 13 may create one or more candidate actions based on the textual description corresponding to ones of the application elements within the subset of application elements. An example of step 322 was provided above in FIG. 8K in which the two blueprint actions click(Log-In-Button) followed by click(Add-To-Cart-Button), and click(Add-To-Cart-Button) followed by click(Log-In-Button) were created. While not depicted in flowchart 352 for simplicity, it is understood (and was illustrated in FIG. 8K) that other subsets could be selected and steps 320, 322 and 324 could be repeated for those subsets.

At step 326, test script generator 13 may determine whether any of the one or more candidate actions sufficiently corresponds to the current test case segment. An example of step 326 was provided above in FIGS. 8K and 8L in which test script generator 13 determined that the click(Add-To-Cart-Button) blueprint action sufficiently corresponded to the current test case segment "Add the product to cart" since it had a similarity score of 0.90, which was above the minimum threshold of 0.80. If not ("No" branch of step 326), the process proceeds to step 142 of FIG. 16D. If so ("Yes" branch of step 326), test script generator 13 may identify a first one of the candidate actions that best matches the current test case segment as the new action originating from the current state (step 328), and the process proceed to step 214 of FIG. 17. An example of step 326 was provided above in FIGS. 8K and 8L in which test script generator 13 determined the click(Add-To-Cart-Button) blueprint action as the best matching candidate action.

The following example in FIGS. 19A-19C, 20, 21A-21G, 22A-22G and 23A-23D describes a variation of the method for constructing a test script from a test case and a model of an application, in which the model of the application is not updated. This instant method may be useful when the model of the application is already quite complete, so updates to the model are not necessary. This instant method may still be used even when the model of the application is less complete, but the method will be less efficient than in the above-described flow that does update the model of the application.

For the example that starts in FIG. 19A, certain assumptions are made:
(1) It is assumed that the application 17 is the web application described in FIGS. 2A-2F.
(2) It is assumed that the elements-per-state table is initialized to that shown in FIG. 19A (i.e., there is some prior knowledge of the states of the web application, but not a complete understanding).
(3) It is assumed that the actions-per-state table is initialized to that shown in FIG. 19B (i.e., there is some prior knowledge of the actions of the web application, but not a complete understanding).
(4) It is assumed that the reaction-per-action table is initialized to that shown in FIG. 19C (i.e., there is some prior knowledge of the reactions of the web application, but not a complete understanding).
(5) It is assumed that the set of translations is initialized to that shown in FIG. 20 (i.e., there is a partial glossary that has been created storing past bindings that have been created between blueprint actions and test case segments).

The conversion process may begin by initializing a variable to store an ordered list of actions. Such variable in the form of a table (or other data structure) is shown in FIG. 20.

Figure 21A:
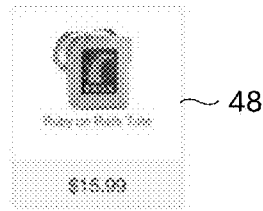
FIG. 21A depicts an example test case with an image, in accordance with one embodiment of the invention.
Figure 21B:
FIG. 21B depicts the test case of FIG. 21A being segmented into test case segments and an indication of the current test case segment, in accordance with one embodiment of the invention.

Next, a test case may be received. For the instant example, test case 11 that is depicted in FIG. 21A is received. The test case 11 depicted in FIG. 21A contains an image 48. Next, test case 11 may be segmented into an ordered list of test case segments, the result of which is depicted in FIG. 21B. In the instant example, the AI engine 111 (or human testing engineer) is able to recognize that the first two lines of the test case form a single test case segment, and not two. The order of the test case segments is provided in the first column of the table of FIG. 21B.

Next, the testing tool 19 may navigate to a current application window of the application 17. More specifically, the test script generator 13 may, based on user input, navigate to an initial application window of the application 17 from which the test case 11 is to be performed. In the instant example, the current application window is webpage 10 depicted in FIG. 2B.

Next, the test script generator 13 may assign the first test case segment (i.e., Select this product [image 48]) in the ordered list of test case segments as a current test case segment. The current test case segment is indicated with a block arrow in FIG. 21B.

Next, the test script generator 13 may attempt to determine a current state by determining a collection of application elements that are present in the current application window (i.e., webpage 10). In the present example, the collection of application elements that are present in webpage 10 include login button 20 and Ruby-on-Rails-Tote object 22. Since this collection of application elements matches those of the welcome state in the elements-per-state table 66 (see FIG. 19A), the current state is determined to be the welcome state.

Next, the test script generator 13 may determine whether the current test case segment contains any images. In the present example, the current test case segment contains image 48. In response to such determination, test script generator 13 may use an AI engine 111 to perform an image-to-text translation of each of the images. FIG. 21C shows the image-to-text translation of the image 48. Next, test script generator may modify the current test case segment by replacing image 48 within the current test case segment with the AI generated textual description of the image 48, as depicted in FIG. 21D. The current test case segment is now "Select this product which matches this description [This is a product display card that includes an image of a "Ruby on Rails Tote," the product name in text, and the price "$15.99" prominently shown below.]."

FIGS. 21E-21F depict an example of a process for determining a current action that matches the current test case segment. The test script generator 13 may determine whether any existing actions originating from the current state and belonging to the set of translations sufficiently correspond to the current test case segment. In the present example, the blueprint actions which are present in the current state (i.e., welcome state) are click(Ruby-on-Rails-Tote) and click(Log-In-Button). The blueprint actions which are present in the set of translations are click(Ruby-on-Rails-Tote) and click(Log-In-Button). Therefore, the intersection of these sets of blueprint actions are click(Ruby-on-Rails-Tote) and click(Log-In-Button), and these blueprint actions (i.e., candidate blueprint actions) common to both the current state and the set of translations have been identified in the tables of FIG. 21E with a dotted background.

Next, as shown in FIG. 21F, test script generator 13 may utilize an AI engine 111 to determine a similarity score between the current test case segment (i.e., "Select this product which matches this description [This is a product display card that includes an image of a "Ruby on Rails Tote," the product name in text, and the price "$15.99" prominently shown below.]") and each of the test case segments mapped to the candidate blueprint actions. The similarity scores returned by the AI engine 111 are recorded in the table of FIG. 21F. The test case segment "Select the Ruby on Rail tote product" has the highest similarity score of 0.85, and further this score is above the minimum threshold of 0.80, so the best matching test case segment is determined to be "Select the Ruby on Rails tote product." From the set of translations, the blueprint action click(Ruby-on-Rails-Tote) corresponding to the best matching test case segment "Select the Ruby on Rails tote product" is then determined as the current action that matches the current test case segment "Select this product which matches this description [This is a product display card that includes an image of a "Ruby on Rails Tote," the product name in text, and the price "$15.99" prominently shown below.]".

This translation, optionally along with its similarity score, may then be added (or appended) to the ordered list of actions, as shown in FIG. 21G. In one embodiment, the translation may include the original test case segment with the image 48, as shown in FIG. 21G. In another embodiment, the translation may include the test case segment in which the image 48 has been replaced with the AI generated image-to-text conversion (not depicted).

Finally, the current action may be executed in the current application window to navigate to a subsequent application window. More specifically, the current action click(Ruby-on-Rails-Tote) may be converted by test script generator 13 into a line of test script click(image ($product)) by substituting the application element placeholder Ruby-on-Rails-Tote in the current action with a corresponding script-level locator (e.g., image ($product)) indicated in the elements-per-state table (see FIG. 19A). The line of test script click(image ($product)) may then be executed by the testing tool 19 in the current application window (i.e., webpage 10) to navigate to the subsequent application window (i.e., webpage 12). This discussion completes the processing of the first test case segment.

Next, test script generator 13 may determine whether a subsequent test case segment exists in the ordered list of test case segments. In the instant case, an additional test case segment exists. FIG. 22A depicts the test case segments with the indication of the current test case segment advanced from the previously processed test case segment. The current test case segment is now "Add the product to cart."

Next, the test script generator 13 may attempt to determine a current state by determining a collection of application elements that are present in the current application window (i.e., webpage 12). In the present example, the collection of application elements that are present in webpage 12 include login button 20 and Add-To-Cart button 28. Since this collection of application elements matches those of the product state in the elements-per-state table 66 (see FIG. 6A), the current state is determined to be the product state.

Next, the test script generator 13 may determine whether there are any existing actions originating from the current state and belonging to the set of translations that sufficiently correspond to the current test case segment. In the present case, there are no existing actions originating from the current state, since there is no entry for the product state in the actions-per-state table. See FIG. 19B. Since this determination fails, test script generator 13 may attempt to generate a new blueprint action for the current test case segment, in accordance with the example in FIGS. 22B-22I.

As illustrated in FIGS. 22B and 22C, test script generator 13 may determine whether any previously translated actions from the set of translations sufficiently correspond to the current test case segment and reference only application elements contained within the collection of application elements, which in the present example includes login button 20 and Add-To-Cart button 28. More specifically, test script generator 13 may determine whether any blueprint actions in the actions-per-state table reference application elements contained within the collection of application elements. In the present case, the blueprint action click(Log-In-Button) references login button 20. The test script generator 13 then determines whether this blueprint action click(Log-In-Button) is present in the set of translations. In the present case, the blueprint action click(Log-In-Button) is present in the set of translations, and as such, click(Log-In-Button) may be regarded as a candidate blueprint action (which is highlighted in the tables of FIG. 22B with a dotted background). Finally, test script generator 13 determines a similarity score between the current test case segment "Add the product to cart" and the test case segment "Click log in button" which corresponds to the candidate blueprint action of click(Log-In-Button). As previously discussed, an AI engine 111 (i.e., an LLM) may be used to generate this similarity score. In the present example, the AI generated similarity score is 0.39, which is below the minimum threshold of 0.80, so the attempt to generate a new action based on the procedure described in FIGS. 22B and 22C fails.

Next, test script generator 13 may determine whether any blueprint actions that are not included in the set of translations sufficiently correspond to the current test case segment and reference only application elements contained within the collection of application elements of the current state. In the present example, there are no such blueprint actions, as the only other blueprint action in the actions-per-state table, click(Ruby-on-Rails-Tote), references an application element Ruby-on-Rails-Tote that is not contained within the collection of application elements of the current state.

With the attempts to "recycle" or "repurpose" existing blueprint actions failing, test script generator 13 may then attempt to generate a blueprint action from scratch, as illustrated in FIGS. 22D-22I. First, test script generator 13 may employ an AI engine 111 to perform image-to-text translation for images 49, 51 present in the script-level locators of the current state (i.e., product state). See FIG. 19A. The output for the image-to-text translation is recorded in the top table of FIG. 22D. Next, test script generator 13 may employ the above-described rule-based generator to generate a natural language description of each application element (i.e., Log-In-Button, Add-To-Cart-Button) present in the current state (i.e., product state) using text locators. The output of the rule-based generated description of each application element using text locators is recorded in the middle table of FIG. 22D. Next, both descriptions (i.e., image-to-text translation and rule-based generated description) for each application element may be combined into a single natural language description, as shown in the bottom table of FIG. 22D.

Next, a rule-based generator may be used to generate a natural language description of the current application page (i.e., webpage 12). The output of the rule-based generator is provided in FIG. 22E.

Next, as illustrated in FIG. 22F, test script generator 13 may use an AI engine 111 to determine a minimum number of application elements used by the test case segment "Add the product to cart" in the web page as described by the natural language description of FIG. 22E. In the present example, the response of the AI engine 111 is 1 (i.e., 1 is the minimum number of application elements).

Next, as illustrated in FIG. 22G, test script generator 13 may use an AI engine 111 to determine a maximum number of application elements used by the test case segment "Add the product to cart" in the web page as described by the natural language description of FIG. 22E. In the present example, the response of the AI engine 111 is 2 (i.e., 2 is the maximum number of application elements).

Next, test script generator 13 may generate candidate blueprint actions, each acting on a number of application elements between the minimum and maximum number of application elements (inclusive) as determined by the AI engine 111. The top table in FIG. 22H records blueprint actions formed from a single element action, and the bottom table in FIG. 22H records blueprint actions formed from two element actions. The test script generator 13 may then use a rule-based generator to describe each of the blueprint actions in natural language, as also shown in the tables of FIG. 22H. Finally, an AI engine 111 may be used to determine a similarity score between the current test case segment and each of the candidate natural language phrases recorded in the tables of FIG. 22H. The similarity scores are recorded in FIG. 22I. The natural language phrase—Click a button which can be accessed with the locator submit ("Add to Cart") and an image of a simple rectangular button with the text "Add To Cart" centered on it.—received the highest similarity score of 0.90, and further this similarity score was above the minimum threshold of 0.80. Therefore, the newly created blueprint action of click(Add-To-Cart-Button) may be determined as the current action that matches the current test case segment "Add the product to cart."

Figure 22J:
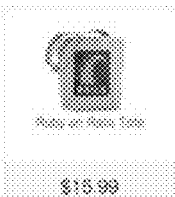
FIG. 22J depicts the ordered list of actions after a translation has been appended to the ordered list of actions, in accordance with one embodiment of the invention.

As shown in FIG. 22J, the new translation from the current test case segment "Add the product to cart" to the blueprint action click(Add-To-Cart-Button) may be appended to the end of the ordered list of actions, optionally along with the AI determined similarity score that was recorded in FIG. 22I.

Finally, the current action may be executed in the current application window to navigate to a subsequent application window. More specifically, the current action click(Add-To-Cart-Button) may be converted by test script generator 13 into a line of test script click(submit ("Add To Cart")) by substituting the application element placeholder Add-To-Cart-Button in the current action with a corresponding script-level locator (e.g., submit ("Add To Cart")) indicated in the elements-per-state table (see FIG. 19A). The line of test script click(submit ("Add To Cart")) may then be executed by the testing tool 19 in the current application window (i.e., webpage 12) to navigate to the subsequent application window (i.e., webpage 14). This discussion completes the processing of the second test case segment.

Figure 23A:
FIG. 23A depicts the test case segments with the indication of the current test case segment advanced from the previously processed test case segment, in accordance with one embodiment of the invention.

Next, test script generator 13 may determine whether a subsequent test case segment exists in the ordered list of test case segments. In the instant case, an additional test case segment exists. FIG. 23A depicts the test case segments with the indication of the current test case segment advanced from the previously processed test case segment. The current test case segment is now "Click log in."

Next, test script generator 13 may attempt to determine a current state by determining a collection of application elements that are present in the current application window (i.e., webpage 14). In the present example, the collection of application elements that are present in webpage 14 include login button 20 and checkout button 34. Since this collection of application elements does not match either the welcome state or the product state in the elements-per-state table of FIG. 19A, test script generator 13 may determine that the current state does not exist in the state machine.

Next, test script generator 13 may attempt to determine a new action that sufficiently correspond to the current test case segment. As illustrated in FIGS. 23B-23C, test script generator 13 may determine whether any previously translated actions from the set of translations sufficiently correspond to the current test case segment and reference only application elements contained within the collection of application elements, which in the present example includes login button 20 and checkout button 34. More specifically, test script generator 13 may determines whether any blueprint actions in the actions-per-state table reference application elements contained within the collection of application elements. In the present case, the blueprint action click(Log-In-Button) references login button 20. The test script generator 13 may then determine whether this blueprint action is present in the set of translations. In the instant case, the blueprint action click(Log-In-Button) is present in the set of translations, and as such, click(Log-In-Button)

may be regarded as a candidate blueprint action (which has been highlighted in the tables of FIG. 23B with a dotted background).

Next, test script generator 13 may utilize an AI engine 111 to determine a similarity score between the current test case segment (i.e., "Click log in") and the test case segment mapped to the candidate blueprint action. The similarity score of 0.90 is recorded in the table of FIG. 23C. Since the score 0.90 is above the minimum threshold of 0.80, the candidate blueprint action click(Log-In-Button) is determined to sufficiently correspond to the current test case segment "Click log in."

As shown in FIG. 23D, the new translation from the current test case segment "Click log in" to the blueprint action click(Log-In-Button) may be appended to the end of the ordered list of actions, optionally along with the AI determined similarity score that was recorded in FIG. 23C.

Finally, the current action may be executed in the current application window to navigate to a subsequent application window. More specifically, the current action click(Log-In-Button) may be converted by test script generator 13 into a line of test script click(link("Login")) by substituting the application element placeholder Log-In-Button in the current action with a corresponding script-level locator (e.g., link("Login")) indicated in the elements-per-state table (see FIG. 19A). The line of test script click(link("Login")) may then be executed by the testing tool 19 in the current application window (i.e., webpage 14) to navigate to the subsequent application window (i.e., webpage 16). This discussion completes the processing of the third test case segment.

Next, test script generator 13 may determine whether a subsequent test case segment exists in the ordered list of test case segments. In the instant case, no additional test case segment exists. Test script generator 13 may then generate a test script based on the respective blueprint actions contained within the ordered list of translations. In one embodiment, each of the blueprint actions may be translated into a corresponding line of test script using a rule-based generator. FIG. 23E depicts the result of such translation, in which a test script (that adhere to the syntax from Test Designer® of Appvance Inc. of Santa Clara, CA) has been generated from the ordered list of blueprint actions. The translation from a blueprint action to a line of test script was performed by replacing each application element placeholder with the corresponding script-level locator (as was previously explained in the examples).

Figure 24A:
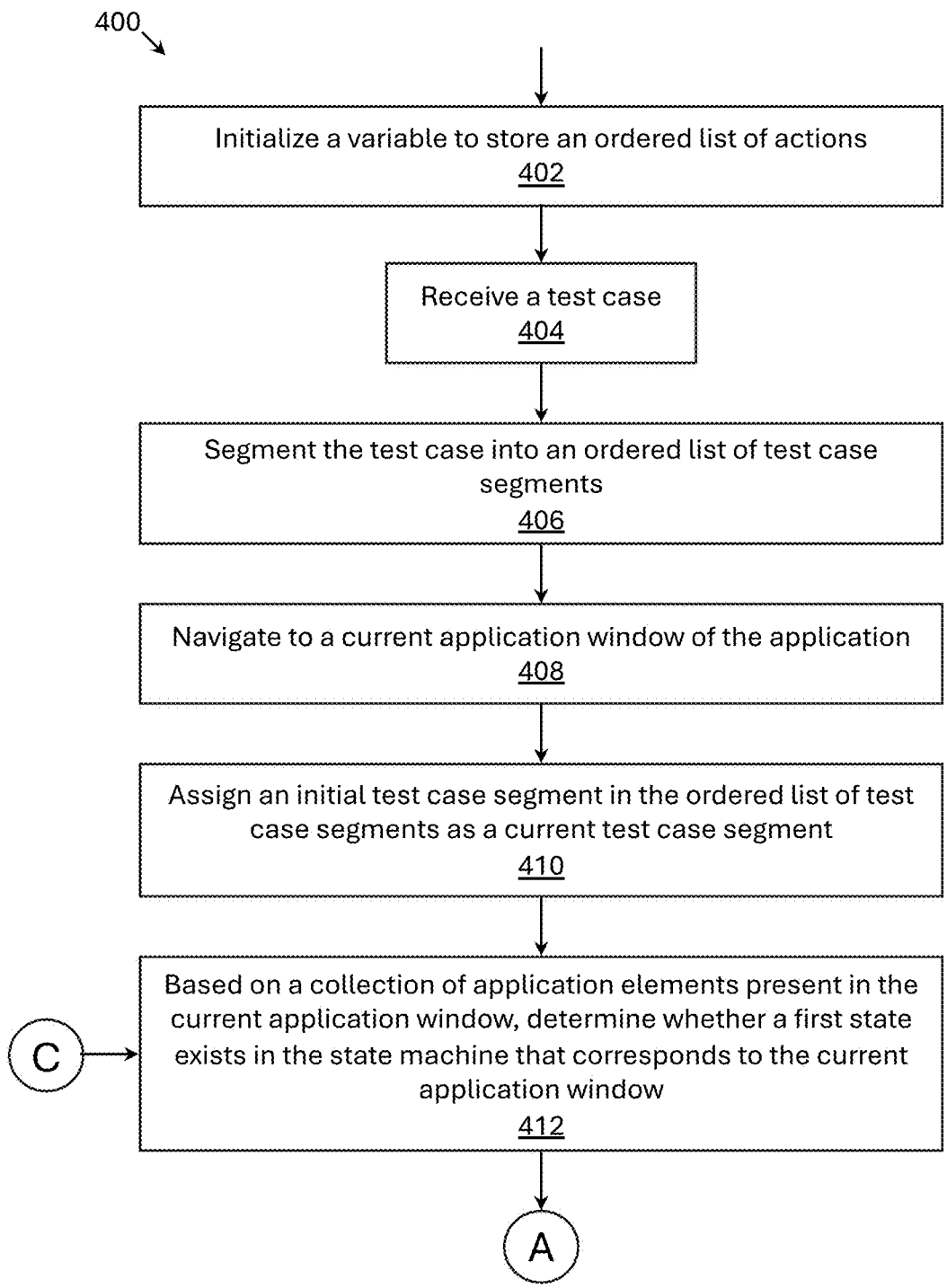
FIGS. 24A-24C depict a method for constructing a test script from a test case and a model of an application, in accordance with one embodiment of the invention.
Figure 24B:
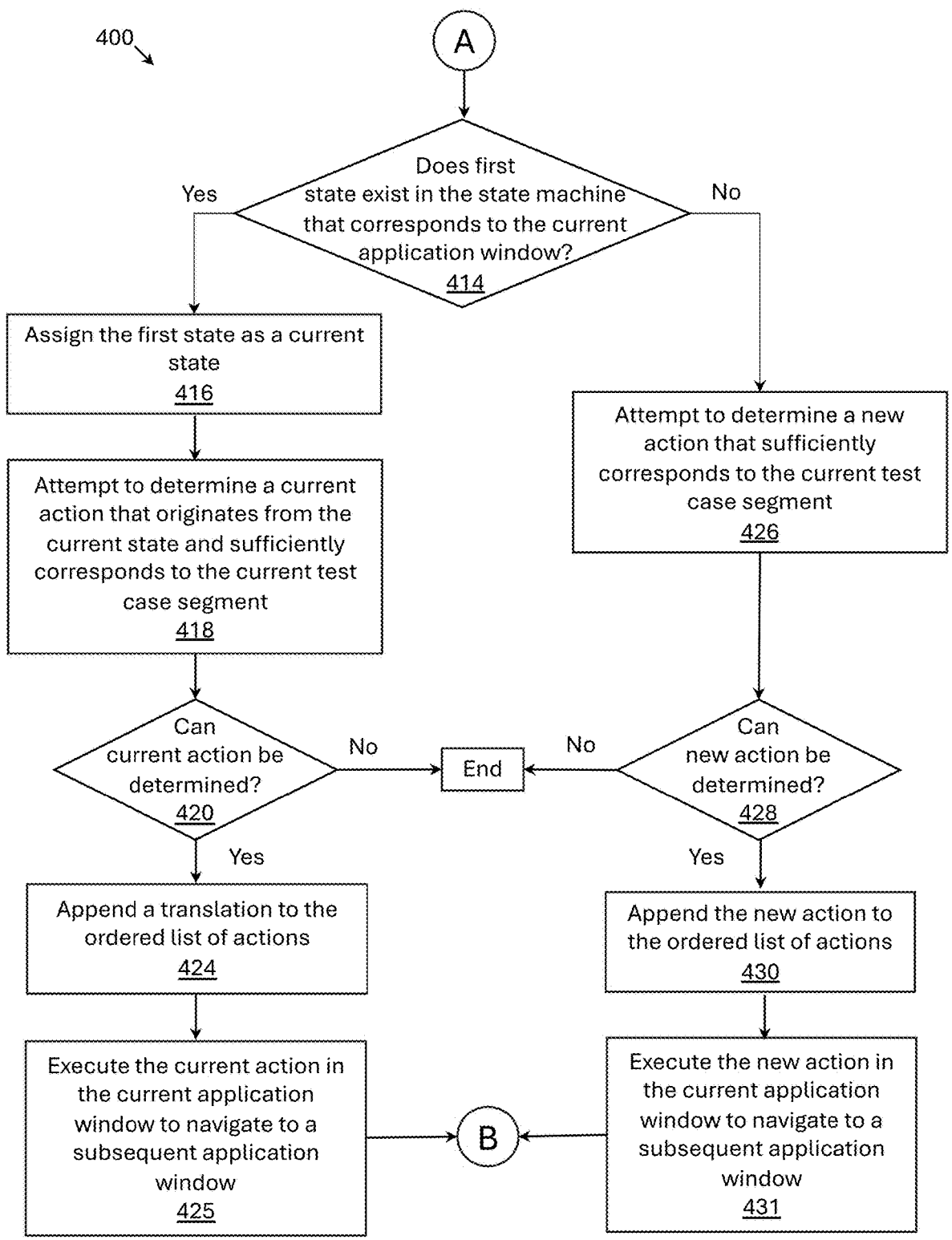
Figure 24C:
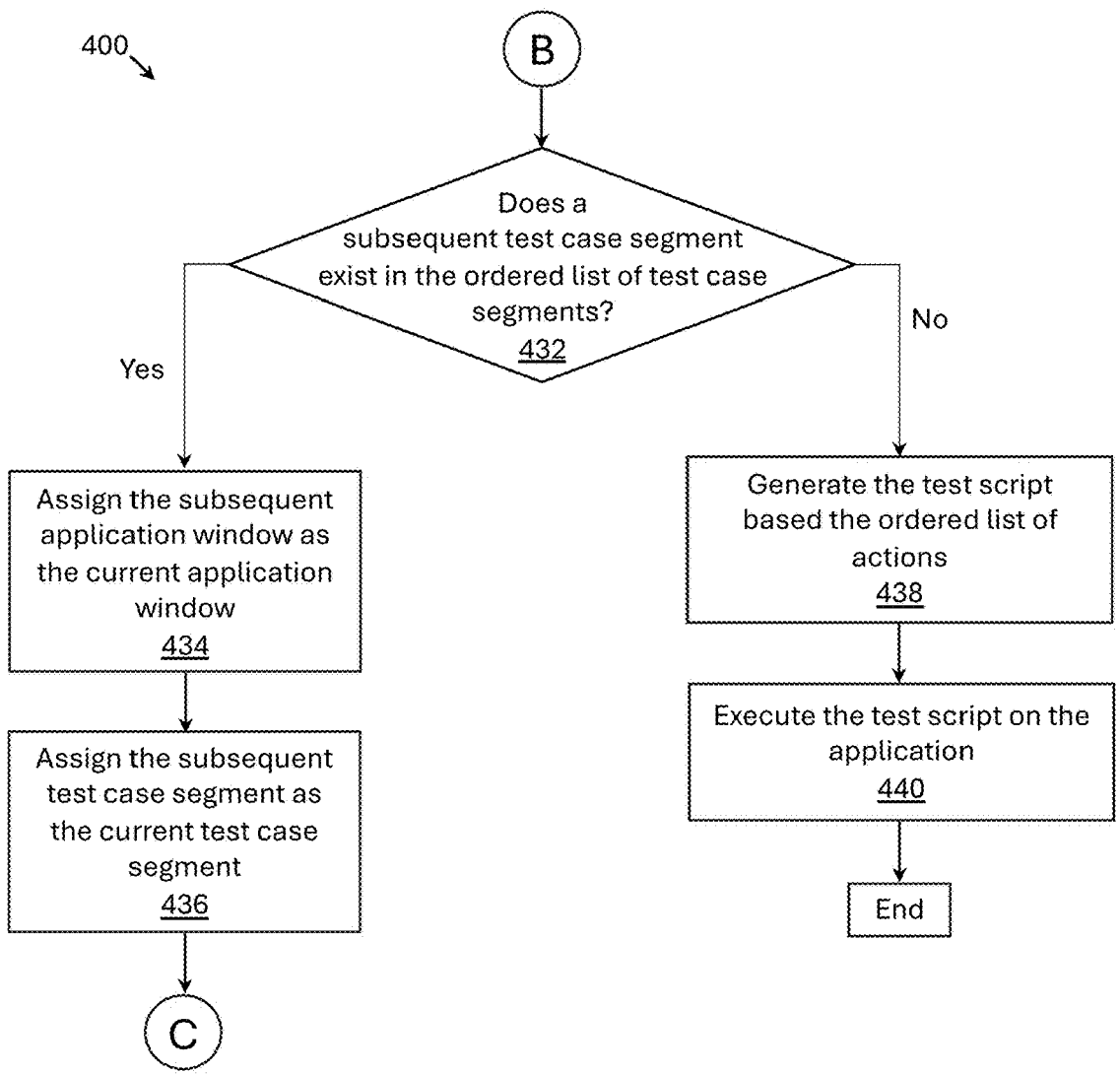
Figure 25A:
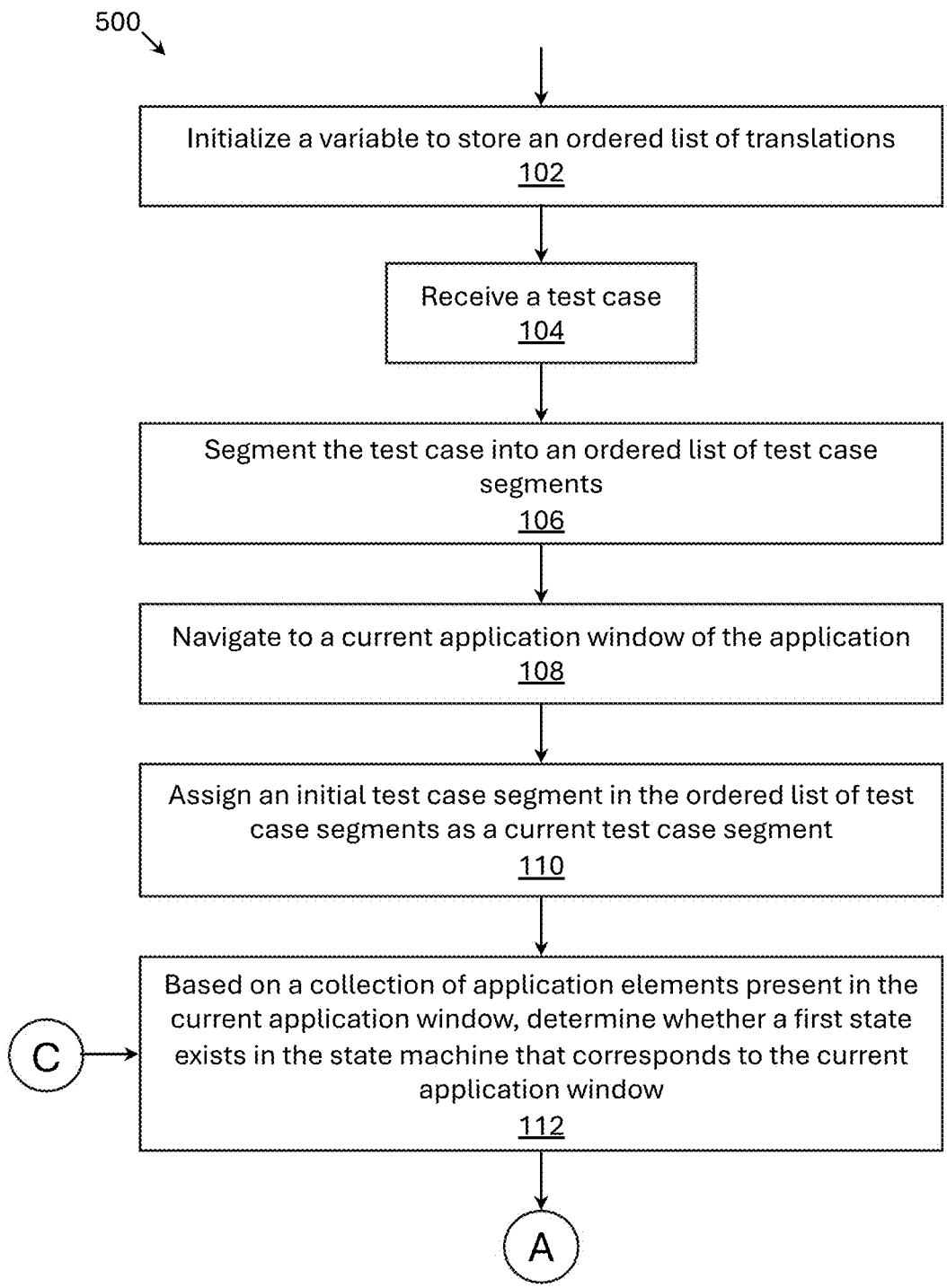
FIGS. 25A-25D depict a method for updating a time-evolving model of an application, in accordance with one embodiment of the invention.
Figure 25B:
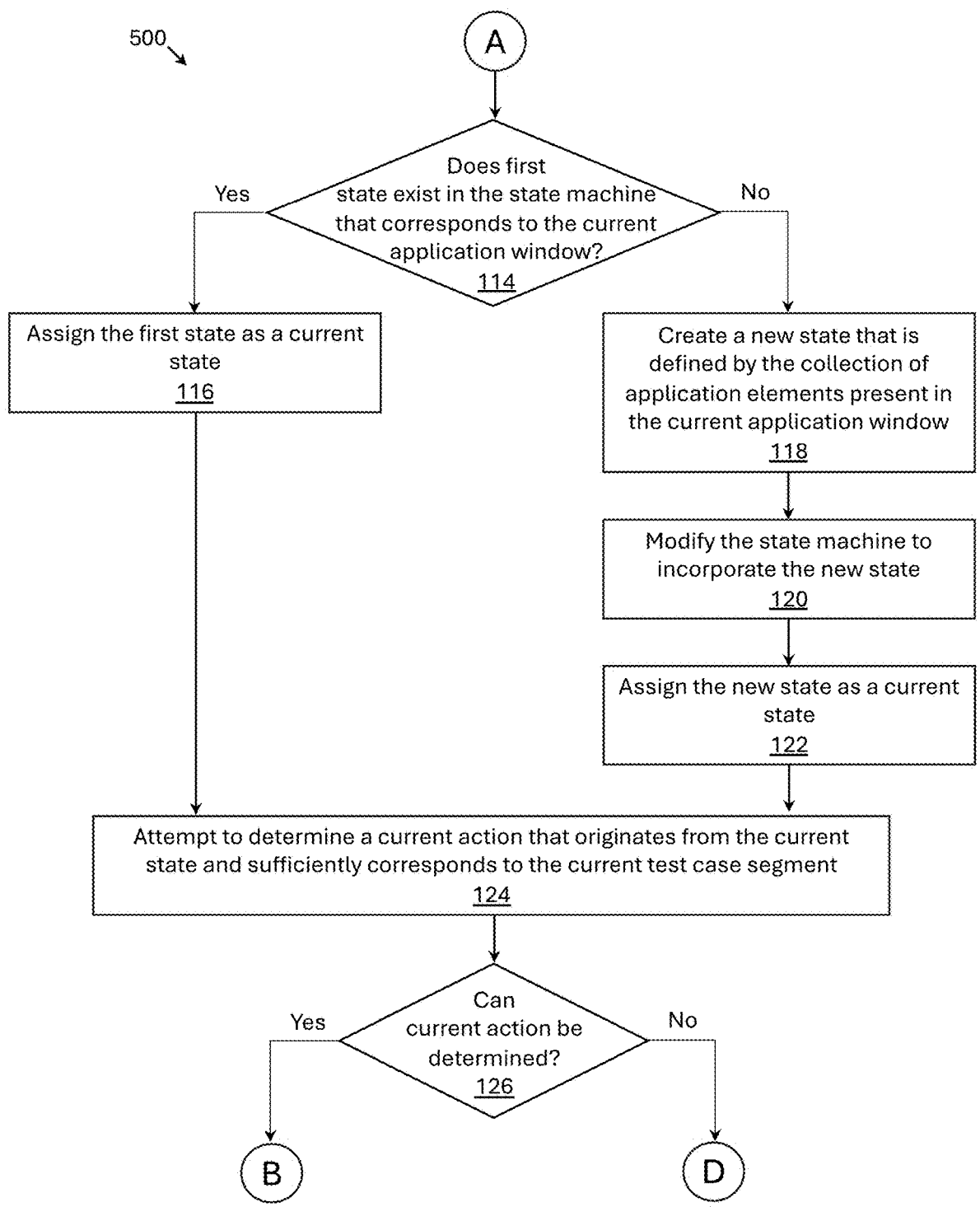
Figure 25C:
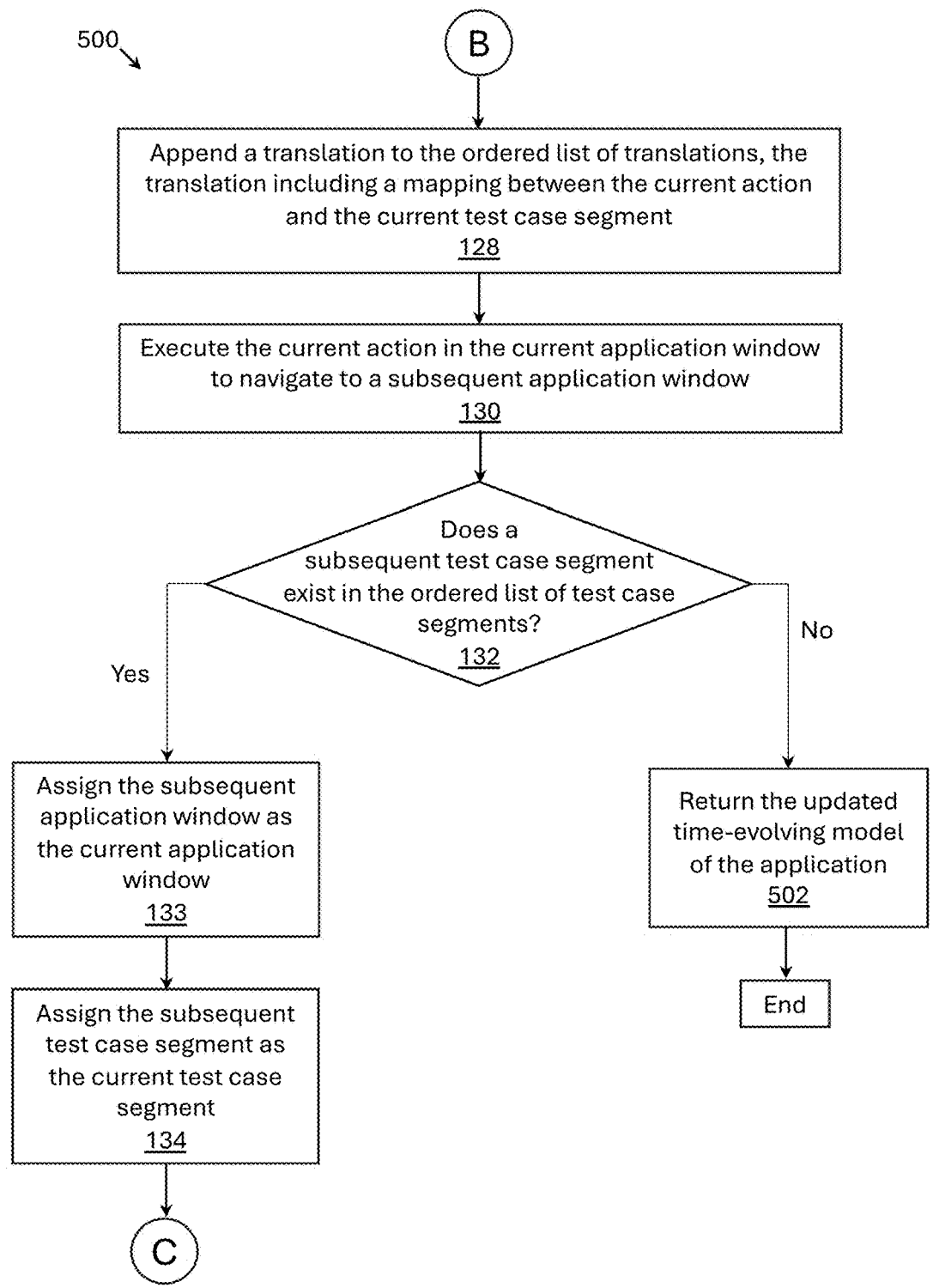
Figure 25D:
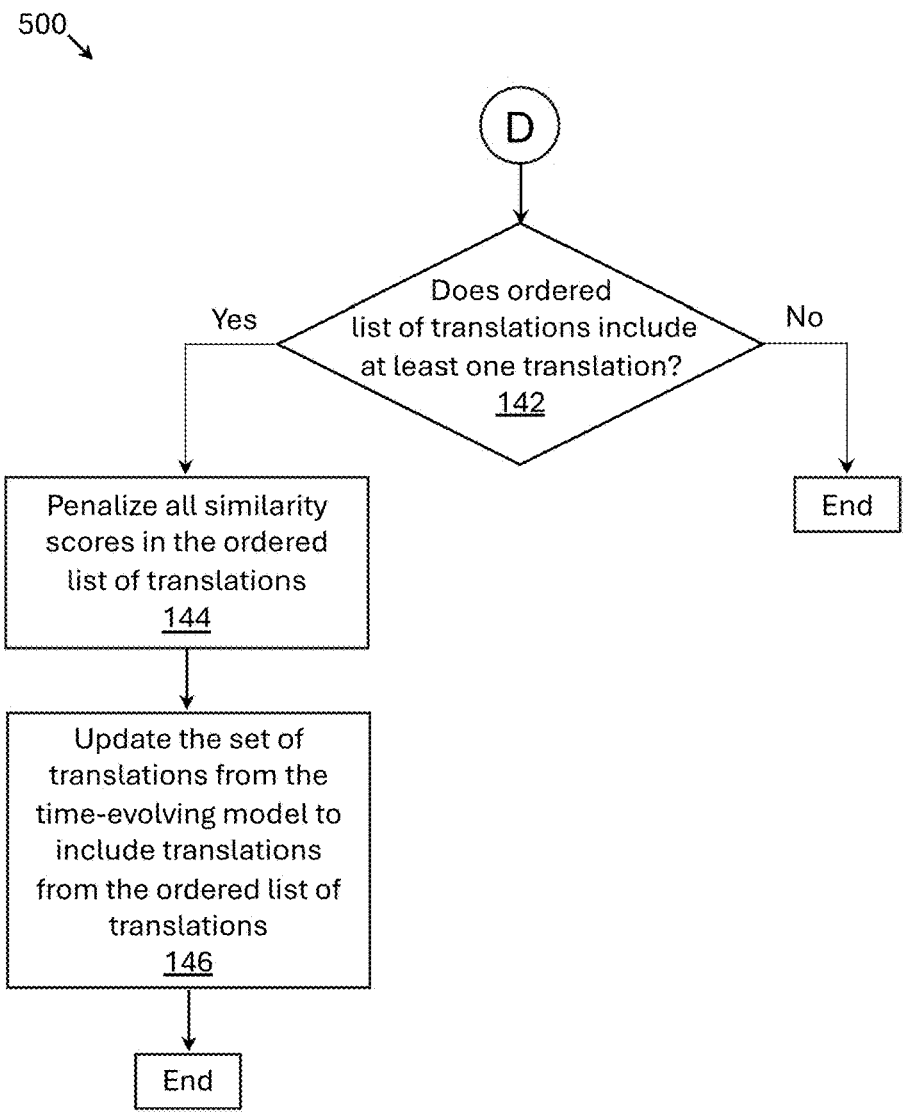

FIGS. 24A-24C depict method 400 for constructing a test script from a test case and a model of an application. Method 400 is similar to method 100, except that it does not perform any updates to the blueprint (i.e., the model of the application is a static model and there are no updates to the set of translation). The flowcharts of FIGS. 24A-24C summarize the processes that were described in the above examples from FIGS. 19A-19C, 20, 21A-21G, 22A-22J and 23A-23E.

In step 402, test script generator 13 may initialize a variable to store an ordered list of actions. An example of step 102 was provided above in FIG. 20. In step 404, test script generator 13 may receive a test case. An example test case was provided above in FIG. 21A. In step 406, test script generator 13 may segment the test case into an ordered list of test case segments. An example of step 406 was provided above in FIG. 21B. In step 408, test script generator 13 may navigate to a current application window of the application 17. In the example above, the browser navigated to webpage 10 at the beginning of the test script creation process.

In step 410, test script generator 13 may assign an initial test case segment in the ordered list of test case segments as a current test case segment. An example of step 410 was provided above in FIG. 21B, in which the block arrow designated the initial test case segment.

In step 412, based on a collection of application elements present in the current application window, the test script generator 13 may determine whether a first state exists in the state machine that corresponds to the current application window. Examples of step 312 were discussed above in associate with the elements-per-state table depicted in FIG. 19A.

If the first state exists ("Yes" branch of step 414), test script generator 13 may assign the first state as the current state (step 416), and attempt to determine a current action that originates from the current state and sufficiently corresponds to the current test case segment (step 418). An example of determining the first state was provided above:
  for the first test case segment, in which the welcome state 10 was determined to exist in the state machine.
  for the second test case segment, in which the product state 12 was determined to exist in the state machine.
An example of determining a current action that originates from the current state and sufficiently corresponds to the current test case segment was provided above:
  in FIGS. 21C-21F, in which the blueprint action click (Ruby-on-Rails-Tote) was determined as the current action that originates from the welcome state and sufficiently corresponded to the current test case segment "Select this product [image 48]."
  in FIGS. 22B-22C, in which the blueprint action click (Log-in-Button) was determined as the current action that originates from the product state, but it did not sufficiently correspond to the current test case segment "Add the product to cart."
It is noted that the discussion from FIGS. 7 and 8A-8C apply to step 418, and will not be repeated for the sake of conciseness.

If the first state does not exist ("No" branch of step 414), test script generator 13 may attempt to determine a new action that sufficiently corresponds to the current test case segment (step 426). An example of step 414 was provided above in FIG. 23B-23C, in which the new blueprint action click(Log-In-Button) was determined to sufficiently correspond to the current test case segment "Click log in." It is noted that the discussion from FIGS. 8A-8C apply to step 426, and will not be repeated for the sake of conciseness. If the current action cannot be determined ("No" branch of step 420) or if the new action cannot be determined ("No" branch of step 428), the process for constructing the test script may abort.

If the current action can be determined ("Yes" branch of step 420), test script generator 13 may append a translation to the ordered list of actions (step 424). An example of step 424 was provided above:
  in FIG. 21G, in which test script generator 13 appended the translation "Select this product [image 48]⇔click (Ruby-on-Rails-Tote)" to the ordered list of actions.
  in FIG. 22J, in which test script generator 13 appended the translation "Add the product to cart⇔click(Add-To-Cart-Button)" to the ordered list of actions.
At step 425, test script generator 13 may execute the current action in the current application window to navigate to a subsequent application window. An example of step 425 was provided above:

in the first test case segment, in which test script generator 13 executed click(Ruby-on-Rails-Tote) in webpage 10 to navigate to webpage 12.

in the second test case segment, in which test script generator 13 executed click(Add-To-Cart-Button) in webpage 12 to navigate to webpage 14.

If the new action can be determined ("Yes" branch of step 428), test script generator 13 may append the new action to the ordered list of actions (step 430). An example of step 430 was provided above in FIG. 23D, in which test script generator 13 appended the new action click(Log-In-Button) to the ordered list of actions.

At step 431, test script generator 13 may execute the new action in the current application window to navigate to a subsequent application window. An example of step 431 was provided above in the third test case segment, in which test script generator 13 executed click(Log-In-Button) in webpage 14 to navigate to webpage 16.

At step 432, test script generator 13 may determine whether a subsequent test case segment exists in the ordered list of test case segments. If so ("Yes" branch of step 432), test script generator 13 may assign the subsequent application window as the current application window (step 434) and assign the subsequent test case segment as the current test case segment (step 436). Examples of step 436 were provided above:

in FIG. 22A, in which the current test case segment was assigned to "Add the product to cart."

in FIG. 23A, in which the current test case segment was assigned to "Click log in."

Following step 436, the process may continue to step 412 in FIG. 24A.

If no subsequent test case segment exists in the ordered list of test case segments ("No" branch of step 432), test script generator 13 may generate the test script based the ordered list of actions (step 438). An example of step 438 was provided above in FIG. 23E. Optionally, in step 440, testing tool 19 may execute test script on application 17' in order to test application 17', or may run test script 15 on application 17 in environment 25, as described above in FIGS. 1A and 1B, respectively.

FIGS. 25A-25D depict a method 500 for updating a time-evolving model of an application (i.e., a method for "growing" a blueprint) without the generation of a test script. Method 500 is similar to method 100 with like reference numerals used to refer to similar steps. For conciseness, steps with the same reference numerals as those described in method 100 will not be described again. The main difference between method 500 and method 100 is that in the "No" branch of step 132 of method 500, the computer system returns the updated time-evolving model of the application (step 502) instead of generating a test script (step 136). Another difference is that in method 500, a general computer system performs the steps, rather than a test script generator, as no test script is being generated.

FIG. 26 depicts additional examples of sets of translations to illustrate the versatility of blueprints. These additional examples illustrate how a set of translations (which forms part of a blueprint) may help to capture the intentions of a testing engineer when test case segments are expressed at an abstract (high) level. The top table of FIG. 26 depicts a set of translations in the context of an automobile insurance company in which the test case segments "Fill the claim form" and "Complete the claim form" map to the blueprint action which includes the sequence of the following element actions:

setValue(formID-Field,$formID)//complete a form identifier (ID)

setValue(insuranceID-Field,$InsuranceID)//complete an insurance policy number setValue(accident-Date-Field,$AccidentDateID)//complete the accident date setValue(license-number-Field,$LicenseID)//complete the automobile license number setValue(at-Fault-Field,$AtFaultID)//complete a Boolean value indicating whether the policy holder was at fault or not The bottom table of FIG. 26 depicts a set of translations in the context of a homeowner's insurance in which the test case segments "Fill the claim form" and "Complete the claim form" map to the blueprint action which includes the sequence of the following element actions:

setValue(formID-Field,$formID)//complete a form identifier setValue(insuranceID-Field,$InsuranceID)//complete an insurance policy number setValue(Incident-Date-Field,$IncidentDateID)//complete the incident date setValue(Incident-Type-Field, $IncidentTypeID)//complete the incident type (e.g., fire, water, bodily injury, burglary, etc.)

setValue(Address-Field, $AddressID)//complete address of home setValue(Claim-Amount, $ClaimAmountID)//complete claim amount The above examples help to illustrate why an AI engine 111 (at least currently) is not able to automatically generate a test script based on a test case. That is, the AI engine 111 simply has no understanding as to whether the test case segment "Fill the claim form" applies to the automobile insurance or homeowner's insurance context. If this context were provided to the AI engine 111, then concepts from the present invention such as a blueprint would be employed, and if anything, demonstrating the usefulness of the present invention. Other benefits to using the above-described blueprint include:

Minimizing the risk of an invalid translation from a natural language test case to a script-level action Minimizing the risk of an invalid translation from "element placeholders" to script-level locators (such mappings being provided in the elements-per-state table of the blueprint)

Absolute speed, as a blueprint can traverse from any point to any other point in an application in milliseconds. A blueprint can also see ahead without disturbing the state of the application, which is only possible to be performed offline, such as with the blueprint. In contrast, a state of the art recorder like AIQ Web Designer® from Appvance Inc. of Santa Clara, CA runs only as fast as the application can respond.

Figure 27:
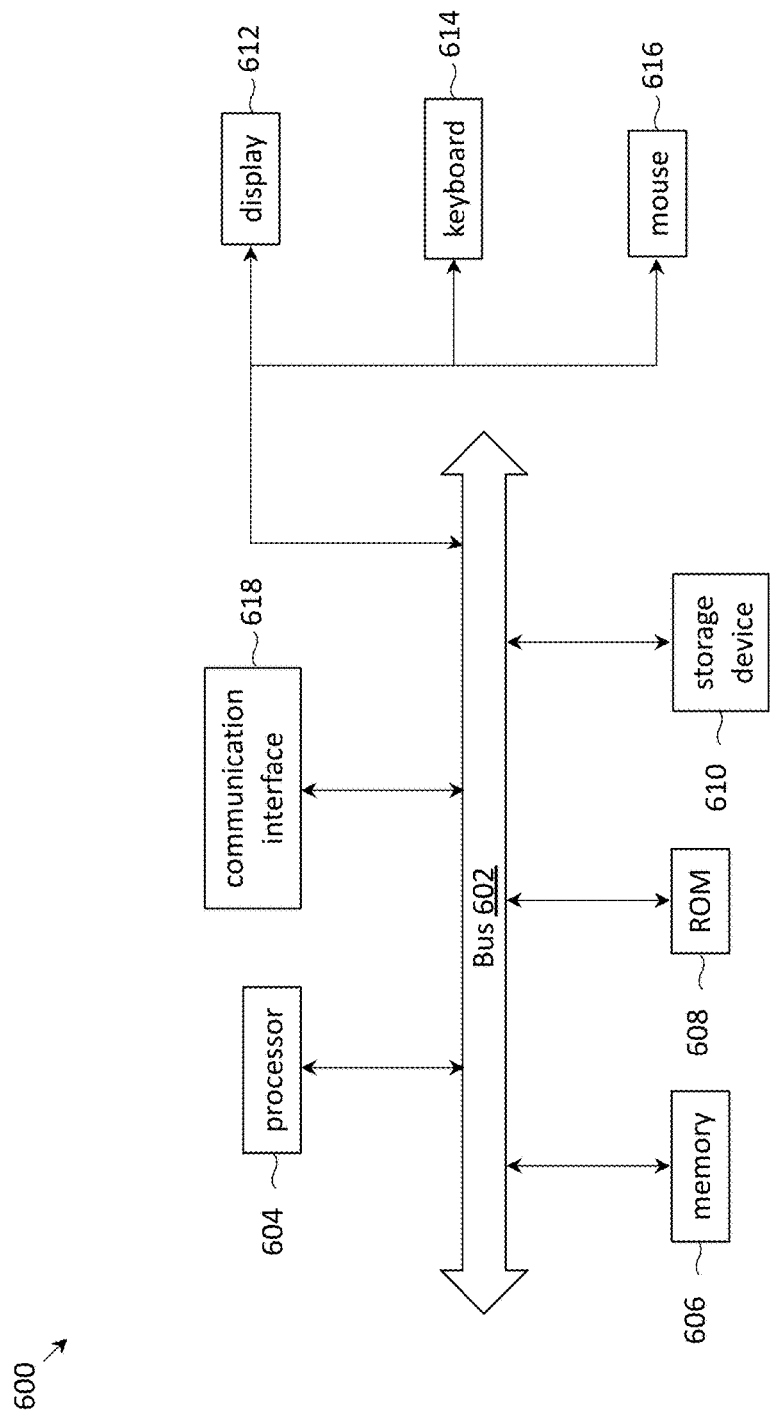
FIG. 27 depicts components of a computer system in which computer readable instructions instantiating the methods of the present invention may be stored and executed.

FIG. 27 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 27 provides an example of a system 600 that may be representative of any of the computing systems discussed herein. Examples of system 600 may include a smartphone, a desktop, a laptop, a mainframe computer, an embedded system, etc. Note, not all of the various computer systems have all of the features of system 600. For example, certain ones of the computer systems discussed above may not include a display inasmuch as the display function may be provided by a client computer communicatively coupled to the computer system or a display function may be unnecessary. Such details are not critical to the present invention.

System 600 includes a bus 602 or other communication mechanism for communicating information, and a processor 604 coupled with the bus 602 for processing information. Computer system 600 also includes a main memory 606, such as a random access memory (RAM) or other dynamic storage device, coupled to the bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to the bus 602 for storing static information and instructions for the processor 604. A storage device 610, for example a hard disk, flash memory-based storage medium, or other storage medium from which processor 604 can read, is provided and coupled to the bus 602 for storing information and instructions (e.g., operating systems, applications programs and the like).

Computer system 600 may be coupled via the bus 602 to a display 612, such as a flat panel display, for displaying information to a computer user. An input device 614, such as a keyboard including alphanumeric and other keys, may be coupled to the bus 602 for communicating information and command selections to the processor 604. Another type of user input device is cursor control device 616, such as a mouse, a trackpad, or similar input device for communicating direction information and command selections to processor 604 and for controlling cursor movement on the display 612. Other user interface devices, such as microphones, speakers, etc. are not shown in detail but may be involved with the receipt of user input and/or presentation of output.

The processes referred to herein may be implemented by processor 604 executing appropriate sequences of computer-readable instructions contained in main memory 606. Such instructions may be read into main memory 606 from another computer-readable medium, such as storage device 610, and execution of the sequences of instructions contained in the main memory 606 causes the processor 604 to perform the associated actions. In alternative embodiments, hard-wired circuitry or firmware-controlled processing units may be used in place of or in combination with processor 604 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 600 or similar electronic computing device, that manipulates and transforms data represented as physical (electronic) quantities within its registers and memories into other data similarly represented as physical quantities within its memories or registers or other such information storage, transmission or display devices.

Computer system 600 also includes a communication interface 618 coupled to the bus 602. Communication interface 618 may provide a two-way data communication channel with a computer network, which provides connectivity to and among the various computer systems discussed above. For example, communication interface 618 may be a local area network (LAN) card to provide a data communication connection to a compatible LAN, which itself is communicatively coupled to the Internet through one or more Internet service provider networks. The precise details of such communication paths are not critical to the present invention. What is important is that computer system 600 can send and receive messages and data through the communication interface 618 and in that way communicate with hosts accessible via the Internet. It is noted that the components of system 600 may be located in a single device or located in a plurality of physically and/or geographically distributed devices.

Thus, methods for creating test scripts and/or updating a model of an application have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

Appendix A includes example pseudo code for practicing the above-described methods.

What is claimed is:

1. A method for (1) constructing a test script from a test case and a time-evolving model of an application, the time-evolving model including a set of translations and a state machine, in which states correspond to pages of the application and edges correspond to actions that are performed to transition from one of the pages to another one of the pages of the application or are performed within one of the pages, and (2) updating the time-evolving model of the application, the method comprising:
    (a) initializing a variable to store an ordered list of translations;
    (b) receiving the test case;
    (c) segmenting the test case into an ordered list of test case segments;
    (d) navigating to a current application window of the application;
    (e) assigning an initial test case segment in the ordered list of test case segments as a current test case segment;
    (f) based on a collection of application elements present in the current application window, determining whether a first state exists in the state machine that corresponds to the current application window;
    (g) if the first state does not exist, creating a new state that is defined by the collection of application elements present in the current application window, modifying the state machine to incorporate the new state, and assigning the new state as a current state;
    (h) if the first state exists, assigning the first state as the current state;
    (i) attempting to determine a current action that originates from the current state and corresponds to the current test case segment;
    (j) if the current action cannot be determined, aborting the method for constructing the test script;
    (k) if the current action is determined, appending a translation to the ordered list of translations, the translation including a mapping between the current action and the current test case segment, and executing the current action in the current application window to navigate to a subsequent application window;

(l) determining whether a subsequent test case segment exists in the ordered list of test case segments;

(m) if the subsequent test case segment exists in the ordered list of test case segments, assigning the subsequent application window as the current application window, assigning the subsequent test case segment as the current test case segment, and repeating steps (f) through (m) until the method for constructing the test script has been aborted or no subsequent test case segment exists in the ordered list of test case segments; and (n) if the subsequent test case segment does not exist in the ordered list of test case segments and the method for constructing the test script has not been aborted, generating the test script based on respective actions contained within the ordered list of translations and executing the test script on the application.

2. The method of claim 1, wherein the translation further includes a similarity score between the current action and the current test case segment.

3. The method of claim 2, further comprising generating a first representation of the current action that is processed by an artificial intelligence (AI) engine, and computing the similarity score between the current action and the current test case segment based on a similarity between the first representation of the current action and the current test case segment.

4. The method of claim 2, further comprising, if the current action cannot be identified and the ordered list of translations includes at least one translation, penalizing all similarity scores in the ordered list of translations and updating the set of translations from the time-evolving model to include translations from the ordered list of translations.

5. The method of claim 4, wherein penalizing all similarity scores in the ordered list of translations includes computing a penalty factor equal to a total number of successfully translated test case segments divided by a total number of test case segments in the ordered list of test case segments.

6. The method of claim 2, further comprising, if no subsequent test case segment exists in the ordered list of test case segments and the method for constructing the test script has not been aborted, rewarding all similarity scores in the ordered list of translations and updating the set of translations from the time-evolving model to include translations from the ordered list of translations.

7. The method of claim 1, wherein attempting to determine the current action originating from the current state that corresponds to the current test case segment comprises:

if the current test case segment contains images, modifying the current test case segment by replacing each of the images within the current test case segment with a textual description of the image;

determining whether any existing actions originating from the current state and belonging to the set of translations correspond to the current test case segment;

if one or more existing actions originating from the current state and belonging to the set of translations correspond to the current test case segment, returning a first one of the or more existing actions that best matches the current test case segment as the current action;

otherwise, if no existing actions originating from the current state and belonging to the set of translations correspond to the current test case segment, attempting to create a new action originating from the current state that corresponds to the current test case segment;

if the new action cannot be created, failing to determine the current action; and otherwise, if the new action is created, modifying the state machine to include the new action originating from the current state and returning the new action as the current action.

8. The method of claim 7, wherein attempting to create the new action originating from the current state that corresponds to the current test case segment comprises:

determining whether any previously translated actions from the set of translations correspond to the current test case segment and reference only application elements contained within the collection of application elements; and if one or more previously translated actions from the set of translations correspond to the current test case segment and reference only application elements contained within the collection of application elements, returning a copy of a first one of the previously translated actions that best matches the current test case segment as the new action originating from the current state;

otherwise, failing to create the new action.

9. The method of claim 7, wherein attempting to create the new action originating from the current state that corresponds to the current test case segment comprises:

determining whether any actions of the state machine that are not included in the set of translations correspond to the current test case segment and reference only application elements contained within the collection of application elements; and if one or more actions of the state machine that are not included in the set of translations correspond to the current test case segment and reference only application elements contained within the collection of application elements, returning a first one of the one or more actions of the state machine that best matches the current test case segment as the new action originating from the current state;

otherwise, failing to create the new action.

10. The method of claim 7, wherein attempting to create the new action originating from the current state that corresponds to the current test case segment comprises:

determining a textual description corresponding to each of the application elements present in the current application window;

selecting a subset of application elements within the collection of application elements that are present in the first application window;

creating one or more candidate actions based on the textual description corresponding to ones of the application elements within the subset of application elements;

determining whether any of the one or more candidate actions correspond to the current test case segment; and if at least one of the one or more candidate actions corresponds to the current test case segment, returning a first one of the candidate actions that best matches the current test case segment as the new action;

otherwise, if none of the candidate actions corresponds to the current test case segment, failing to create the new action.

11. The method of claim 1, wherein the test case segment comprises one or more of a natural language (NL) phrase or an image.

12. A method for constructing a test script from a test case and a model of an application, the model including a set of translations and a state machine, in which states correspond to pages of the application and edges correspond to actions that are performed to transition from one of the pages to another one of the pages of the application or are performed within one of the pages, the method comprising:
(a) initializing a variable to store an ordered list of actions;
(b) receiving the test case;
(c) segmenting the test case into an ordered list of test case segments;
(d) navigating to a current application window of the application;
(e) assigning an initial test case segment in the ordered list of test case segments as a current test case segment;
(f) based on a collection of application elements present in the current application window, determining whether a first state exists in the state machine that corresponds to the current application window;
(g) if the first state does not exist:
attempting to determine a new action that corresponds to the current test case segment;
if the new action cannot be determined, aborting the method for constructing the test script;
otherwise, if the new action is determined, appending the new action to the ordered list of actions, and executing the new action in the current application window to navigate to a subsequent application window;
(h) if the first state exists:
assigning the first state as a current state;
attempting to determine a current action that originates from the current state and corresponds to the current test case segment;
if the current action cannot be determined, aborting the method for constructing the test script; and
otherwise, if the current action is determined, appending a translation to the ordered list of actions, and executing the current action in the current application window to navigate to a subsequent application window;
(i) determining whether a subsequent test case segment exists in the ordered list of test case segments;
(j) if the subsequent test case segment exists in the ordered list of test case segments, assigning the subsequent application window as the current application window, assigning the subsequent test case segment as the current test case segment, and repeating steps (f) through (j) until the method for constructing the test script has been aborted or no subsequent test case segment exists in the ordered list of test case segments; and
(k) if the subsequent test case segment does not exist in the ordered list of test case segments and the method for constructing the test script has not been aborted, generating the test script based the ordered list of actions and executing the test script on the application.

13. The method of claim 12, wherein the translation further includes a similarity score between the current action and the current test case segment.

14. The method of claim 13, further comprising generating a first representation of the current action that is processed by an artificial intelligence (AI) engine, and computing the similarity score between the current action and the current test case segment based on a similarity between the first representation of the current action and the current test case segment.

15. The method of claim 12, wherein attempting to determine the current action originating from the current state that corresponds to the current test case segment comprises:
if the current test case segment contains images, modifying the current test case segment by replacing each of the images within the current test case segment with a textual description of the image;
determining whether any existing actions originating from the current state and belonging to the set of translations corresponds to the current test case segment;
if one or more existing actions originating from the current state and belonging to the set of translations correspond to the current test case segment, returning a first one of the or more existing actions that best matches the current test case segment as the current action;
otherwise, if no existing actions originating from the current state and belonging to the set of translations corresponds to the current test case segment, attempting to create a new action originating from the current state that corresponds to the current test case segment;
if the new action cannot be created, failing to determine the current action; and
otherwise, if the new action is created, returning the new action as the current action.

16. The method of claim 15, wherein attempting to create the new action originating from the current state that corresponds to the current test case segment comprises:
determining whether any previously translated actions from the set of translations correspond to the current test case segment and reference only application elements contained within the collection of application elements; and
if one or more previously translated action from the set of translations correspond to the current test case segment and reference only application elements contained within the collection of application elements, returning a copy of a first one of the previously translated actions that best matches the current test case segment as the new action originating from the current state;
otherwise, failing to create the new action.

17. The method of claim 15, wherein attempting to create the new action originating from the current state that corresponds to the current test case segment comprises:
determining whether any actions of the state machine that are not included in the set of translations correspond to the current test case segment and reference only application elements contained within the collection of application elements; and
if one or more actions of the state machine that are not included in the set of translations correspond to the current test case segment and reference only application elements contained within the collection of application elements, returning a first one of the one or more actions of the state machine that best matches the current test case segment as the new action originating from the current state;
otherwise, failing to create the new action.

18. The method of claim 15, wherein attempting to create the new action originating from the current state that corresponds to the current test case segment comprises:

determining a textual description corresponding to each of the application elements present in the current application window;

selecting a subset of application elements within the collection of application elements that are present in the first application window;

creating one or more candidate actions based on the textual description corresponding to ones of the application elements within the subset of application elements;

determining whether any of the one or more candidate actions correspond to the current test case segment; and if at least one of the one or more candidate actions corresponds to the current test case segment, returning a first one of the candidate actions that best matches the current test case segment as the new action;

otherwise, if none of the candidate actions corresponds to the current test case segment, failing to create the new action.

19. The method of claim 12, wherein the test case segment comprises one or more of a natural language (NL) phrase or an image.

20. A method for updating a time-evolving model of an application, the time-evolving model including a set of translations and a state machine, in which states correspond to pages of the application and edges correspond to actions that are performed to transition from one of the pages to another one of the pages of the application or are performed within one of the pages, the method comprising:
   (a) initializing a variable to store an ordered list of translations;
   (b) receiving a test case;
   (c) segmenting the test case into an ordered list of test case segments;
   (d) navigating to a current application window of the application;
   (e) assigning an initial test case segment in the ordered list of test case segments as a current test case segment;
   (f) based on a collection of application elements present in the current application window, determining whether a first state exists in the state machine that corresponds to the current application window;
   (g) if the first state does not exist, creating a new state that is defined by the collection of application elements present in the current application window, modifying the state machine to incorporate the new state, and assigning the new state as a current state;
   (h) if the first state exists, assigning the first state as the current state;
   (i) attempting to determine a current action that originates from the current state and corresponds to the current test case segment;
   (j) if the current action cannot be determined, aborting the method for updating the time-evolving model of the application;
   (k) if the current action is determined, appending a translation to the ordered list of translations, the translation including a mapping between the current action and the current test case segment, and executing the current action in the current application window to navigate to a subsequent application window;
   (l) determining whether a subsequent test case segment exists in the ordered list of test case segments;
   (m) if the subsequent test case segment exists in the ordered list of test case segments, assigning the subsequent application window as the current application window, assigning the subsequent test case segment as the current test case segment, and repeating steps (f) through (m) until the method for updating the time-evolving model of the application has been aborted or no subsequent test case segment exists in the ordered list of test case segments; and
   (n) if the subsequent test case segment does not exist in the ordered list of test case segments and the method for updating the time-evolving model of the application has not been aborted, returning the updated time-evolving model of the application.

21. The method of claim 20, wherein the translation further includes a similarity score between the current action and the current test case segment.

22. The method of claim 21, further comprising generating a first representation of the current action that is processed by an artificial intelligence (AI) engine, and computing the similarity score between the current action and the current test case segment based on a similarity between the first representation of the current action and the current test case segment.

23. The method of claim 21, further comprising, if the current action cannot be identified and the ordered list of translations includes at least one translation, penalizing all similarity scores in the ordered list of translations and updating the set of translations from the time-evolving model to include translations from the ordered list of translations.

24. The method of claim 23, wherein penalizing all similarity scores in the ordered list of translations includes computing a penalty factor equal to a total number of successfully translated test case segments divided by a total number of test case segments in the ordered list of test case segments.

25. The method of claim 21, further comprising, if no subsequent test case segment exists in the ordered list of test case segments and the method for updating the time-evolving model of the application has not been aborted, rewarding all similarity scores in the ordered list of translations and updating the set of translations from the time-evolving model to include translations from the ordered list of translations.

26. The method of claim 20, wherein attempting to determine the current action originating from the current state that corresponds to the current test case segment comprises:
   if the current test case segment contains images, determining a textual description corresponding to each of the application elements present in the current application window;
   determining whether any existing actions originating from the current state and belonging to the set of translations corresponds to the current test case segment;
   if one or more existing actions originating from the current state and belonging to the set of translations correspond to the current test case segment, returning a first one of the or more existing actions that best matches the current test case segment as the current action;
   otherwise, if no existing actions originating from the current state and belonging to the set of translations corresponds to the current test case segment, attempting to create a new action originating from the current state that corresponds to the current test case segment;
   if the new action cannot be created, failing to determine the current action; and otherwise, if the new action is created, modifying the state machine to include the new action originating from the current state and returning the new action as the current action.

27. The method of claim 26, wherein attempting to create the new action originating from the current state that corresponds to the current test case segment comprises:
determining whether any previously translated actions from the set of translations correspond to the current test case segment and reference only application elements contained within the collection of application elements; and
if one or more previously translated action from the set of translations correspond to the current test case segment and reference only application elements contained within the collection of application elements, returning a copy of a first one of the previously translated actions that best matches the current test case segment as the new action originating from the current state;
otherwise, failing to create the new action.

28. The method of claim 26, wherein attempting to create the new action originating from the current state that corresponds to the current test case segment comprises:
determining whether any actions of the state machine that are not included in the set of translations correspond to the current test case segment and reference only application elements contained within the collection of application elements; and
if one or more actions of the state machine that are not included in the set of translations correspond to the current test case segment and reference only application elements contained within the collection of application elements, returning a first one of the one or more actions of the state machine that best matches the current test case segment as the new action originating from the current state;
otherwise, failing to create the new action.

29. The method of claim 26, wherein attempting to create the new action originating from the current state that corresponds to the current test case segment comprises:
determining a textual description corresponding to each of the application elements present in the current application window;
selecting a subset of application elements within the collection of application elements that are present in the first application window;
creating one or more candidate actions based on the textual description corresponding to ones of the application elements within the subset of application elements;
determining whether any of the one or more candidate actions correspond to the current test case segment; and
if at least one of the one or more candidate actions corresponds to the current test case segment, returning a first one of the candidate actions that best matches the current test case segment as the new action;
otherwise, if none of the candidate actions corresponds to the current test case segment, failing to create the new action.

30. The method of claim 20, wherein the test case segment comprises one or more of a natural language (NL) phrase or an image.

* * * * *